US006711563B1

(12) United States Patent
Koskas

(10) Patent No.: US 6,711,563 B1
(45) Date of Patent: Mar. 23, 2004

(54) METHODS OF ORGANIZING DATA AND PROCESSING QUERIES IN A DATABASE SYSTEM, AND DATABASE SYSTEM AND SOFTWARE PRODUCT FOR IMPLEMENTING SUCH METHODS

(75) Inventor: Elie Ouzi Koskas, Saint Brice sous Foret (FR)

(73) Assignee: Lafayette Software Inc., Palo Alto, CA (US)

( * ) Notice: Subject to any disclaimer, the term of this patent is extended or adjusted under 35 U.S.C. 154(b) by 346 days.

(21) Appl. No.: 09/736,689

(22) Filed: Mar. 5, 2001

(30) Foreign Application Priority Data

Nov. 29, 2000 (EP) .............................. 00403331

(51) Int. Cl.⁷ ............................................. G06F 17/30
(52) U.S. Cl. ...................................... 707/3; 707/2
(58) Field of Search ................... 707/1, 2, 3

(56) References Cited

U.S. PATENT DOCUMENTS

| | | | |
|---|---|---|---|
| 5,201,046 A | 4/1993 | Goldberg et al. ............ 707/100 |
| 5,241,648 A * | 8/1993 | Cheng et al. .................. 707/7 |
| 5,359,724 A | 10/1994 | Earle ......................... 707/205 |
| 5,363,098 A | 11/1994 | Antoshenkov ............... 341/95 |
| 5,548,754 A | 8/1996 | Pirahesh et al. ................ 707/2 |
| 5,548,755 A | 8/1996 | Leung et al. ................... 707/2 |
| 5,590,324 A | 12/1996 | Leung et al. ................... 707/5 |
| 5,671,403 A | 9/1997 | Shekita et al. ................. 707/3 |
| 5,724,568 A | 3/1998 | Bhargava et al. .............. 707/2 |
| 5,752,017 A | 5/1998 | Bhargava et al. .............. 707/2 |
| 5,761,652 A | 6/1998 | Wu et al. ....................... 707/2 |
| 5,761,657 A | 6/1998 | Hoang ........................... 707/4 |
| 5,819,255 A | 10/1998 | Celis et al. ..................... 707/2 |
| 5,819,256 A | 10/1998 | Ozbutun et al. ................ 707/2 |
| 5,822,747 A | 10/1998 | Graefe et al. ................... 707/2 |
| 5,822,748 A | 10/1998 | Cohen et al. ................... 707/2 |
| 5,832,477 A | 11/1998 | Bhargava et al. .............. 707/2 |

(List continued on next page.)

FOREIGN PATENT DOCUMENTS

WO     WO 98/04980     2/1998

OTHER PUBLICATIONS

Sarawagi S, <<Indexing Olap Data>>, Bulletin of the IEEE Computer Society Technical Committee on Data Engineering, 1996, pp. 1–9.

Guttman A, "R–Trees: A Dynamic Index Structure for Spatial Searching", Procedings of the ACM SIGMOD International Conference on Management of Data, Boston, MA, Jun. 1984, pp. 47–57.

Harinarayan V et al., <<Implementing Data Cubes Efficiently>>, Proceedings of the ACM SIGMOD, Montreal, Canada, Jun. 1996, pp. 205–216.

(List continued on next page.)

Primary Examiner—Jack Choules
(74) Attorney, Agent, or Firm—Marshall, Gerstein & Borun LLP

(57) ABSTRACT

A reference table has columns associated with data attributes and rows containing related words assigned to those attributes in a collection of data, those words coming from different data tables having independent numbers of records. The stored data include word thesauruses associated with the attributes, and reference table row identifier lists respectively associated with thesaurus entries. Each word thesaurus associated with an attribute has a respective entry for each word assigned to this data attribute in the collection of data. The reference table, which may be a virtual table, defines a unified algebraic framework for the entries of all the thesauruses. Query criteria can be examined with reference to the relevant thesauruses to obtain a row-ID list or bitmap vector which represents all the reference table rows matching the query criteria, if any. The results can then be delivered through the original data tables or, preferably, by means of the thesauruses.

201 Claims, 57 Drawing Sheets

FLAT FILE

| Row-ID | Client Name | Birth Year | Gender | Policy Type | Policy Date | Acc. Date | Amount |
|---|---|---|---|---|---|---|---|
| 0 | André | 1976 | M | Car | 1998 09 09 | 1998 10 03 | 1 000 |
| 1 | Ariane | 1965 | F | House | 1999 01 31 | 1999 04 18 | 10 000 |
| 2 | Max | 1947 | M | Car | 1999 01 10 | 1999 04 18 | 800 |
| 3 | André | 1976 | M | Car | 1998 09 09 | 1999 06 12 | 1 300 |
| 4 | Max | 1947 | M | Car | 1999 01 10 | 1999 08 31 | 300 |
| 5 | Laure | 1976 | F | Car | 1999 02 01 | 1999 12 08 | 2 200 |
| 6 | Ariane | 1965 | F | Car | 1998 06 24 | 1999 12 09 | 1 000 |
| 7 | Ariane | 1965 | F | House | 1999 01 31 | 2000 02 25 | 6 000 |
| 8 | André | 1976 | M | Car | 1998 09 09 | 2000 03 20 | 800 |
| 9 | Max | 1947 | M | House | 1998 12 11 | Null | Null |
| 10 | Laure | 1976 | F | House | 1999 02 01 | Null | Null |
| 11 | Oscar | 1959 | M | Null | Null | Null | Null |

CLIENT NAME THESAURUS

| | Name | FF Row-ID List | Bitmap |
|---|---|---|---|
| 0 | Null | - | 000000000000 |
| 1 | André | {0,3,8} | 100100001000 |
| 2 | Ariane | {1,6,7} | 010000110000 |
| 3 | Laure | {5,10} | 000001000010 |
| 4 | Max | {2,4,9} | 001010000100 |
| 5 | Oscar | {11} | 000000000001 |

U.S. PATENT DOCUMENTS

| | | | |
|---|---|---|---|
| 5,855,012 A | 12/1998 | Bhargava et al. | 707/2 |
| 5,864,857 A | 1/1999 | Ohata et al. | 707/100 |
| 5,870,747 A * | 2/1999 | Sundaresan | 707/101 |
| 5,870,752 A | 2/1999 | Gibbons et al. | 707/102 |
| 5,884,307 A | 3/1999 | Depledge et al. | 707/7 |
| 5,890,151 A | 3/1999 | Agrawal et al. | 707/5 |
| 5,899,988 A | 5/1999 | Depledge et al. | 707/3 |
| 5,903,888 A | 5/1999 | Cohen et al. | 707/3 |
| 5,907,297 A | 5/1999 | Cohen et al. | 341/95 |
| 5,924,088 A | 7/1999 | Jakobsson et al. | 707/2 |
| 5,940,833 A | 8/1999 | Benson | 707/100 |
| 5,963,935 A | 10/1999 | Ozbutun et al. | 707/3 |
| 5,963,936 A | 10/1999 | Cochrane et al. | 707/3 |
| 6,067,540 A | 5/2000 | Ozbutun et al. | 707/3 |
| 6,081,800 A | 6/2000 | Ozbutun et al. | 707/3 |
| 6,105,018 A | 8/2000 | Demers et al. | 707/2 |
| 6,141,656 A | 10/2000 | Ozbutun et al. | 707/3 |
| 6,266,662 B1 * | 7/2001 | Ozbutun et al. | 707/3 |
| 6,505,188 B1 * | 1/2003 | Ghazal et al. | 707/2 |

OTHER PUBLICATIONS

Chaudhuri et al., <<An OverView of Data Warehousing and Olap Technology>>, SIGMOD Record, Mar. 1997, vol. 26, No. 1, pp. 65–74.

Johnson Th. et al., <<Some Appoaches to Index Design for Cube Forest>>, <<Bulletin of the Technical Committee on DATA ENGINEERING>>, Mar. 1997, vol. 20, No. 1, pp. 27–35.

Chan C–Y. et al., <<Bitmap Index Design and Evaluation>>, Proceedings of the ACM SIGMOD 1998, Seattle, WA, 1998, pp. 355–378.

EPO Search Report dated Apr. 26, 2002.

* cited by examiner

CLIENTS

FIG. 1

| Row-ID | Name | Birth Year | Gender |
|---|---|---|---|
| 0 | Oscar | 1959 | M |
| 1 | André | 1976 | M |
| 2 | Ariane | 1965 | F |
| 3 | Laure | 1976 | F |
| 4 | Max | 1947 | M |

POLICIES

FIG. 2

| Row-ID | Type | Date | Client Link |
|---|---|---|---|
| 0 | Car | 1998 06 24 | 2 |
| 1 | Car | 1998 09 09 | 1 |
| 2 | House | 1998 12 11 | 4 |
| 3 | Car | 1999 01 10 | 4 |
| 4 | House | 1999 01 31 | 2 |
| 5 | Car | 1999 02 01 | 3 |
| 6 | House | 1999 02 01 | 3 |

ACCIDENTS

FIG. 3

| Row-ID | Date | Amount | Policy Link |
|---|---|---|---|
| 0 | 1998 10 03 | 1 000 | 1 |
| 1 | 1999 04 18 | 10 000 | 4 |
| 2 | 1999 04 18 | 800 | 3 |
| 3 | 1999 06 12 | 1 300 | 1 |
| 4 | 1999 08 31 | 300 | 3 |
| 5 | 1999 12 08 | 2 200 | 5 |
| 6 | 1999 12 09 | 1 000 | 0 |
| 7 | 2000 02 25 | 6 000 | 4 |
| 8 | 2000 03 20 | 800 | 1 |

FLAT FILE

| Row-ID | Client Name | Birth Year | Gender | Policy Type | Policy Date | Acc. Date | Amount |
|---|---|---|---|---|---|---|---|
| 0 | André | 1976 | M | Car | 1998 09 09 | 1998 10 03 | 1 000 |
| 1 | Ariane | 1965 | F | House | 1999 01 31 | 1999 04 18 | 10 000 |
| 2 | Max | 1947 | M | Car | 1999 01 10 | 1999 04 18 | 800 |
| 3 | André | 1976 | M | Car | 1998 09 09 | 1999 06 12 | 1 300 |
| 4 | Max | 1947 | M | Car | 1999 01 10 | 1999 08 31 | 300 |
| 5 | Laure | 1976 | F | Car | 1999 02 01 | 1999 12 08 | 2 200 |
| 6 | Ariane | 1965 | F | Car | 1998 06 24 | 1999 12 09 | 1 000 |
| 7 | Ariane | 1965 | F | House | 1999 01 31 | 2000 02 25 | 6 000 |
| 8 | André | 1976 | M | Car | 1998 09 09 | 2000 03 20 | 800 |
| 9 | Max | 1947 | M | House | 1998 12 11 | Null | Null |
| 10 | Laure | 1976 | F | House | 1999 02 01 | Null | Null |
| 11 | Oscar | 1959 | M | Null | Null | Null | Null |

*FIG. 8*

LINK TABLE

| FF Row-ID | Client Link | Policy Link | Accident Link |
|---|---|---|---|
| 0 | 1 | 1 | 0 |
| 1 | 2 | 4 | 1 |
| 2 | 4 | 3 | 2 |
| 3 | 1 | 1 | 3 |
| 4 | 4 | 3 | 4 |
| 5 | 3 | 5 | 5 |
| 6 | 2 | 0 | 6 |
| 7 | 2 | 4 | 7 |
| 8 | 1 | 1 | 8 |
| 9 | 4 | 2 | −1 |
| 10 | 3 | 6 | −1 |
| 11 | 0 | −1 | −1 |

*FIG. 9*

ACCIDENT AMOUNT (TRUNCATION LENGTH 3) THESAURUS

| Amount Prefix | FF Row-ID List | Bitmap |
|---|---|---|
| 0 | {2,4,8} | 001010001000 |
| 1 | {0,3,6} | 000100100000 |
| 2 | {5} | 000001000000 |
| 6 | {7} | 000000010000 |
| 10 | {1} | 010000000000 |

*FIG. 10H*

CLIENT NAME THESAURUS

| | Name | FF Row-ID List | Bitmap |
|---|---|---|---|
| 0 | *Null* | - | 000000000000 |
| 1 | André | {0,3,8} | 100100001000 |
| 2 | Ariane | {1,6,7} | 010000110000 |
| 3 | Laure | {5,10} | 000001000010 |
| 4 | Max | {2,4,9} | 001010000100 |
| 5 | Oscar | {11} | 000000000001 |

*FIG. 10A*

CLIENT BIRTH YEAR THESAURUS

| | Birth Year | FF Row-ID List | Bitmap |
|---|---|---|---|
| 0 | *Null* | - | 000000000000 |
| 1 | 1947 | {2,4,9} | 001010000100 |
| 2 | 1959 | {11} | 000000000001 |
| 3 | 1965 | {1,6,7} | 010000110000 |
| 4 | 1976 | {0,3,5,8,10} | 100101001010 |

*FIG. 10B*

CLIENT GENDER THESAURUS

| | Gender | FF Row-ID List | Bitmap |
|---|---|---|---|
| 0 | *Null* | - | 000000000000 |
| 1 | F | {1,5,6,7,10} | 010001110010 |
| 2 | M | {0,2,3,4,8,9,11} | 101110001101 |

*FIG. 10C*

POLICY TYPE THESAURUS

| | Type | FF Row-ID List | Bitmap |
|---|---|---|---|
| 0 | *Null* | {11} | 000000000001 |
| 1 | Car | {0,2,3,4,5,6,8} | 101111101000 |
| 2 | House | {1,7,9,10} | 010000010110 |

*FIG. 10D*

POLICY DATE THESAURUS

| | Date | FF Row-ID List | Bitmap |
|---|---|---|---|
| 0 | *Null* | {11} | 000000000001 |
| 1 | 1998 06 24 | {6} | 000000100000 |
| 2 | 1998 09 09 | {0,3,8} | 100100001000 |
| 3 | 1998 12 11 | {9} | 000000000100 |
| 4 | 1999 01 10 | {2,4} | 001010000000 |
| 5 | 1999 01 31 | {1,7} | 010000010000 |
| 6 | 1999 02 01 | {5,10} | 000001000010 |

*FIG. 10E*

ACCIDENT DATE THESAURUS

|   | Date | FF Row-ID List | Bitmap |
|---|---|---|---|
| 0 | *Null* | {9,10,11} | 000000000111 |
| 1 | 1998 10 03 | {0} | 100000000000 |
| 2 | 1999 04 18 | {1,2} | 010000000000 |
| 3 | 1999 06 12 | {3} | 000100000000 |
| 4 | 1999 08 31 | {4} | 000010000000 |
| 5 | 1999 12 08 | {5} | 000001000000 |
| 6 | 1999 12 09 | {6} | 000000100000 |
| 7 | 2000 02 25 | {7} | 000000010000 |
| 8 | 2000 03 20 | {8} | 000000001000 |

*FIG. 10F*

ACCIDENT AMOUNT THESAURUS

|   | Amount | FF Row-ID List | Bitmap |
|---|---|---|---|
| 0 | *Null* | {9,10,11} | 000000000111 |
| 1 | 300 | {4} | 000010000000 |
| 2 | 800 | {2,8} | 001000001000 |
| 3 | 1 000 | {0,6} | 100000100000 |
| 4 | 1 300 | {3} | 000100000000 |
| 5 | 2 200 | {5} | 000001000000 |
| 6 | 6 000 | {7} | 000000010000 |
| 7 | 10 000 | {1} | 010000000000 |

*FIG. 10G*

CLIENT NAME THESAURUS

| Name | Bitmap | L1 Ranks | L1 Segments |
|---|---|---|---|
| *Null* | 000 000 000 000 | - | - |
| André | 100 100 001 000 | {0,1,2} | {100,100,001} |
| Ariane | 010 000 110 000 | {0,2} | {010,110} |
| Laure | 000 001 000 010 | {1,3} | {001,010} |
| Max | 001 010 000 100 | {0,2,3} | {001,010,100} |
| Oscar | 000 000 000 001 | {3} | {001} |

*FIG. 11A*

ACCIDENT AMOUNT THESAURUS

| Amount | Bitmap | L1 Ranks | L1 Segments |
|---|---|---|---|
| *Null* | 000 000 000 111 | {3} | {111} |
| 300 | 000 010 000 000 | {1} | {010} |
| 800 | 001 000 001 000 | {0,2} | {001,001} |
| 1 000 | 100 000 100 000 | {0,2} | {100,100} |
| 1 300 | 000 100 000 000 | {1} | {100} |
| 2 200 | 000 001 000 000 | {1} | {001} |
| 6 000 | 000 000 010 000 | {2} | {010} |
| 10 000 | 010 000 000 000 | {0} | {010} |

*FIG. 11G*

ACCIDENT AMOUNT MACROWORD (/ 3) THESAURUS

| Prefix | Bitmap | L1 Ranks | L1 Segments |
|---|---|---|---|
| 0 | 001 010 001 000 | {0,1,2} | {001,010,001} |
| 1 | 000 100 100 000 | {1,2} | {100,100} |
| 2 | 000 001 000 000 | {1} | {001} |
| 6 | 000 000 010 000 | {2} | {010} |
| 10 | 010 000 000 000 | {0} | {010} |

*FIG. 11H*

CLIENT NAME THESAURUS

| Name | L1 Ranks | L1 Bitmap | L2 Ranks | L2 Segments |
|---|---|---|---|---|
| *Null* | - | 00 00 | - | - |
| André | {0,1,2} | 11 10 | {0,1} | {11,10} |
| Ariane | {0,2} | 10 10 | {0,1} | {10,10} |
| Laure | {1,3} | 01 01 | {0,1} | {01,01} |
| Max | {0,2,3} | 10 11 | {0,1} | {10,11} |
| Oscar | {3} | 00 01 | {1} | {01} |

*FIG. 12A*

ACCIDENT AMOUNT THESAURUS

| Amount | L1 Ranks | L1 Bitmap | L2 Ranks | L2 Segments |
|---|---|---|---|---|
| *Null* | {3} | 00 01 | {1} | {01} |
| 300 | {1} | 01 00 | {0} | {01} |
| 800 | {0,2} | 10 10 | {0,1} | {10,10} |
| 1 000 | {0,2} | 10 10 | {0,1} | {10,10} |
| 1 300 | {1} | 01 00 | {0} | {01} |
| 2 200 | {1} | 01 00 | {0} | {01} |
| 6 000 | {2} | 00 10 | {1} | {10} |
| 10 000 | {0} | 10 00 | {0} | {10} |

*FIG. 12G*

ACCIDENT AMOUNT MACROWORD (/ 3) THESAURUS

| Prefix | L1 Ranks | L1 Bitmap | L2 Ranks | L2 Segments |
|---|---|---|---|---|
| 0 | {0,1,2} | 11 10 | {0,1} | {11,10} |
| 1 | {1,2} | 01 10 | {0,1} | {01,10} |
| 2 | {1} | 01 00 | {0} | {01} |
| 6 | {2} | 00 10 | {1} | {10} |
| 10 | {0} | 10 00 | {0} | {10} |

*FIG. 12H*

CLIENT NAME THESAURUS

| Name | L1 Ranks | L1 Segments | L2 Ranks | L2 Segments |
|---|---|---|---|---|
| *Null* | - | - | - | - |
| André | {0,1,2} | {100,100,001} | {0,1} | {11,10} |
| Ariane | {0,2} | {010,110} | {0,1} | {10,10} |
| Laure | {1,3} | {001,010} | {0,1} | {01,01} |
| Max | {0,2,3} | {001,010,100} | {0,1} | {10,11} |
| Oscar | {3} | {001} | {1} | {01} |

*FIG. 13A*

ACCIDENT AMOUNT THESAURUS

| Amount | L1 Ranks | L1 Segments | L2 Ranks | L2 Segments |
|---|---|---|---|---|
| *Null* | {3} | {111} | {1} | {01} |
| 300 | {1} | {010} | {0} | {01} |
| 800 | {0,2} | {001,001} | {0,1} | {10,10} |
| 1 000 | {0,2} | {100,100} | {0,1} | {10,10} |
| 1 300 | {1} | {100} | {0} | {01} |
| 2 200 | {1} | {001} | {0} | {01} |
| 6 000 | {2} | {010} | {1} | {10} |
| 10 000 | {0} | {010} | {0} | {10} |

*FIG. 13G*

ACCIDENT AMOUNT MACROWORD (/ 3) THESAURUS

| Prefix | L1 Ranks | L1 Segments | L2 Ranks | L2 Segments |
|---|---|---|---|---|
| 0 | {0,1,2} | {001,010,001} | {0,1} | {11,10} |
| 1 | {1,2} | {100,100} | {0,1} | {01,10} |
| 2 | {1} | {001} | {0} | {01} |
| 6 | {2} | {010} | {1} | {10} |
| 10 | {0} | {010} | {0} | {10} |

*FIG. 13H*

CLIENT NAME THESAURUS

| Name | L1 First | L1 Last | L2 First |
|---|---|---|---|
| *Null* | 0 | 0 | 0 |
| André | 20 | 2 | 3 |
| Ariane | 5 | 6 | 12 |
| Laure | 8 | 12 | 14 |
| Max | 29 | 15 | 6 |
| Oscar | 26 | 26 | 7 |

*FIG. 14A*

ACCIDENT AMOUNT THESAURUS

| Amount | L1 First | L1 Last | L2 First |
|---|---|---|---|
| *Null* | 13 | 13 | 21 |
| 300 | 4 | 4 | 22 |
| 800 | 9 | 10 | 16 |
| 1 000 | 3 | 19 | 18 |
| 1 300 | 24 | 24 | 20 |
| 2 200 | 25 | 25 | 4 |
| 6 000 | 23 | 23 | 9 |
| 10 000 | 16 | 16 | 10 |

*FIG. 14G*

ACCIDENT AMOUNT MACROWORD (/ 3) THESAURUS

| Prefix | L1 First | L1 Last | L2 First |
|---|---|---|---|
| 0 | 21 | 7 | 19 |
| 1 | 30 | 14 | 25 |
| 2 | 1 | 1 | 27 |
| 6 | 28 | 28 | 28 |
| 10 | 18 | 18 | 1 |

*FIG. 14H*

| Address | L1 Rank | Next | L1 Segment |
|---|---|---|---|
| 1 | 1 | 0 | 001 |
| 2 | 2 | 0 | 001 |
| 3 | 0 | 19 | 100 |
| 4 | 1 | 0 | 010 |
| 5 | 0 | 6 | 010 |
| 6 | 2 | 0 | 110 |
| 7 | 2 | 0 | 001 |
| 8 | 1 | 12 | 001 |
| 9 | 0 | 10 | 001 |
| 10 | 2 | 0 | 001 |
| 11 | 1 | 2 | 100 |
| 12 | 3 | 0 | 010 |
| 13 | 3 | 0 | 111 |
| 14 | 2 | 0 | 100 |
| 15 | 3 | 0 | 100 |
| 16 | 0 | 0 | 010 |
| 17 | x | 0 | 000 |
| 18 | 0 | 0 | 010 |
| 19 | 2 | 0 | 100 |
| 20 | 0 | 11 | 100 |
| 21 | 0 | 22 | 001 |
| 22 | 1 | 7 | 010 |
| 23 | 2 | 0 | 010 |
| 24 | 1 | 0 | 100 |
| 25 | 1 | 0 | 001 |
| 26 | 3 | 0 | 001 |
| 27 | 2 | 15 | 010 |
| 28 | 2 | 0 | 010 |
| 29 | 0 | 27 | 001 |
| 30 | 1 | 14 | 100 |
| 31 | x | 32 | 000 |
| 32 | x | 33 | 000 |
| 33 | x | 17 | 000 |

*FIG. 15*

| Address | L2 Rank | Next | L2 Segment |
|---|---|---|---|
| 1 | 0 | 0 | 10 |
| 2 | 1 | 0 | 01 |
| 3 | 0 | 11 | 11 |
| 4 | 0 | 0 | 01 |
| 5 | 1 | 0 | 10 |
| 6 | 0 | 13 | 10 |
| 7 | 1 | 0 | 01 |
| 8 | x | 17 | 00 |
| 9 | 1 | 0 | 10 |
| 10 | 0 | 0 | 10 |
| 11 | 1 | 0 | 10 |
| 12 | 0 | 23 | 10 |
| 13 | 1 | 0 | 11 |
| 14 | 0 | 2 | 01 |
| 15 | 1 | 0 | 10 |
| 16 | 0 | 15 | 10 |
| 17 | x | 24 | 00 |
| 18 | 0 | 5 | 10 |
| 19 | 0 | 30 | 11 |
| 20 | 0 | 0 | 01 |
| 21 | 1 | 0 | 01 |
| 22 | 0 | 0 | 01 |
| 23 | 1 | 0 | 10 |
| 24 | x | 0 | 00 |
| 25 | 1 | 26 | 01 |
| 26 | 2 | 0 | 10 |
| 27 | 0 | 0 | 01 |
| 28 | 1 | 0 | 10 |
| 29 | x | 8 | 00 |
| 30 | 1 | 0 | 10 |

*FIG. 16*

CLIENT NAME THESAURUS

| Row-ID | Name | Word Index | Format |
|---|---|---|---|
| 0 | *Null* | 0 | 1 |
| 1 | André | 1 | 1 |
| 2 | Ariane | 2 | 1 |
| 3 | Laure | 3 | 1 |
| 4 | Max | 4 | 1 |
| 5 | Oscar | 5 | 1 |

*FIG. 25*

ACCIDENT AMOUNT THESAURUS

| Row-ID | Amount | Word Index | Format |
|---|---|---|---|
| 0 | *Null* | 0 | 1 |
| 1 | 300 | 1 | 1 |
| 2 | 800 | 2 | 1 |
| 3 | 1 000 | 3 | 1 |
| 4 | 1 300 | 4 | 1 |
| 5 | 2 200 | 5 | 1 |
| 6 | 6 000 | 6 | 1 |
| 7 | 10 000 | 7 | 1 |

*FIG. 26*

ACC. AMOUNT. MACROWORD (/ 3) THESAURUS

| Row-ID | Prefix | Macro Index | First Word | Format |
|---|---|---|---|---|
| 0 | 0 | 0 | 1 | 1 |
| 1 | 1 | 1 | 3 | 1 |
| 2 | 2 | 2 | 5 | 1 |
| 3 | 6 | 3 | 6 | 1 |
| 4 | 10 | 4 | 7 | 1 |

*FIG. 27*

CLIENT NAME AUXILIARY TABLE

| Row-ID | CN_F1 | CN_L1 | CN_F2 |
|---|---|---|---|
| 0 | 0 | 0 | 0 |
| 1 | 1 | 3 | 1 |
| 2 | 4 | 5 | 3 |
| 3 | 6 | 7 | 5 |
| 4 | 8 | 10 | 7 |
| 5 | 11 | 11 | 9 |

*FIG. 28*

ACCIDENT AMOUNT AUXILIARY TABLE

| Row-ID | AA_F1 | AA_L1 | AA_F2 |
|---|---|---|---|
| 0 | 12 | 12 | 10 |
| 1 | 13 | 13 | 11 |
| 2 | 14 | 15 | 12 |
| 3 | 16 | 17 | 14 |
| 4 | 18 | 18 | 16 |
| 5 | 19 | 19 | 17 |
| 6 | 20 | 20 | 18 |
| 7 | 21 | 21 | 19 |

*FIG. 29*

ACC. AMOUNT. MACROWORD (/ 3) AUXILIARY TABLE

| Row-ID | AA_3_F1 | AA_3_L1 | AA_3_F2 |
|---|---|---|---|
| 0 | 22 | 24 | 20 |
| 1 | 25 | 26 | 22 |
| 2 | 27 | 27 | 24 |
| 3 | 28 | 28 | 25 |
| 4 | 29 | 29 | 26 |

| AD | NO1 | NX1 | HP1 |
|---|---|---|---|
| 1 | 0 | 2 | 100 |
| 2 | 1 | 3 | 100 |
| 3 | 2 | 0 | 001 |
| 4 | 0 | 5 | 010 |
| 5 | 2 | 0 | 110 |
| 6 | 1 | 7 | 001 |
| 7 | 3 | 0 | 010 |
| 8 | 0 | 9 | 001 |
| 9 | 2 | 10 | 010 |
| 10 | 3 | 0 | 100 |
| 11 | 3 | 0 | 001 |
| 12 | 3 | 0 | 111 |
| 13 | 1 | 0 | 010 |
| 14 | 0 | 15 | 001 |
| 15 | 2 | 0 | 001 |
| 16 | 0 | 17 | 100 |
| 17 | 2 | 0 | 100 |
| 18 | 1 | 0 | 100 |
| 19 | 1 | 0 | 001 |
| 20 | 2 | 0 | 010 |
| 21 | 0 | 0 | 010 |
| 22 | 0 | 23 | 001 |
| 23 | 1 | 24 | 010 |
| 24 | 2 | 0 | 001 |
| 25 | 1 | 26 | 100 |
| 26 | 2 | 0 | 100 |
| 27 | 1 | 0 | 001 |
| 28 | 2 | 0 | 010 |
| 29 | 0 | 0 | 010 |
| 30 | x | 31 | 000 |
| 31 | x | 32 | 000 |
| 32 | x | 33 | 000 |
| 33 | x | 0 | 000 |

FIG. 32

| AD | NO2 | NX2 | HP2 |
|---|---|---|---|
| 1 | 0 | 2 | 11 |
| 2 | 1 | 0 | 10 |
| 3 | 0 | 4 | 10 |
| 4 | 1 | 0 | 10 |
| 5 | 0 | 6 | 01 |
| 6 | 1 | 0 | 01 |
| 7 | 0 | 8 | 10 |
| 8 | 1 | 0 | 11 |
| 9 | 1 | 0 | 01 |
| 10 | 1 | 0 | 01 |
| 11 | 0 | 0 | 01 |
| 12 | 0 | 13 | 10 |
| 13 | 1 | 0 | 10 |
| 14 | 0 | 15 | 10 |
| 15 | 1 | 16 | 10 |
| 16 | 0 | 17 | 01 |
| 17 | 0 | 18 | 01 |
| 18 | 1 | 19 | 10 |
| 19 | 0 | 20 | 10 |
| 20 | 0 | 21 | 11 |
| 21 | 1 | 0 | 10 |
| 22 | 0 | 23 | 01 |
| 23 | 1 | 0 | 10 |
| 24 | 0 | 0 | 01 |
| 25 | 1 | 0 | 10 |
| 26 | 0 | 0 | 10 |
| 27 | x | 28 | 00 |
| 28 | x | 29 | 00 |
| 29 | x | 30 | 00 |
| 30 | x | 0 | 00 |

| AD | NO2 | NX2 | HP2 | F1 |
|---|---|---|---|---|
| 1 | 0 | 2 | 11 | 1 |
| 2 | 1 | 0 | 10 | 3 |
| 3 | 0 | 4 | 10 | 4 |
| 4 | 1 | 0 | 10 | 5 |
| 5 | 0 | 6 | 01 | 6 |
| 6 | 1 | 0 | 01 | 7 |
| 7 | 0 | 8 | 10 | 8 |
| 8 | 1 | 0 | 11 | 9 |
| 9 | 1 | 0 | 01 | 11 |
| 10 | 1 | 0 | 01 | 12 |
| 11 | 0 | 0 | 01 | 13 |
| 12 | 0 | 13 | 10 | 14 |
| 13 | 1 | 0 | 10 | 15 |
| 14 | 0 | 15 | 10 | 16 |
| 15 | 1 | 16 | 10 | 17 |
| 16 | 0 | 17 | 01 | 18 |
| 17 | 0 | 18 | 01 | 19 |
| 18 | 1 | 19 | 10 | 20 |
| 19 | 0 | 20 | 10 | 21 |
| 20 | 0 | 21 | 11 | 22 |
| 21 | 1 | 0 | 10 | 24 |
| 22 | 0 | 23 | 01 | 25 |
| 23 | 1 | 0 | 10 | 26 |
| 24 | 0 | 0 | 01 | 27 |
| 25 | 1 | 0 | 10 | 28 |
| 26 | 0 | 0 | 10 | 29 |
| 27 | x | 28 | 00 | x |
| 28 | x | 29 | 00 | x |
| 29 | x | 30 | 00 | x |
| 30 | x | 0 | 00 | x |

*FIG. 34A*

| AD | NX1 | HP1 |
|---|---|---|
| 1 | 2 | 100 |
| 2 | 0 | 100 |
| 3 | 0 | 001 |
| 4 | 0 | 010 |
| 5 | 0 | 110 |
| 6 | 0 | 001 |
| 7 | 0 | 010 |
| 8 | 0 | 001 |
| 9 | 10 | 010 |
| 10 | 0 | 100 |
| 11 | 0 | 001 |
| 12 | 0 | 111 |
| 13 | 0 | 010 |
| 14 | 0 | 001 |
| 15 | 0 | 001 |
| 16 | 0 | 100 |
| 17 | 0 | 100 |
| 18 | 0 | 100 |
| 19 | 0 | 001 |
| 20 | 0 | 010 |
| 21 | 0 | 010 |
| 22 | 23 | 001 |
| 23 | 0 | 010 |
| 24 | 0 | 001 |
| 25 | 0 | 100 |
| 26 | 0 | 100 |
| 27 | 0 | 001 |
| 28 | 0 | 010 |
| 29 | 0 | 010 |
| 30 | 31 | 000 |
| 31 | 32 | 000 |
| 32 | 33 | 000 |
| 33 | 0 | 000 |

*FIG. 34B*

| AD | NO2 | NX2 | F1 |
|---|---|---|---|
| 1 | 0 | 2 | 1 |
| 2 | 1 | 0 | 3 |
| 3 | 0 | 4 | 4 |
| 4 | 1 | 0 | 5 |
| 5 | 0 | 6 | 6 |
| 6 | 1 | 0 | 7 |
| 7 | 0 | 8 | 8 |
| 8 | 1 | 0 | 9 |
| 9 | 1 | 0 | 11 |
| 10 | 1 | 0 | 12 |
| 11 | 0 | 0 | 13 |
| 12 | 0 | 13 | 10 |
| 13 | 1 | 0 | 14 |
| 14 | 0 | 15 | 15 |
| 15 | 1 | 16 | 16 |
| 16 | 0 | 17 | 17 |
| 17 | 0 | 18 | 18 |
| 18 | 1 | 19 | 19 |
| 19 | 0 | 20 | 20 |
| 20 | 0 | 21 | 21 |
| 21 | 1 | 0 | 22 |
| 22 | 0 | 23 | 24 |
| 23 | 1 | 0 | 25 |
| 24 | 0 | 0 | 26 |
| 25 | 1 | 0 | 27 |
| 26 | 0 | 0 | 28 |
| 27 | x | 28 | 29 |
| 28 | x | 29 | x |
| 29 | x | 30 | x |
| 30 | x | 0 | x |

FIG. 34C

| AD | R2 | NX1 | | HP1 |
|---|---|---|---|---|
| 1 | 0 | 2 | | 100 |
| 2 | 1 | 0 | | 100 |
| 3 | 0 | 0 | | 001 |
| 4 | 0 | 0 | | 010 |
| 5 | 0 | 0 | | 110 |
| 6 | 1 | 0 | | 001 |
| 7 | 1 | 0 | | 010 |
| 8 | 0 | 0 | | 001 |
| 9 | 0 | 10 | | 010 |
| 10 | 1 | 0 | | 100 |
| 11 | 1 | 0 | | 001 |
| 12 | 1 | 0 | | 111 |
| 13 | 1 | 0 | | 010 |
| 14 | 0 | 0 | | 001 |
| 15 | 0 | 0 | | 001 |
| 16 | 0 | 0 | | 100 |
| 17 | 0 | 0 | | 100 |
| 18 | 1 | 0 | | 100 |
| 19 | 1 | 0 | | 001 |
| 20 | 0 | 0 | | 010 |
| 21 | 0 | 0 | | 010 |
| 22 | 0 | 23 | | 001 |
| 23 | 1 | 0 | | 010 |
| 24 | 0 | 0 | | 001 |
| 25 | 1 | 0 | | 100 |
| 26 | 0 | 0 | | 100 |
| 27 | 1 | 0 | | 001 |
| 28 | 0 | 0 | | 010 |
| 29 | 0 | 0 | | 010 |
| 30 | x | 31 | | 000 |
| 31 | x | 32 | | 000 |
| 32 | x | 33 | | 000 |
| 33 | x | 0 | | 000 |

FIG. 34D

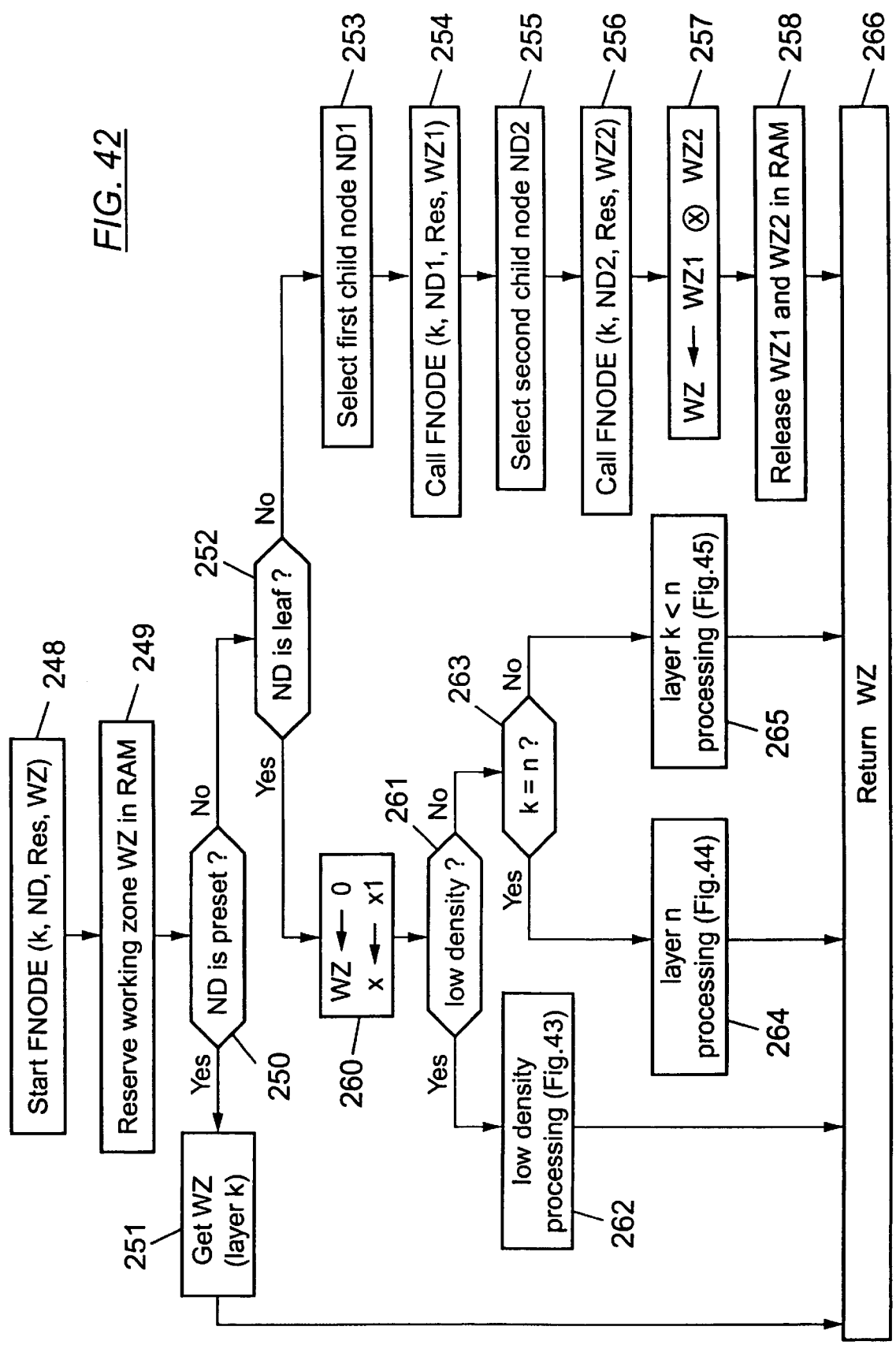

CLIENT NAME

| NO2 | F_AD' |
|---|---|
| 0 | 1 |
| 1 | 5 |

*FIG. 58*

ACC. AMOUNT

| NO2 | F_AD' |
|---|---|
| 0 | 10 |
| 1 | 16 |

*FIG. 59*

ACC. AMOUNT / 3

| NO2 | F_AD' |
|---|---|
| 0 | 20 |
| 1 | 24 |

*FIG. 60*

| AD' | HP'2 | NX'2 | PTR |
|---|---|---|---|
| 1 | 11 | 2 | 1 |
| 2 | 10 | 3 | 2 |
| 3 | 01 | 4 | 3 |
| 4 | 10 | 0 | 4 |
| 5 | 10 | 6 | 1 |
| 6 | 10 | 7 | 2 |
| 7 | 01 | 8 | 3 |
| 8 | 11 | 9 | 4 |
| 9 | 01 | 0 | 5 |
| 10 | 01 | 11 | 1 |
| 11 | 10 | 12 | 2 |
| 12 | 10 | 13 | 3 |
| 13 | 01 | 14 | 4 |
| 14 | 01 | 15 | 5 |
| 15 | 10 | 0 | 7 |
| 16 | 01 | 17 | 0 |
| 17 | 10 | 18 | 2 |
| 18 | 10 | 19 | 3 |
| 19 | 10 | 0 | 6 |
| 20 | 11 | 21 | 0 |
| 21 | 01 | 22 | 1 |
| 22 | 01 | 23 | 2 |
| 23 | 10 | 0 | 4 |
| 24 | 10 | 25 | 0 |
| 25 | 10 | 26 | 1 |
| 26 | 10 | 0 | 3 |
| 27 | 00 | 28 | x |
| 28 | 00 | 29 | x |
| 29 | 00 | 30 | x |
| 30 | 00 | 0 | x |

*FIG. 61*

OUTPUT TABLE

| Flat File Row-ID | Acc. Date | Client Name | Policy Date |
|---|---|---|---|
| 0 | 1998 10 03 | André | 1998 09 09 |
| 1 | / | / | / |
| 2 | 1999 04 18 | Max | 1999 01 10 |
| 3 | 1999 06 12 | André | 1998 09 09 |
| 4 | / | / | / |
| 5 | / | / | / |
| 6 | / | / | / |
| 7 | / | / | / |
| 8 | 2000 03 20 | André | 1998 09 09 |
| 9 | / | / | / |
| 10 | / | / | / |
| 11 | / | / | / |

*FIG. 66*

OUTPUT TABLE

| Flat File Row-ID | Acc. Date | Client Name | Policy Date |
|---|---|---|---|
| 0 | 1 | 1 | 2 |
| 1 | / | / | / |
| 2 | 2 | 4 | 4 |
| 3 | 3 | 1 | 2 |
| 4 | / | / | / |
| 5 | / | / | / |
| 6 | / | / | / |
| 7 | / | / | / |
| 8 | 8 | 1 | 2 |
| 9 | / | / | / |
| 10 | / | / | / |
| 11 | / | / | / |

*FIG. 67*

METHODS OF ORGANIZING DATA AND PROCESSING QUERIES IN A DATABASE SYSTEM, AND DATABASE SYSTEM AND SOFTWARE PRODUCT FOR IMPLEMENTING SUCH METHODS

BACKGROUND OF THE INVENTION

The present invention relates to relational database management systems (RDBMS), and more particularly to computerized systems for storing and accessing large amounts of data.

In a non-limiting manner, the invention is applicable to "data warehouses". On-line transaction processing (OLTP) systems, such as for bank teller transactions and airline reservations, are optimized for finding a record associated with a specific key, e.g. finding the information about employee 123124. By contrast, data warehouses are optimized for finding sets of records very quickly. The reason is that typical queries are of the form: "find all sales by region and quarter" or "find stores that sell the greatest volume of sportswear per month" or "select the top 5 stores for each product category for the last year". Such queries must typically access large sets of rows in data tables. The query processing challenge is to process these queries without doing a linear scan of all or most of the database.

Five main approaches have been proposed to attack this problem: (i) multidimensional arrays; (ii) special indexes; (iii) table caching; (iv) optimized foreign key joins; and (v) approximation.

(i) Multidimensional Arrays (i.e. Matrices).

This strategy consists of implementing the data warehouse as a multidimensional array or matrix. Examples may be found in U.S. Pat. No. 5,359,724 and U.S. Pat. No. 5,864,857. Each dimension corresponds to an attribute of the data. For example, a sales table can be viewed as a matrix with coordinates: store location, product type, customer id, and so on. A particular sale can be identified by specifying all of these attributes. The strategy works well for small databases or very dense ones. By dense, we mean that the Cartesian product of possible values should all be meaningful, e.g., every customer is likely to buy every product from every store. Since this is rarely true, this scheme must be modified to deal with sparse values. This can be done by defining a notion of sparse attributes and dense ones. So, for example, it might be that every store carries every product (a dense relationship that can be stored in a matrix), but only some of these combinations are valid for any given customer. So, a conventional index would be used whenever customer sales are involved, but a dense one for queries involving store-wide or product-wide sales.

(ii) Special Indexes.

Bitmap indexes are an index structure tailored to data warehouses (see, e.g. U.S. Pat. No. 5,903,888). These indexes have already been used in some commercial products to speed up query processing. In its simplest form, a bitmap index on an attribute consists of one vector of bits (i.e. bitmap) per attribute value, where the size of each bitmap is equal to the number of records in the indexed relation. For example, if the attribute is day-of-week, then there would be seven bitmap vectors for that attribute, one for each day. The bitmap vector corresponding to Monday would have a 1 at position i if record i contains "Monday" in the day-of-week attribute. This single value-based approach is called a Value-List index. Other techniques (e.g. U.S. Pat. No. 5,761,652) associate bit vectors with ranges of values, so there could, for a salary attribute, be a vector for the range 0 to 20,000 Euros, 20,000.01 to 35,000 Euros, and so on. Still others associate each bit vector with a bit value (a 1 or a 0) in a given position. So, if the attribute holds n bit numbers, then there would be 2n bit vectors (position 1, bit value 1; position 1, bit value 0; position 2 bit value 1; . . . ).

The benefit of bit vectors is that it is easy to use multiple bit vectors to answer a single query. Consider a query on several predicates, each of which is indexed. Most conventional database management systems would use just one of the indexes (the one that is most "selective" so returns the fewest rows), though some systems might attempt to intersect the record identifiers of multiple indexes.

Bitmaps work better, because they are more compact and intersecting several bitmaps is much faster than intersecting several collections of record identifiers. In the best case, the improvement is proportional to the word size of the machine. For example, suppose the word size is 32 bits. Then two bit vectors can be intersected 32 bits at a time. Each set of 32 bits corresponds to 32 record identifiers being intersected. That best case occurs when each predicate is unselective (i.e. many records match each predicate value), but all the predicates together are quite selective. Consider for example the query: "Find people who have brown hair, glasses, ages between 30 and 40, blue eyes, work in the computer industry, live in California, . . . ".

So, matrices are best when sets of predicates are dense (all, or nearly all, values in the Cartesian product are possible), bitmaps are best when predicates are neither dense nor individually selective. An intermediate approach (when there is insufficient density for matrices but many values in the Cartesian product are present) is to use multidimensional indexes. Multidimensional indexes such as quadtrees, R-trees and their successors are implemented as variable sized grids on a multidimensional space. The grids are of variable sizes because the population of points differs in different places in a hyperspace. For intuition, consider a map of equi-population rectangles of France. The rectangles would be far more dense in Paris than in the alps. Indexes like this work well for spatial data (where they are used to find the points contained in latitude-longitude quadrants). This alternative is little explored in the commercial arena except for geographical queries, however, because these schemes do not scale well with increasing dimensionality and commercial systems typically have far more than three dimensions.

(iii) Table Caching.

If one doesn't have the luxury to design new indexes on top of a database system (because one is not the implementer of that system) one can pre-compute a large number of anticipated aggregate queries and put them in tables. For example, if a large retailer frequently asks queries that sum the total sales across multiple stores or multiple products, one may store such information in special tables. The main cost of such a strategy is maintaining these tables in the face of updates. (Disk space is no longer a major factor.) In the example, every sale of item I at store S would have to update the total product sales table for I and the total store sales table for S. So, this strategy is worthwhile if there are few updates between queries. The strategy is not worthwhile if there are many.

(iv) Optimized Foreign Key Joins.

Most queries in multidimensional tables entail joins between a central "fact table" (e.g. sales detail) and a set of dimension tables (e.g. store description, product description, customer description). These are known as "foreign key joins" since the customer identifier in the sales table, for example, is a key of the customer description table. (A key is a value belonging to an attribute such that only one record has that value in the attribute.) One way to accelerate these joins is to create a linkage between fact table records and dimension records. This can be done in three basic ways (a) create an index that holds fact table record identifiers and dimension table record identifiers;

(b) create bidirectional pointers between fact table records and dimension table rows—this is what "object-oriented" databases do;

(c) replace the customer record identifiers in the fact table by offsets into the dimension tables.

Choice (a) is the most independent of changes in the physical organization of the tables and therefore is best for heavily updated systems, because changes to the dimension table can be reflected in the index to that table alone. Choice (b) is the least flexible to physical reorganization, because reorganizing a dimension table would entail updating the fact table. Choice (c) is a compromise of the two in that certain physical reorganizations can be done to the dimension tables (e.g. changing its position on disk) without changing the fact table. Examples of join optimization may be found in U.S. Pat. No. 5,548,754, U.S. Pat. No. 5,671,403, U.S. Pat. No. 5,724,568, U.S. Pat. No. 5,752,017, U.S. Pat. No. 5,761,657 and U.S. Pat. No. 5,822,747.

(v) Approximating the Result

Since most people use data warehouses to get strategic aggregate information, many would be happy with a fast approximation as long as it has error bounds. Typical work in this area is illustrated by U.S. Pat. No. 5,870,752, which shows how to estimate aggregate results in data warehouses while giving error bounds. The basic problem is that sampling all tables and then doing aggregates does not work in general. For example, if one wants to join R and S on their keys, then taking a 1/10 sample of each will give a size that is 1/100 of the size of the real join if the samples are random. So, one must be more clever. The idea is to take an initial set of tables R, S, T, . . . that are linked by foreign key joins. Suppose for example that R is the fact table and the others are dimension tables. Take a sample of R and then perform all these foreign key joins based on the sample giving R', S', T', . . . . Now, if a query involves R, S, T and includes the foreign key links among these, then the query can be done with great accuracy on R', S', T'. The error can be estimated by considering the result obtained by several partitions of R' and looking at their variance.

An object of the present invention is to propose an alternative method of organizing a database management system, which enables an efficient query processing.

SUMMARY OF THE INVENTION

The invention proposes a method of organizing information in a database system, wherein a group of attributes is defined and words of a collection of data are assigned to said attributes. The group of attributes is divided into a plurality of sub-groups each associated with a respective data table, each data table having a column for each attribute of the associated sub-group and rows for containing data table records comprising at least one word assigned to an attribute of the associated sub-group. Links are defined between the data tables records, each link having a target table and a corresponding source table having a link column containing link values each designating a record of said target table. Each of said link values represents a link between the record of the source table including said link value and the record of the target table designated by said link value. The method comprises the steps of:

allocating respective identifiers to data graphs, wherein each data graph represents related attribute values respectively assigned to the attributes of said group, wherein each attribute value of a data graph is either a default value or a word of said collection of data, and wherein the words of each data graph are from linked data table records;

storing a plurality of word thesauruses respectively associated with attributes of said group, wherein for each word assigned at least once to an attribute in the collection of data, the word thesaurus associated with said attribute has a respective entry containing said word; and storing data representing data graph identifier lists respectively associated with the word thesaurus entries, wherein the data graph identifier list associated with a thesaurus entry relating to a word assigned to an attribute includes any identifier allocated to a data graph having said word assigned to said attribute.

The invention further proposes a method of processing queries in a database system, wherein a group of attributes is defined and words of a collection of data are assigned to said attributes, the group of attributes being divided into a plurality of sub-groups respectively associated with a plurality of data tables having independent numbers of records, with links between respective records from the data tables. Identifiers are respectively allocated to data graphs, each data graph representing related attribute values respectively assigned to the attributes of said group, each attribute value of a data graph being either a default value or a word of said collection of data. A plurality of thesauruses each associated with a respective attribute of said group and data representing data graph identifier lists respectively associated with entries of said thesauruses are stored. Each thesaurus associated with one attribute is defined with reference to a partition into subsets of a set of words which can be assigned to said one attribute and has a respective entry for each subset including at least one word assigned to said one attribute in the collection of data, the data graph identifier list associated with said thesaurus entry including any identifier allocated to a data graph having a word of said subset assigned to said one attribute. The method comprises the steps of:

analyzing query criteria to determine a combination involving thesaurus entries relevant to the query;

determining a matching data graph identifier list based on said combination and on the stored data representing the data graph identifier lists associated with said relevant thesaurus entries;

processing said matching data graph identifier list to output a response.

The invention further proposes a database system implementing a method as outlined above, and computer program products having instructions for carrying out such method.

BRIEF DESCRIPTION OF THE DRAWINGS

FIGS. 1–3 show an example of data structure as typically used in a conventional relational database system.

FIG. 8 is a flat file representation of the data tables of FIGS. 1–3.

FIG. 9 shows a link table as used in an embodiment of the invention.

FIGS. 10A–H show the contents of thesauruses corresponding to the data tables of FIGS. 1–3.

FIGS. 11A–14A, 11G–14G and 11H–14H show other representations of the thesauruses of FIGS. 10A, 10G and 10H, respectively.

FIGS. 15–16 illustrate the data stored in a data container in connection with the thesauruses of FIGS. 14A, 14G and 14H.

FIGS. 25–32 are tables showing a way of storing thesauruses constructed from the example of FIGS. 1–3.

FIGS. 34A and 34B are tables showing an alternative embodiment of the tables of FIGS. 31–32.

FIGS. 34C and 34D are another representation of the tables of FIGS. 34A and 34B.

FIG. 42 is a flow chart of a recursive function FNODE called to in the procedure of FIG. 41.

FIGS. 58–61 show tables which may be stored to cooperate with the tables of FIGS. 25–34.

FIGS. 66 and 67 show the contents of an exemplary output table used to provide a query response.

DESCRIPTION OF PREFERRED EMBODIMENTS

VIRTUAL DATA GRAPHS

Figure 4:
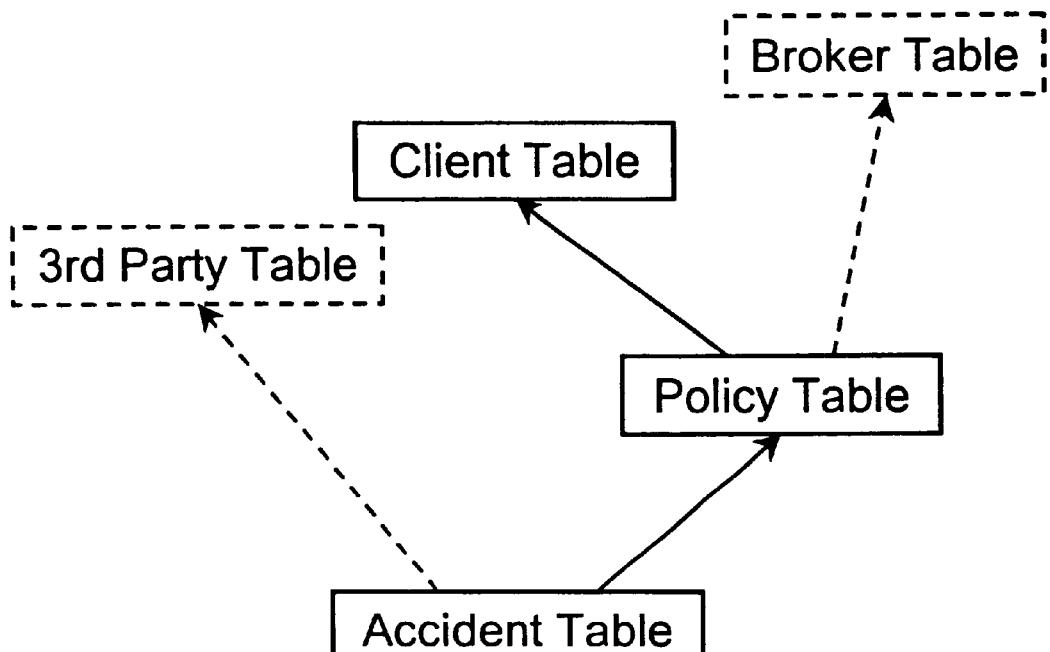
FIG. 4 is a diagram representing a data table tree in the example of FIGS. 1–3.

FIGS. 1–3 illustrate a collection of data which can be stored in a computer memory coupled with a processor arranged for running relational database management programs. This example will be referred to in the following description to give an illustration of the principles and embodiments of the invention where appropriate.

FIGS. 1–3 show a conventional type of data organization in a database system. The illustrated system handles data relevant to a hypothetical insurance company which manages policies for its clients. The data are organized in three tables relating to the clients, policies and accidents as shown in FIGS. 1–3, respectively.

From a logical point of view, each data table consists of a two-dimensional matrix, with rows corresponding to respective records in the table and columns corresponding to respective data attributes of the records or structural features of the database (the latter type of column typically contains either local record identification keys or foreign keys designating records in a target table).

It will be appreciated, however, that for large databases the actual storage of the data in a memory medium, e.g. a magnetic disc, is frequently performed otherwise: each row typically has a memory address where the corresponding attribute values or keys are stored in the order of the columns and separated by predetermined symbols such as the encoded character "\".

In our simplified example given to facilitate the explanation of the proposed data structures, the tables are of modest size. In practice, there are usually more tables and more attributes (columns) per table (notwithstanding, one ore more tables could also have a single column). Moreover, the data tables generally include much more records, up to thousands or millions of rows depending on the application.

In that example, the database a group of seven attributes distributed into three sub-groups corresponding to the three data tables. Each attribute has a column in the data table corresponding to its sub-group. The client data table (FIG. 1) has three attributes, i.e. client name, birth year and gender. The policy data table of FIG. 2 has two attributes, i.e. policy type ("car" or "house") and policy effect date, and a link column to the client table. The accident data table of FIG. 3 has two attributes, i.e. date of accident and amount of damages incurred in a given currency, and a link column to the policy table.

In a given data table, each record/row has a unique identifier, referred to as a row-ID. This identifier corresponds to the memory address where the record is stored, usually through a conversion table. It may be stored as an identification key in a column of the data table for the purposes of unique row identification, but this is not compulsory. In our example, the row-ID's are integer indexes starting from zero for each data table, and they are not stored explicitly in a column of the table.

Some of the tables are linked together, as indicated in the last column of FIGS. 2 and 3. Two tables are directly linked if one of them (source table) has a link column provided for containing foreign keys designating records of the other one (target table).

Those foreign keys, hereafter called links, reflect the hierarchy and organization of the data handled in the relational database system. In our example, each accident dealt with by the insurance company is related to a certain policy managed by the company, hence the policy links of FIG. 3. Each policy is for a particular client of the company, hence the client links of FIG. 2. It will be noted that some links may be optional. For example, some accidents may involve third parties and if there is a separate table for third parties, then each record of the accident table may have a link to the third party table.

Each link typically consists of a row-ID in the target data table. For instance, the accident stored as row-ID=0 in the accident table of FIG. 3, which took place on Oct. 3, 1998 for an amount of 1,000 has a policy link pointing to the policy stored as row-ID=1 in the policy table of FIG. 2, i.e. it relates to a car policy subscribed on Sep. 9, 1998 by the client with row-ID=1 in the client table of FIG. 1, i.e. André, a man born in 1976. If the target table has other forms of record identification keys, for example compound keys, a link may also designate a target record as identified by such a key.

The construction of the links obeys a number of rules. In particular, the linked data tables have a directed acyclic graph structure such as a hierarchical tree organization illustrated in FIG. 4. A root table is defined as a data table for which no other data table has links pointing to its rows, such as the accident table of FIG. 3. In other words, a root table does not constitute a target table. Likewise, a leaf table is defined as a data table with no link column, such as the client table of FIG. 1. In other words, a leaf table does not constitute a source table. FIG. 4 shows only one root table, but the tree structure of the tables may have multiple roots.

It may happen in certain cases that a group of related data tables exhibit circular links (for example, the client table may have a link column to the accident data table to indicate the first, or last, accident undergone by each client). In such a case, the tree organization of the data tables is first restored by canceling one link of the circle. Which link should be cancelled is dictated by the semantics of the database (in the above example, the link from the client table to the accident table will naturally be cancelled).

Paths are defined in the data table tree from the root table(s) to the leaf tables. Each path from a root table to a leaf table is defined by a link column of the root table pointing to the leaf table, or by a succession of link columns via one or several intermediate tables.

In FIG. 4, two leaf tables have been added (dashed lines) to show a tree structure with multiple branching (the simplified example of FIGS. 1–3 provides a tree with a single path shown with a solid line). The added leaf tables are a third party table as mentioned previously and a broker table which is a target table from the policy table, to contain data about the brokers who commercialize the policies.

Figure 5:
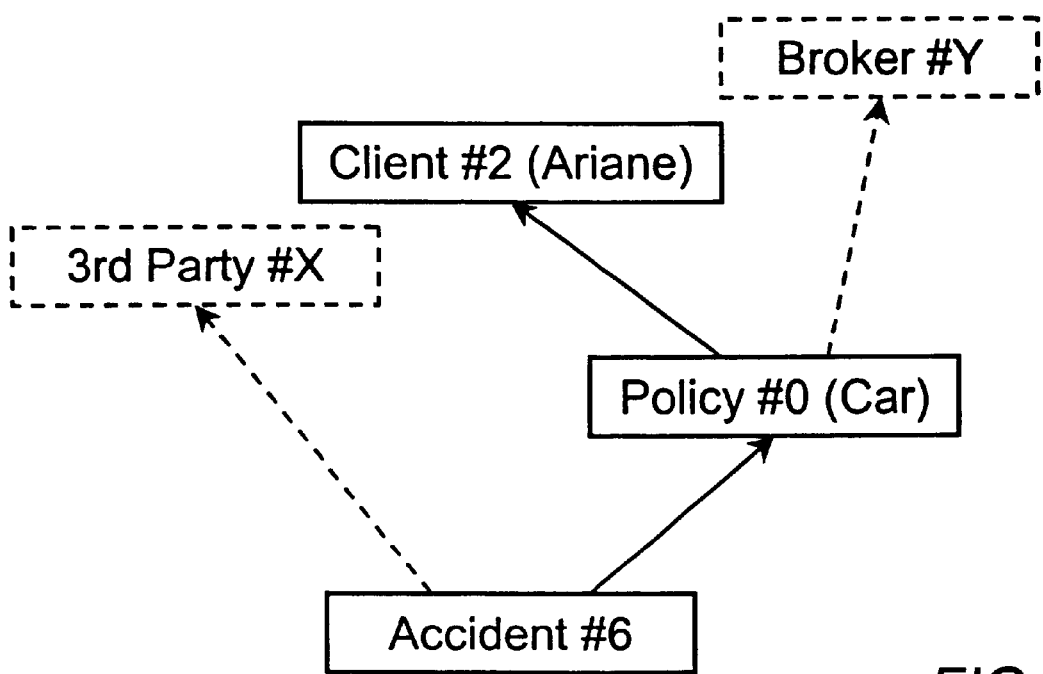
FIGS. 5–7 are diagrams showing respective data graphs constructed with the tree of FIG. 4 and the data of FIGS. 1–3.
Figure 6:
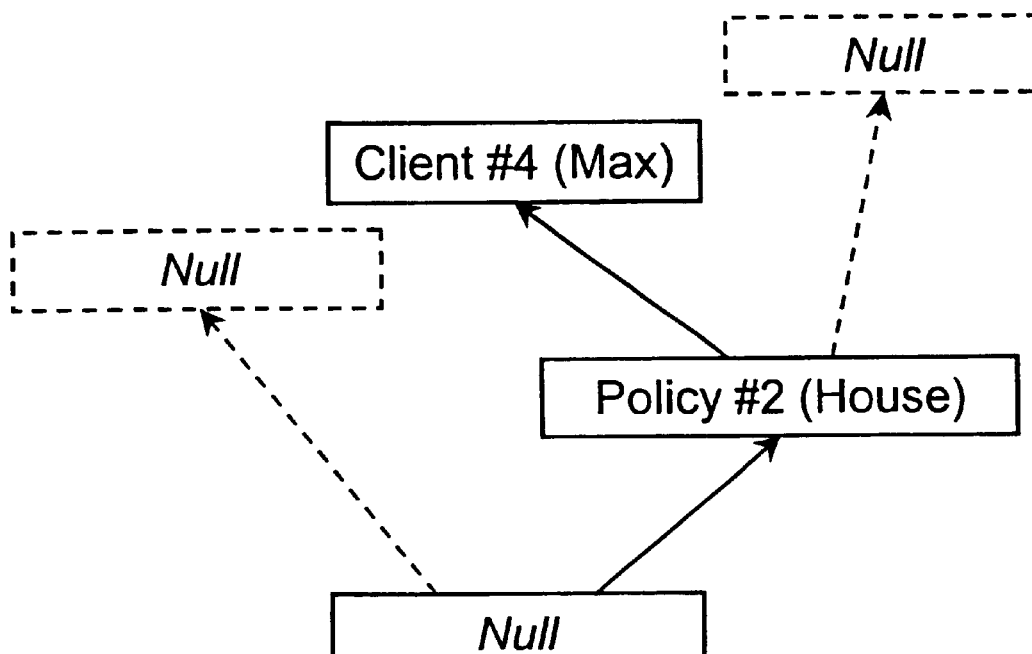
Figure 7:
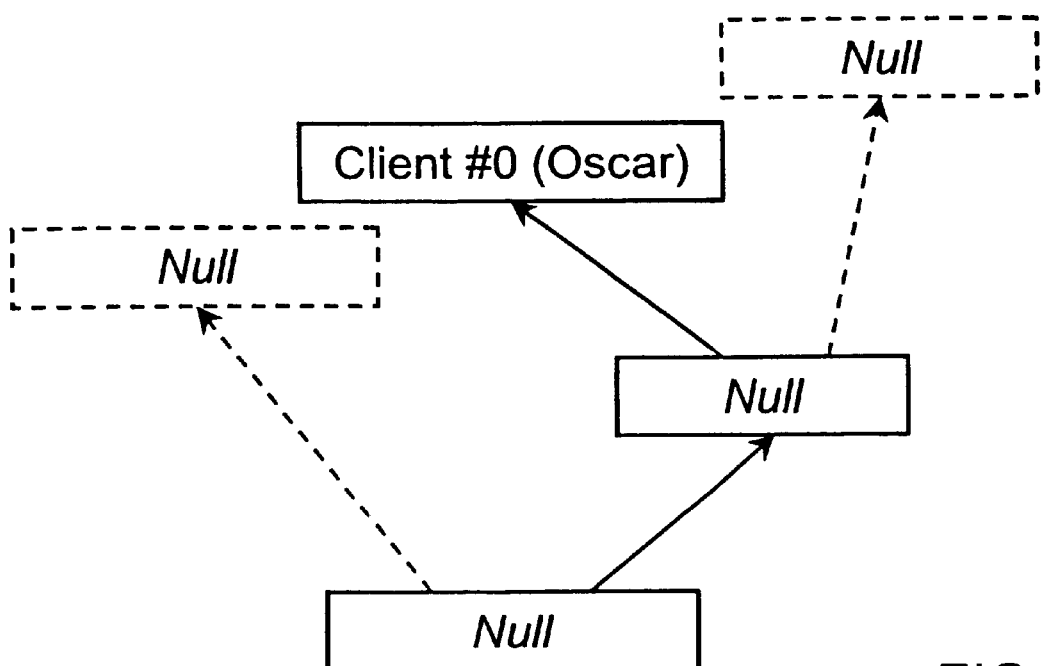

The data table records that are linked together can be viewed in a similar tree representation (FIGS. 5–7). The record tree of FIG. 5 shows that the accident #6 was related to policy #0 (car) subscribed by client #2 (Ariane) through broker #Y and involved third party #X. The solid lines represent respective links from the data tables of FIGS. 2 and 3.

The record tree of FIG. 6 further shows a Null record which may added in the accident table with a link to row-ID=2 in the policy table, for the reason that, as apparent from the last column of FIG. 3, no accident has occurred under policy #2 (subscribed by client #4 (Max) for his house).

A Null, or dummy, record stands for the absence of data. All its attribute values are default values (Null), which means "no value". The purpose of inserting such dummy records in the present scheme is to make sure that any valid record in any data table belongs to at least one record tree stemming from a record of a root table (FIG. 4).

A Null record may also be present in each data table which is a target table for at least one link column of a source table. When a row of the source table has no foreign key in the corresponding link column, the record tree(s) including that row is (are) completed with a Null at the location of said target table. This situation occurs for the broker table in the example illustrated in FIG. 6. To represent this, a default value (e.g. −1) can be written in the link column of the source table, whereby the Null record is implicitly present in the target table.

The Null records are inserted where appropriate in a process of scanning every single path in the data table tree from the leaf table of said path to the root table, i.e. downwardly in FIG. 4. When examining one source/target table pair in the scanning of a path, the target table row-ID values that do not occur in the relevant link column of the source table are first listed, and then for each missing row-ID value of the list, a new Null record is generated in the source table with said missing row-ID value in said link column.

If a Null record is thus inserted in a data table having several link columns, the Null record receives the default value (−1) in any link column other that the one pertaining to the path being scanned, to indicate that the corresponding link is to a Null record in the target table. This situation occurs for the third party table in the example illustrated in FIG. 6.

Scanning the data table tree from the leaves to the root is important. Otherwise, Null records containing links to other Null records in a target table might be overlooked. An example is shown in FIG. 7 which shows a record tree relating to client #0 (Oscar) who has no (more) policy: the accident table contains a Null record pointing to another Null record of the policy table which, in turn, points to client #0; the root of the record tree would not be in the root (accident) table if the paths were scanned upwardly.

In a conventional database organization as shown in FIGS. 1–3, the link keys are provided to optimize the memory usage. To illustrate this, reference may be made to the flat file shown in FIG. 8, which has exactly the same informational content as the three data tables of FIGS. 1–3 (the third party and broker tables are ignored in the sequel).

A flat file has a column for each one of the attributes (columns) of the data tables. For each complete record tree that can be constructed with the data table tree structure of FIG. 4, the flat file has a row which contains, in the relevant columns, the attribute values of all the records of said tree. The rows of the flat file are referred to herein as data graphs. Each data graph is identified by a flat file row-ID shown in the left-hand portion of FIG. 8. The record trees of FIGS. 5–7 are compact representations of the data graphs at row-ID's 6, 9 and 11, respectively.

Although the flat file representation is sometimes referred to the literature, it is of little practical interest for databases of significant size. The reason is that it requires excessive redundancy in the data storage.

For example, in our small-sized case, André's birth year and gender, as well as the details of his car policy are written three times in the flat file (row-ID's 0, 3 and 8), whereas they are written only once, along with link values, when the storage is in the form of data tables as in FIGS. 1–3. With databases of realistic size, such redundancy is not acceptable.

The database system according to the invention makes use of the flat file concept. However, it does not require the storage of the flat file as shown in FIG. 8, hence the concept of "virtual flat file" containing "virtual data graphs" (VDG). The term "virtual" refers to the fact that the flat file or data graphs need not be maintained explicitly in memory, although their data structure is used as a reference in the execution of the method.

In a particular embodiment of the invention, the flat file is reduced to a link table as shown in FIG. 9. Each row of the link table corresponds to a respective row of the flat file, i.e. to a record tree as shown in FIGS. 5–7.

The columns of the link table respectively correspond to the data tables of FIGS. 1–3. In other words, each column of the link table is associated with an attribute sub-group which is the sub-group of attributes allocated to the corresponding (target) data table. Each column of the link table contains link values (row-ID's) designating records of the corresponding target data table.

The row of the link table corresponding to a given data graph contains a default value (−1) in the column corresponding to any data table having a Null record in the record tree representing said data graph.

The data table row-ID's found in one row of the link table enable the retrieval of linked data from the data table, i.e. a data graph or part of it. All the links are represented in the link table. If one replaces the row-ID's stored in the columns of the link table of FIG. 9 by the attribute values stored in the identified rows of the respective data tables of FIGS. 1–3, one recovers the flat file of FIG. 8.

The proposed system further uses word thesauruses (FIG. 10A–G) each associated with a respective column of one of the data tables, i.e. with one of the attributes.

In a preferred embodiment, there is one word thesaurus for each attribute used in the database system. However, if some attributes are known to be never or almost never used in the query criteria, then it is possible to dispense with the thesaurus for such attribute.

Each word thesaurus associated with one column of a data table has an entry for each attribute value found in that column. Such attribute value is referred to herein as a "word". A word has one entry in a thesaurus, and only one, as soon as it occurs at least once in the associated data table column. The Null value is a valid word in the thesaurus.

The entries of each thesaurus are sorted on the basis of the attribute values. An order relationship is therefore defined for each attribute category. This requires attention when the attribute value fields of the thesaurus files are defined and dimensioned.

Typically, the words are in the ASCII format and their category is selected for each column among the categories "integer", "real" and "character string". Character strings are sorted according to the usual lexicographical order. A date field is preferably declared as a character string such as yyyy (mm) (dd) (FIGS. 10B, 10E and 10F), yyyy representing the year, mm the month (optionally) and dd the day in the month (optionally). The thesaurus sorting thus puts any dates in the chronological order. If the attribute category is "integer", the numbers are aligned on the right-hand digit, in order to provide the natural order relationship among the integer data values. If the attribute category is "real", the numbers are aligned according to their whole parts, with as many digits on the right as in the value having the longest decimal part in the column.

The Null value is at one end (e.g. at the beginning) of each sorted thesaurus.

Each entry E(W) for a word W in a thesaurus associated with a column C(T) of a data table T contains information for identifying every row of the flat file which has the attribute value W in the column corresponding to C(T). When the flat file is stored virtually in the form of a link table, the information contained in entry E(W) is used for identifying every row of the link table which, in the column corresponding to the data table T, has a link pointing to a row having the value W in column C(T).

In other words, with the contents of the entry E(W) in the thesaurus associated with column C(T), we can retrieve all the data graphs whose corresponding attribute has the value W.

Such contents represent a row-ID list pointing to rows of the (virtual) flat file, i.e. a data graph identifier list. Such list may be empty, in particular for the Null value in some of the thesauruses (as in FIGS. 10A–C).

Two alternative representations of the data graph identifier lists in the thesauruses are illustrated in FIGS. 10A–G for the seven attribute columns of FIGS. 1–3. The first one is the form of explicit integer lists.

The second (equivalent) representation is in the form of bitmap vectors whose length is equal to (or greater than) the number of rows in the virtual flat file, i.e. the number of data graphs. The bit of position i in a bitmap vector (i>0) indicates whether the integer i belongs (1) or not (0) to the row-ID list represented by the bitmap vector. In our simplified example, the flat file has 12 rows so that the bitmap vectors may be of dimension 12.

The above-described data structure, comprising a virtual flat file and sorted thesaurus files pointing to rows of the virtual flat file is referred to herein as a VDG structure.

The VDG structure provides a powerful tool for efficiently processing queries in the database.

The virtual flat file is a reference table which defines a unified algebraic framework for the entries of all the thesauruses. The query criteria are examined with reference to the relevant thesauruses to obtain a flat file row-ID list (or bitmap vector) which represents all data graphs matching the query criteria, if any. The results can then be delivered by accessing the link table rows pointed to in that row-ID list to read the links which appear in part or all of the columns in order to retrieve attributes values as desired for the result presentation.

The processing with reference to the thesauruses mainly consists in logical operations performed on the row-ID lists to which they point. If they are represented as integer lists, such operations can be reduced to basic merge, intersect and/or complement operations, which respectively correspond to Boolean OR, AND, NOT operations in the bitmap representation.

The VDG structure also provides an efficient tool for accessing the contents of the database, which does not require accesses to the data tables. This tool is well suited to queries having special result presentation features such as SORT, COUNT, DISTINCT, ORDER BY, GROUP BY, etc. clauses, and also for carrying out any type of calculation on the data values of the records which match the query.

EXAMPLE 1

As an illustration, consider the following query: find the client name and accident date for all car accidents that incurred damages higher than 900, and group the results according to the client name. The query may be processed as follows. First, all the flat file row-ID lists identified in the accident amount thesaurus entries relating to amounts higher than 900 (the five last rows of FIG. 10G) are merged, which yields the list {0, 1, 3, 5, 6, 7} (or the bitmap vector 110101110000 obtained by a bitwise Boolean OR). Then the intersection of that list with the row-ID list identified in the policy type thesaurus entry relating to the value "car" (the second row of FIG. 10D) is determined. The result list {0, 3, 5, 6} (or bitmap vector 100101100000 obtained by a bitwise Boolean AND) specifies the data graphs that satisfy the query criteria. Finally, the entries of the client name thesaurus (FIG. 10A) are read sequentially and when there is a non-empty intersection between the result list and the row-ID list identified in the client name thesaurus entry, the link table rows having their row-ID's in that intersection are read to retrieve the desired attribute values. In our case, the output would be: André [accident dates Oct. 3, 1998 (#0) and Jun. 12, 1999 (#3)], Ariane [accident date Dec. 9, 1999 (#6)] and Laure [accident date Dec. 12, 1999 (#5)].

The above type of processing is applicable to any kind of query. The response is prepared by referring only to the sorted thesauruses, which implicitly refer to the flat file framework. Once an output flat file row-ID list is obtained, the link table or the thesauruses can be used for retrieving the data of interest.

EXAMPLE 2

To further illustrate the outstanding performance of the VDG scheme, let us consider the query which consists in identifying any client who has had a car accident before the beginning of the civil year of his or her $35^{th}$ birthday. In a typical conventional system, all the records of the accident data table of FIG. 3 have to be read to obtain the date attribute and policy link values. For each accident record, the policy data table is read at the row-ID found in the policy link column to obtain the policy type attribute and client link values and then, if the policy type is "car", another access to the client data table is necessary at the row-ID found in the client link column to obtain the birth year attribute value. The latter value is compared with the date attribute value previously obtained in the accident table to determine whether the criteria of the query are fulfilled.

If the data tables are sorted beforehand on the basis of the attributes referred to in the query criteria, such conventional processing may be accelerated by limiting the number of disc accesses. This requires data table sorting every time records are added, deleted or amended, which is not practical when the collection of data is large. And it is possible only in specific cases dictated by the data table sorting rule.

For example, if the client and policy tables were respectively sorted on the basis of the birth year and policy type attributes, the preceding request could be processed in a less prohibitive time by accessing the data records in a suitable order and with the help of the computer cache memory. However, the tip would not apply to other similar queries (e.g., assuming an additional column in the policy table for containing excess amounts, the identification of all accidents for which the damage amount was more than ten times the excess amount would raise the same problems).

With the VDG scheme, the above illustrative query can be dealt with in a very efficient manner. By means of the client birth year thesaurus (FIG. 10B) and the accident date thesaurus (FIG. 10G), the computer identifies the {client birth year, accident date} word pairs which satisfy the date criterion, i.e. accident date earlier than beginning of client's birth year+35. This is done without worrying about whether the accident was undergone by the client. Such identification is relatively easy for any possible pair of attributes since any attribute likely to be referred to in queries has a sorted thesaurus. For each identified word pair, the intersection of the two flat file row-ID lists of the thesaurus entries is obtained. The resulting integer lists are merged. Then the computer intersects the row-ID list of the entry relating to the value "car" in the policy type thesaurus (second row in FIG. 10D) with the list {0, 1, 3, 5, 6, 8, 10} resulting from the merger. The resulting list{0, 3, 5, 6, 8} designates a set of matching rows in the link table, from which the relevant client names (André—3 times—, Laure and Ariane) are readily retrieved by accessing the client table records whose row-ID's appear in the matching rows and in the client column of the link table.

It is noted that, when processing a query, the link table is simply used as a mean to retrieve the data of interest. Different ways of achieving this retrieval function may be thought of.

A method is to keep the original data tables (FIGS. 1–3) in memory. However, it is worth noting that the link columns may be deleted from those data tables, since their contents are already present in the link table.

From the observation that all possible attribute values are stored in the corresponding thesauruses, another method is to store in the link table pointers to the thesauruses. The latter method reduces the required disc space since an attribute value has to be written only once, even if the value occurs frequently in a data table column. It enables to quickly retrieve attribute values which occur in a given flat file row without requiring the use of the original data tables.

For certain attributes, it may be interesting to store the explicit attribute values in the link table, i.e. like in the flat file. In particular, this may be interesting for numerical fields (usually of smaller size than character strings) whose values are very dispersed and which are often requested among the output attributes of a query response (e.g. money amounts). If those values are explicitly written in the link table, there can be an appreciable gain in the disc accesses required for fetching the output data, at the cost of a moderate increase in the needed disc space.

In the foregoing explanations, the link table is a sort of skeleton of the flat file, which is stored to facilitate the data retrieval once the list of flat file row-ID's matching the query has been determined by means of the sorted thesauruses.

Notwithstanding, storing a link table or any form of table reflecting the flat file structure is not strictly necessary. In an advantageous embodiment, the data graphs (or their portions requested for the result presentation) may be recovered from the thesaurus files only. To illustrate this, consider again Example 2. Once the result list {0, 3, 5, 6, 8} of matching virtual flat file rows has been obtained by processing the query criteria with reference to the thesaurus files, it is possible to scan the client name thesaurus and, for each word (client name), to intersect the flat file row-ID list represented in the thesaurus with the result list. If the intersection is non-empty, the word is included in the output. It may be accompanied with the intersection list to allow the user to quickly obtain further information from the relevant data graphs. This method requires the minimum memory space since only the thesaurus files need to be stored.

Even if a link table is stored, it may be advantageous, for certain queries, to retrieve the attribute values by scanning the thesaurus(es) as indicated hereabove rather than through the link table. This may occur, in particular, to perform computations on the data values when there is a relatively slow interface between the query processor and the data tables, e.g. an ODBC interface ("Open DataBase Connectivity").

Another advantage of the VDG scheme is that it provides a query processing engine which can co-exist with the data tables in their original form. Changes in the thesaurus entries are then done in response to corresponding changes in the original data tables. This is an interesting feature for users who find it important to keep their data in the form of conventional tables, because they do not want to be too dependent on a new system or because they need to access their tables through a conventional interface for other applications.

MACROWORDS

The above-described VDG's are advantageously completed with prefix thesauruses also referred to as macroword thesauruses.

Like the above-described word thesauruses, each macroword thesaurus is associated with one attribute, i.e. one column of one data table. In addition, it has a prefix length (or truncation length) parameter.

Each entry of the macroword thesaurus relates to a range of attribute values, and contains or points to data for identifying all the flat file rows having, in the column corresponding to said attribute, an attribute value which falls within said range. The range corresponding to the entry of the macroword thesaurus corresponds to a prefix value having the prefix length assigned to the thesaurus: any word beginning by such prefix value has its flat file row-ID list included in that of the macroword. If the prefix length is noted P, a macroword $C_1C_2 \ldots C_P$ is the set of all values of the attribute which begin by the P characters or digits $C_1C_2 \ldots C_P$. The limit case where the prefix length is the number of characters or digits of the value field (i.e. truncation length is zero) is the word thesaurus described previously.

In other words, the macroword thesaurus entry identifies the flat file row-ID list (or bitmap vector) corresponding to the merger of the flat file row-ID lists (or to the logical OR between the bitmap vectors) which are identified in the entries of the word thesaurus corresponding to the individual words encompassed by the macroword.

Each thesaurus (word or macroword) associated with an attribute AT can thus be defined with reference to a partition into subsets of the set of words which can be assigned to attribute AT in the relevant data table record. It has a respective entry for each subset including at least one word assigned to attribute AT, this entry being associated with a flat file row-ID list including any ID of a flat file row having a word of the subset assigned to attribute AT. In the case of a macroword thesaurus, the partition is such that each subset consists of words beginning by a common prefix. In the case of a word thesaurus, the partition is such that each subset consists of only one word.

As an example, FIG. 10H shows the accident amount macroword thesaurus for a truncation length of 3 characters. It is not necessary to repeat the Null entry, which is already in the word thesaurus. Such a macroword thesaurus provides substantial economy in terms of disc accesses and flat file row-ID list mergers. For example, for obtaining information about the accidents that had an amount between 1,000 and 1,999, one access to the macroword thesaurus of FIG. 10H is enough to obtain the relevant list of flat file row-ID's {0, 2, 3}, whereas it would require two thesaurus accesses and one merge operation with the non-truncated accident amount thesaurus of FIG. 10G. The gain can be quite substantial for large databases and attributes of high cardinality, i.e. with many possible attribute values.

Macroword thesauruses based on prefix or truncation lengths provide a great flexibility in the processing of range-based query criteria. It is possible, for a given attribute, to provide several macroword thesauruses having different prefix lengths in order to optimize the processing speed of various queries.

Typically, a date attribute may have a yearly macroword thesaurus (prefix length=4) and a monthly thesaurus (prefix length=6) in addition to the (daily) word thesaurus. Any other kind of attribute (numbers or text) may lend itself to a convenient macroword thesaurus hierarchy.

VDG COMPRESSION

With the VDG scheme as described so far, the memory space required by the thesaurus files is not optimized.

The row-ID's being integers typically coded with 32 bits, if a word occurs N times in the attribute column of the flat file of FIG. 8, n×32 bits are needed to explicitly encode its flat file row-ID lists. If the flat file has $N_{max}$ rows (for example millions of rows), $N_{max}$ bits are needed for each entry in the bitmap representation, for whatever value of N.

Generally speaking, for an attribute of high cardinality, such as the date or amount attributes (FIGS. 10E–G), the flat file row-ID lists are scarcely filled, so that the explicit integer list representation is satisfactory in terms of memory requirement, while the bitmap representation can be prohibitive for large flat files. Other attributes have a low cardinality, such as the client gender or policy type attribute in our example (FIGS. 10C–D), whereby the bitmap representation is well suited, while the integer list representation is unfavorable.

It is possible to adopt for each thesaurus a representation which is believed to be the most appropriate in order to reduce the needed memory space. However, this requires an a priori knowledge of how the attribute values will be distributed. Many attributes can be ambiguous in this respect, and the optimization may also be difficult for different macroword sizes relating to a given attribute.

Bitmap compression methods as known in the art (e.g. U.S. Pat. No. 5,363,098 or U.S. Pat. No. 5,907,297) may also be used. A problem is that those methods are designed essentially for optimizing the storage volume, not the processing speed. In the VDG context, the advantage of reduced memory space may be counterbalanced by the disadvantage of longer response times due to multiple compression and/or decompression operations when processing a query. To the contrary, it is desired to increase the processing speed as much as possible.

In the preferred implementation of the VDG scheme, the compression of the flat file row-ID lists in the thesauruses is carried out by dividing a range covering all the row-IDs of the flat file into subsets according to a predetermined pattern. Then, each flat file row-ID list of a thesaurus entry is encoded with data for locating in the pattern each subset of the range which contains at least one row-ID of the list, and data representing the position of each integer of the row-ID list within any subset thus located.

The row-ID range $[0, N_{max}[$ is selected to be equal to or larger than the number of rows in the flat file. The "predetermined pattern" conveniently defines the "subsets" as consecutive intervals $[0, D1-1[, [D1, 2\times D1-1[$, etc., having the same length D1 within said range.

The coding data can then be produced very simply by Euclidean division. For any positive numbers x and y, we note $\lfloor x \rfloor$ the integer equal to or immediately below x, $\lceil x \rceil$ the integer equal to or immediately above x, and x mod y=x−$\lfloor x/y \rfloor$. A Euclidean division by D1 is performed for each row-ID N of the input list. The quotient $Q1=\lfloor N/D1 \rfloor$ indicates the rank of the corresponding interval in the pattern ($Q1 \geq 0$), while the remainder R1=N mod D1 represents the position of the row-ID within the interval ($0 \leq R1 < D1$). The decoding is also very simple: from the encoding data Q1 and R1 for an item of the coded list, the row-ID is $N=Q1 \times D1+R1$.

Advantageously, the interval length is a whole power of 2, so that the Euclidean divisions are performed by straightforward bit shift operations. A typical length is $D1=2^7=128$.

The encoding method can be expressed equivalently by referring to the bitmap representation. Each bitmap vector is divided into bitmap segments (or other types of bit groups if a more tortuous pattern is referred to), and for each segment containing at least one "1", the coding data include the rank (=Q1) and the contents of the segment. The all zero segments are discarded.

FIGS. 11A, 11G and 11H are other presentations of the client name and accident amount word thesauruses of FIGS. 10A and 10G and of the accident amount macroword thesaurus of FIG. 10H, with D1=3 (a non-typical value of D1 used here for conciseness). The second columns are copied from the last columns of FIGS. 10A, 10G and 10H, respectively, with blanks to highlight the segmentation of the bitmap vectors. The third columns show the lists of ranks (=Euclidean quotients Q1) resulting from the encoding, and the fourth columns show the corresponding non-zero bitmap segments (having a 1 at the position of each remainder R1).

It is observed that for each thesaurus entry, the ranks Q1 form an integer list included in the range $[0, N1_{max}[$, with $N1_{max}=\lceil N_{max}/D1 \rceil$.

According to a preferred embodiment of the invention, a similar type of encoding can be applied to those rank lists. The encoding process may be iterated several times, with the same encoding pattern or different ones. In particular, the interval lengths could vary from one iteration to the next one. They are preferably whole powers of 2.

The ranks and bitmap segments obtained in the first iteration with the interval length D1 are called layer 1 (or L1) ranks and layer 1 segments (FIGS. 11A, 11G and 11H). Those obtained in the second iteration, with an interval length noted D2, are called layer 2 (or L2) ranks and layer 2 segments (FIGS. 12A, 12G and 12H), and so forth.

In the following, n denotes the number of encoding layers numbered k with $1 \leq k \leq n$, layer k having a divisor parameter Dk, and the product $$\Delta k = \prod_{k'=1}^{k-1} Dk'$$

being the number of flat file row-ID's encompassed by one bit of a layer k bitmap segment ($\Delta 1=1$).

In the simplified case illustrated in FIGS. 12A, 12G and 12H, n=2 and the second encoding layer uses D2=2. The columns labeled "L1 Bitmap" are a bitmap representation of the layer 1 rank lists, with blanks to highlight the further bitmap segmentation leading to the layer 2 data shown in the last two columns.

The layer 1 and layer 2 coding data are summarized in FIGS. 13A, 13G and 13H which show a possible way of storing the flat file row-ID list information. It is noted that storage of the layer 1 rank lists is not strictly necessary since those list are completely defined by the layer 2 data. However, it will be appreciated further on that such storage somewhat simplifies the query processing in certain embodiments of the invention.

The same kind of encoding may be used for any one of the word and macroword thesauruses. However, it is also possible for some of them to retain a conventional type of row-ID list storage (explicit integer lists or bitmap vector), i.e. n=0. In particular, the explicit integer list representation may remain well-suited for scarcely distributed thesauruses.

FIGS. 14–16 show another possible way of storing the information contained in the thesauruses of FIGS. 13A, 13G and 13H. For each encoding layer, the thesaurus entries are associated with respective chains of records in a data container (FIG. 15 for layer 1 and FIG. 16 for layer 2) including a rank file and a bitmap segment file. Each record in the layer k rank file ($1 \leq k \leq n$) has a field for receiving a rank value (between 0 and $Nk_{max}-1$) and a field for receiving an address of a next record in the rank file. A default value in the next address field (0 in the example shown) means that the record is the last one of the chain. The bitmap segment file (right-hand parts of FIGS. 15 and 16) is addressed in the same manner as the associated rank file. In each record for layer k, its has a bitmap field of Dk bits for receiving the bitmap segment associated with the rank stored in the corresponding record of the rank file. It will be appreciated that the rank values and next record addresses could also be stored in two separated files having a common addressing rather than in two fields of the same file.

For each VDG coding layer k, an entry in a thesaurus has a head address field for containing an address in the layer k rank file where a first rank record concerning the entry is stored. From there, the relevant rank chain can be retrieved. For example, Max's layer 1 ranks 0, 2 and 3 (FIG. 13A) are retrieved by accessing the rank file of FIG. 15 at the address 29 indicated in the head address field of the thesaurus entry (FIG. 14A), and then at the chained addresses 27 and 15. In parallel, the corresponding layer 1 bitmap segments 001, 010 and 100 are read. FIGS. 15 and 16 also show that the rank and bitmap segment files have an additional chain consisting of free records (addresses 31/32/33/17 in FIG. 15 and 29/8/17/24 in FIG. 16). The head of the latter chain is allocated to write new coding data when necessary.

Preferably, the thesaurus entry further has a layer 1 tail address field for containing the address in the rank file of the last record of the chain pertaining to the entry, as shown in the third columns of FIGS. 14A, 14G and 14H. This facilitates the updating of the encoding data storage. For instance, the insertion of a new layer 1 rank for Max, with a corresponding layer 1 bitmap segment, may proceed as follows: the head of the free record chain is located (address 31); the address (32) found in its next record address field becomes the address of the new free record chain head; the records at address 31 receives the new layer 1 rank in the rank field, the end-of-chain flag (0) in the next address field and the new bitmap segment in the segment field, respectively; the address obtained in the tail address field of Max's thesaurus entry (15) is accessed directly (bypassing the potentially long path along the chain) to write the address (31) of the new data, which is also written into the tail address field of Max's thesaurus entry. The fact that the layer 1 rank is a new one for Max can be determined from the layer 2 data: if the layer 2 updating performed previously has changed a "0" to a "1" in the layer 2 bitmap segment, then the layer 1 rank is a new one for the word; otherwise the layer 1 rank is already present in Max's layer 1 rank list which has to be scanned until said layer 1 rank is found. If there are more than two encoding layers, it is possible to provide a layer k tail address field in the thesaurus entries for k>1 and to proceed in the same manner for new layer k ranks as determined from the layer k+1 data. However the main gain in doing so lies in layer 1 which has the longest chains.

In FIGS. 15 and 16, the coding data coming from three heterogeneous thesauruses (client name thesaurus, accident amount word thesaurus and accident amount macroword thesaurus) are stored in the same data containers. The other thesauruses are ignored for clarity of the figures. In fact, all the coding data of one layer may be piled up in the same rank/bitmap segment files, irrespective of the word or macroword thesaurus where they come from. Any entry of any thesaurus will then point to a respective record chain in those two coupled files.

In order to optimize the processing speed, it is preferable to sort the rank and bitmap segment files for disc storage, so as to group the records based on the thesaurus entries to which they pertain. The advantage in doing so is that the reading of the coding data for one thesaurus entry requires fewer disc accesses, by means of the computer cache memory which enables the simultaneous RAM loading of a group of physically contiguous records. A batch execution of that optimization sorting, which requires a simultaneous update of the thesaurus entries (head and tail address fields), may be used to avoid untimely resource usage.

In order to facilitate this optimization, it is preferable to use separate data containers for different thesauruses, rather than common files. This reduces the amount of data to be sorted each time. In particular, using one rank/bitmap segment file pair for each thesaurus and each coding layer seems appropriate.

A further possibility is to provide separate rank and bitmap segment files for the different thesaurus entries. This requires a higher number of file declarations in the memory. But it is optimal in terms of processing speed without requiring the above-mentioned optimization sorting operation. It also eliminates the need for storing head and tail addresses pointing to record chains: the thesaurus entries simply designate data containers where the rank and bitmap segment data are stored.

Figure 17:
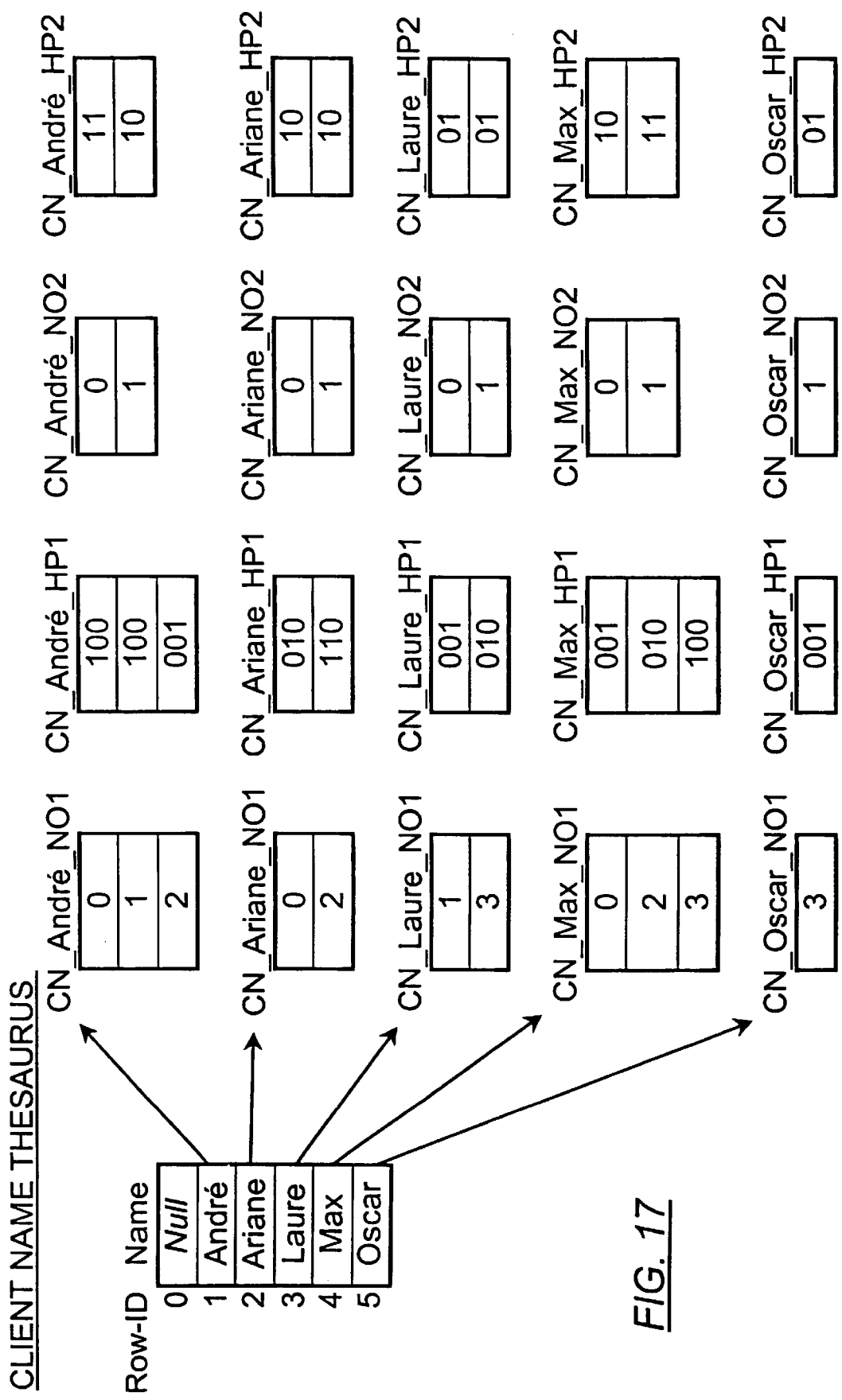
FIG. 17 shows another possible structure of the thesaurus of FIGS. 10A–14A.

FIG. 17 illustrates how the data of the client name thesaurus may be arranged in the latter case. The thesaurus has an index register where the thesaurus words are kept sorted. For each word and each coding layer k, two files are provided in the system memory, one for containing the rank data (noted NOk), and one for containing the bitmap segments (noted HPk). The attribute value (André, Ariane and so on) can be used to name the corresponding files. The storage is less compact than with common data containers as shown in FIGS. 15–16, but access to the data relating to one word can be very quick without requiring any sorting.

An arrangement as illustrated in FIG. 17 is preferred if the operating system does not suffer too severe limitations regarding the number of files that can be managed in the memory, and if the overhead due to the storage of numerous individual files is not a problem. Otherwise, it is possible to group the rank and bitmap segment files relating to different (macro)words, or even to different thesauruses, as indicated before.

In addition to enhanced data compression, the multi-layer row-ID list encoding method provides a substantial acceleration of most query processing. The processing is first performed in the higher layer, and the results are passed to the lower layers. The coding scheme preserves a common structure for the entries of all thesauruses in each layer, imprinted by the original structure imparted by the virtual flat file. Accordingly, collective logical operations between integer lists or bitmaps originating from different thesauruses are possible in the various layers. The results obtained in a layer k+1 provide a sort of filter for executing the minimum number of operations in layer k, which enhances the processing efficiency, particularly for multi-attribute query criteria.

This enhancement is hardly visible on our simplified example, which is too small. Consider the following request: find Max's accidents for an amount of 1,300 (there is no response). The direct layer 1 processing is to read and decode the relevant layer 1 data to rebuild the bitmap vectors of the words "Max" and "1,300" in the thesauruses of FIGS. 10A and 10G, and to compute the logical AND of the two bitmap vectors. Exactly the same kind of processing in layer 2 requires fewer read operations since there are fewer layer 2 records, and avoids any layer 1 processing because there is no overlap between the two layer 1 rank lists for the words "Max" and "1,300" ($2^{nd}$ column of FIGS. 13A and 13G). If the same request is made with the amount value 10,000 instead of 1,300, the layer 2 results may reduce the layer 1 processing to loading the two layer 1 bitmap segments corresponding to rank 0 (the other ranks are filtered out) and computing the AND between those segments.

With more representative values of D1 and D2 (e.g. D1=D2=128) and a large size database, this filtering principle between two layers provides a spectacular gain. Large pieces of bitmap vectors disappear from the layer 1 (or generally layer k≧1) processing owing to the groupwise filtering achieved in layer 2 (layer k+1).

VDG CREATION AND MANAGEMENT

Figure 18:
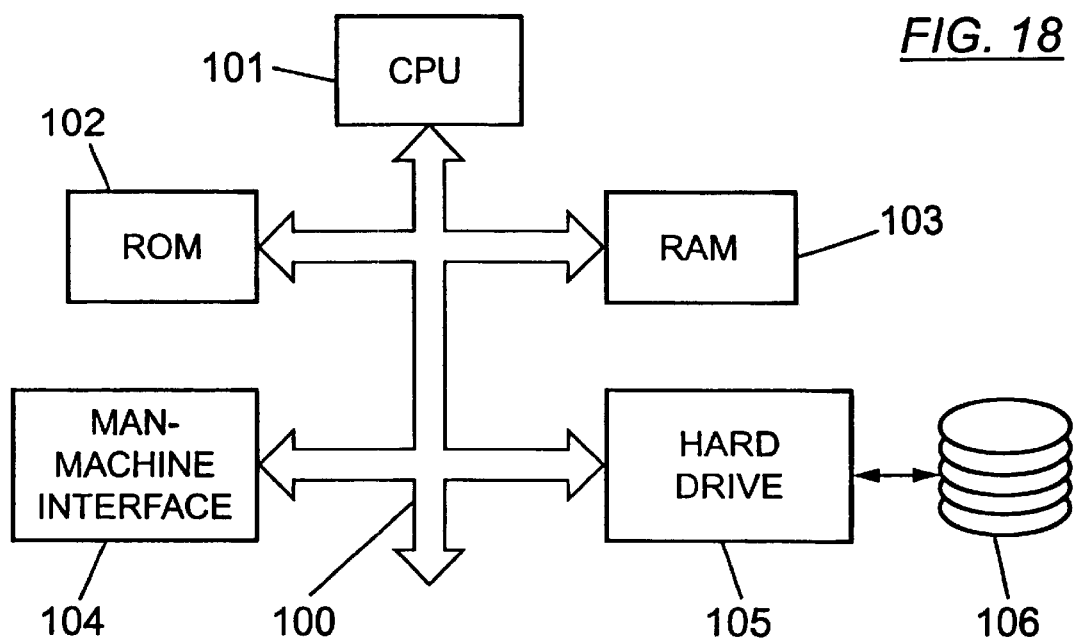
FIG. 18 is a block diagram of a computer system suitable for implementing the invention.

FIG. 18 shows an exemplary layout of a computer system suitable for forming the hardware platform of a system in accordance with the invention. That hardware platform may be of conventional type. It has a bus 100 for exchanging digital signals between a plurality of units including:

- a central processing unit (CPU) 101;
- a read only memory (ROM) 102 for containing basic operating instructions of the CPU;
- a random access memory (RAM) 103 which provides a working space for the CPU 101, dynamically containing program instructions and variables handled by the CPU;
- a man-machine interface 104 which comprises circuitry for controlling one or more display devices (or other kind of devices for delivering information to humans) and circuitry for inputting information to the computer system from acquisition devices such as a keyboard, mouse, digital pen, tactile screen, audio interface, etc.;
- a mass storage device for storing data and computer programs to be loaded into RAM 103. In the typical example shown in FIG. 18, the mass storage device comprises a hard drive 105 for storing data on a set of magnetic discs 106. It will be appreciated that any kind of mass storage device, magnetic or optical, may be used in implementing the invention.

For implementing the present invention, the hard drive unit 105 is used for storing data structures as described in the foregoing and programs described in more detail herebelow. The program instructions and the useful data are loaded into the dynamic storage RAM 103 for processing by CPU 101. The query results are stored in the hard drive and/or delivered to a user through the man-machine interface 104 or through a network interface (not shown) in the case of a remote access.

The mass storage device 105 is suitable for the storage of large amounts of data, but with an access time significantly longer than the RAM 103. This is due to the time needed to put the reading head of the hard drive in front of the desired disc location. As well-known in the art, when a disc access is performed in hard drive 105, the data that are actually read form a block of data stored contiguously on the hard disc, which is loaded in a portion of RAM 103, called "cache" memory. When it is known that the CPU is likely to need different data pieces simultaneously or in a short period of time, it is convenient to arrange the data storage organization such that those data belong to the same block so as to be retrievable by a single disc access, which minimizes the processing time.

The system of FIG. 18 may be a personal computer (PC) of the desktop or laptop type. It may also be a workstation or a mainframe computer.

Of course, other hardware platforms may be used for implementing the invention. In particular, those skilled in the art will appreciate that many calculations performed on the bitmap segments and vectors lend themselves to efficient implementation by means of dedicated logical circuits or coprocessors. Furthermore, parallel computation is very natural in this system.

The process of creating the VDG data structure is now described with reference to FIG. 19 from input data tables being in the form shown in FIGS. 1–3, which is the most usual data representation. That creation process is thus suitable for creating the VDG structure from legacy databases. From the VDG updating rules described further on, it will be understood that VDG's may also be created directly from brand new data.

In certain databases, the data tables have their rows characterized by compound keys rather than row-ID's as in FIGS. 1–3. A compound key is the concatenation of the contents of several key fields of a data table. In a source data table, the records include foreign keys which designate the compound keys of records of a target table. If such a legacy databases is handled, the first stage of the VDG creation procedure is to translate the compound keys into single keys such as the row-ID's shown in FIGS. 1–3. This (optional) first stage is illustrated in box 120 in FIG. 19.

The second stage 121 consists in completing the data tables with Null records where appropriate. This is performed as discussed hereabove with reference to FIGS. 4–7, by scanning every path in the data table tree from the leaf table of the path to the root table. A link to a Null record is denoted by the default value −1. As a result, for each source/target table pair, all the row-IDs of the target table are present at least once in the source table link column.

The next stage 122 comprises the creation of the word thesauruses. The relevant attributes, i.e. those likely to be used in query criteria (it may be all of them), are determined. For each of the determined attribute, the word format (type and length) is selected. For each word thesaurus, the attribute values occurring in the associated column, including the Null value, are read from the data table stored in the hard drive 105. Repeated values are eliminated, and the remaining values are sorted based on the attribute values and the order relationship applicable to the type of attribute. This sorting operation may be performed in successive data record blocks transferred from the hard drive 105 to the CPU cache memory, with an external sorting after processing each block.

The VDG creation procedure then proceeds to a stage 123 of deciding the relevant macroword formats. Some word thesauruses will not give rise to macroword thesauruses (for example, the client gender thesaurus of FIG. 10C needs no macrowords). In contrast, other thesauruses, for example corresponding to date or amount attributes, will give rise to several macroword thesauruses having different truncation lengths. If the values found in an attribute column include characters strings beginning by most letters of the alphabet, it is convenient to create a macroword thesaurus with a prefix length of one character. The decision about the suitable macroword hierarchy may be made by a database manager and input through the man-machine interface 104. It may also be an automatic process, based on the attribute type and/or the distribution of the words in the thesaurus. In stage 123, the macroword thesauruses are also created, directly in sorted form, by applying the truncation to the words of the corresponding word thesauruses and deleting the repeated macrowords.

Each entry of a macroword thesaurus preferably indicates the first word (or lower level macroword) of the lower level thesaurus included in the range covered by the macroword. This indication of the lowest word (or macroword) whose prefix matches the macroword under consideration reduces the time needed to access the "children" of that macroword since the first one can be accessed without scanning the lower level thesaurus. Alternatively, or cumulatively, the highest word (or lower level macroword) whose prefix matches the macroword could be indicated in the macroword thesaurus.

In stage 124, the rows of the link table and the entries of the individual word thesauruses are generated. This is preferably done without storing the whole flat file (FIG. 8), for example according to the algorithm illustrated in FIG. 20, in the case of an encoding with n=2 layers.

In the embodiments illustrated in FIGS. 20–32, it is assumed that each entry of a thesaurus for an attribute value contains an index WI which forms a row-ID in an auxiliary table of the type shown in FIG. 14A, 14G or 14H, pointing to coding data containers of the type shown in FIGS. 15 and 16. For each encoding layer k, this auxiliary table has:

a column for containing the address, noted AT_Fk(WI), of a first record concerning the thesaurus word of index WI in the coding data container relating to layer k;

a column for containing the address, noted AT_Lk(WI), of the last record of the chain for thesaurus word of index WI in the data container; as indicated before, the latter column may be present only for layer 1.

As mentioned previously, the data container for a given coding layer may be shared between all or part of the thesauruses, or it may be associated with each individual thesaurus. A record at address AD ($\geq 1$) in the layer k container (here assumed to be common to all thesauruses) comprises a first field NOk(AD) for containing the rank data as an integer ranging from 0 to Dk−1, a second field for containing the address NXk(AD) of the next record of the chain (this address is 0 if there is no further address), and a third field for containing the corresponding bitmap segment HPk(AD). The layer k container has a free record chain whose first record address is noted Hk.

It is noted that the auxiliary table could also be shared by several thesauruses containing distinct word indexes to access such common auxiliary table.

Before stage 124, all the records of the data container are chained together and free, and the bitmap segments HPk (AD) are initialized with all zero segments. The columns AT_Fk and AT_Lk of all the auxiliary tables are also initialized with the value 0.

The quotient and the remainder of the Euclidean division of a flat file row-ID by D1 are respectively noted Q1 and R1. For each further layer k>1, Qk and Rk respectively denote the quotient and remainder of the Euclidean division of Q(k−1) by Dk. At the initialization step 130 of FIG. 20, the integers Q1, R1, Q2 and R2 are set to 0.

The rows of the root table(s), which may be read one by one or block by block from the hard drive 105, are selected one by one in step 131. The records of the other data tables which are linked with the selected root table row are read in step 132. This provides a data graph of the type illustrated in compact form in FIGS. 5–7.

The links of those data graphs, i.e. the row-ID's in the data tables, are written into the relevant columns of the link table (FIG. 9) at row-ID Q1×D1+R1 (step 133). If there is no link table, step 133 is skipped.

For the current data graph, the different attributes AT are successively selected (step 134). The value of the selected attribute AT is located by means of a dichotomic search in the corresponding thesaurus, and its word index WI is read in step 135. Step 136, which will be detailed hereafter with reference to FIGS. 21–24, consists in updating the auxiliary table and data containers with respect to the AT thesaurus entry for the word index WI. This updating corresponds to the insertion of the current flat file row-ID Q1×D1+R1 into the integer list relating to the thesaurus word index WI.

When all the attributes have been thus handled (test 137), the layer 1 remainder index R1 is incremented by one unit in step 138. If the incremented R1 is equal to D1 (test 139), then the index R1 is reset to 0, and the layer 1 quotient index Q1 and layer 2 remainder index R2 are each incremented by one unit in step 140. If the incremented R2 is equal to D2 (test 141), then the index R2 is reset to 0, and the layer 2 quotient Q2 is incremented by one unit in step 142. After step 142, or when R1<D1 in step 139 or R2<D2 in step 141, a test 143 is performed to determine whether all the rows or all the root tables have been considered. If not, the procedure comes back to step 131 to select a new root table row.

Figure 19:
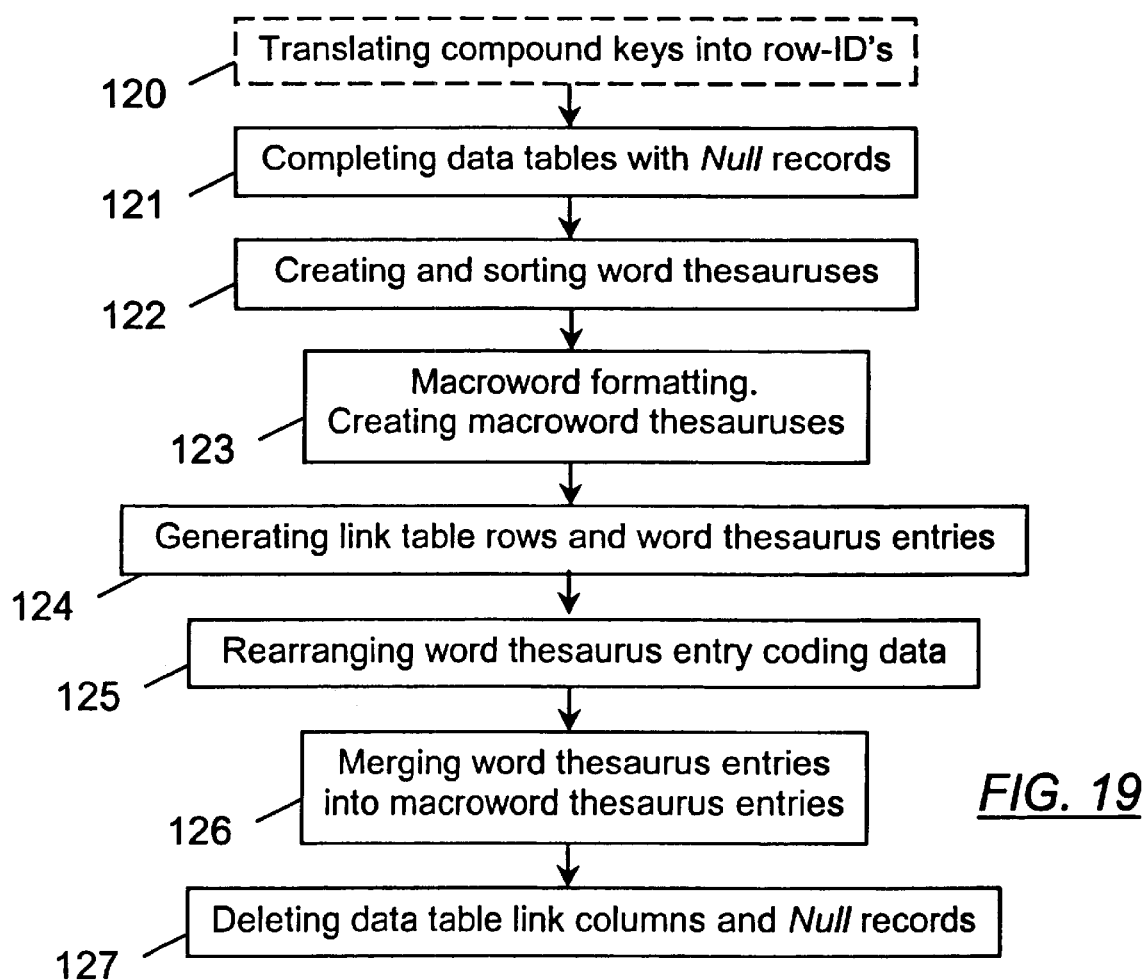
FIG. 19 is a flow chart showing a data graph creation procedure in accordance with an embodiment the invention.

Once all the root table rows have been considered, stage 124 of FIG. 19 is over, and the parameters Q1, R1, Q2 and R2 are memorized for subsequent insertion of possible new data records. Eventually, the number of rows in the virtual flat file is given by Q1×D1+R1.

Figure 20:
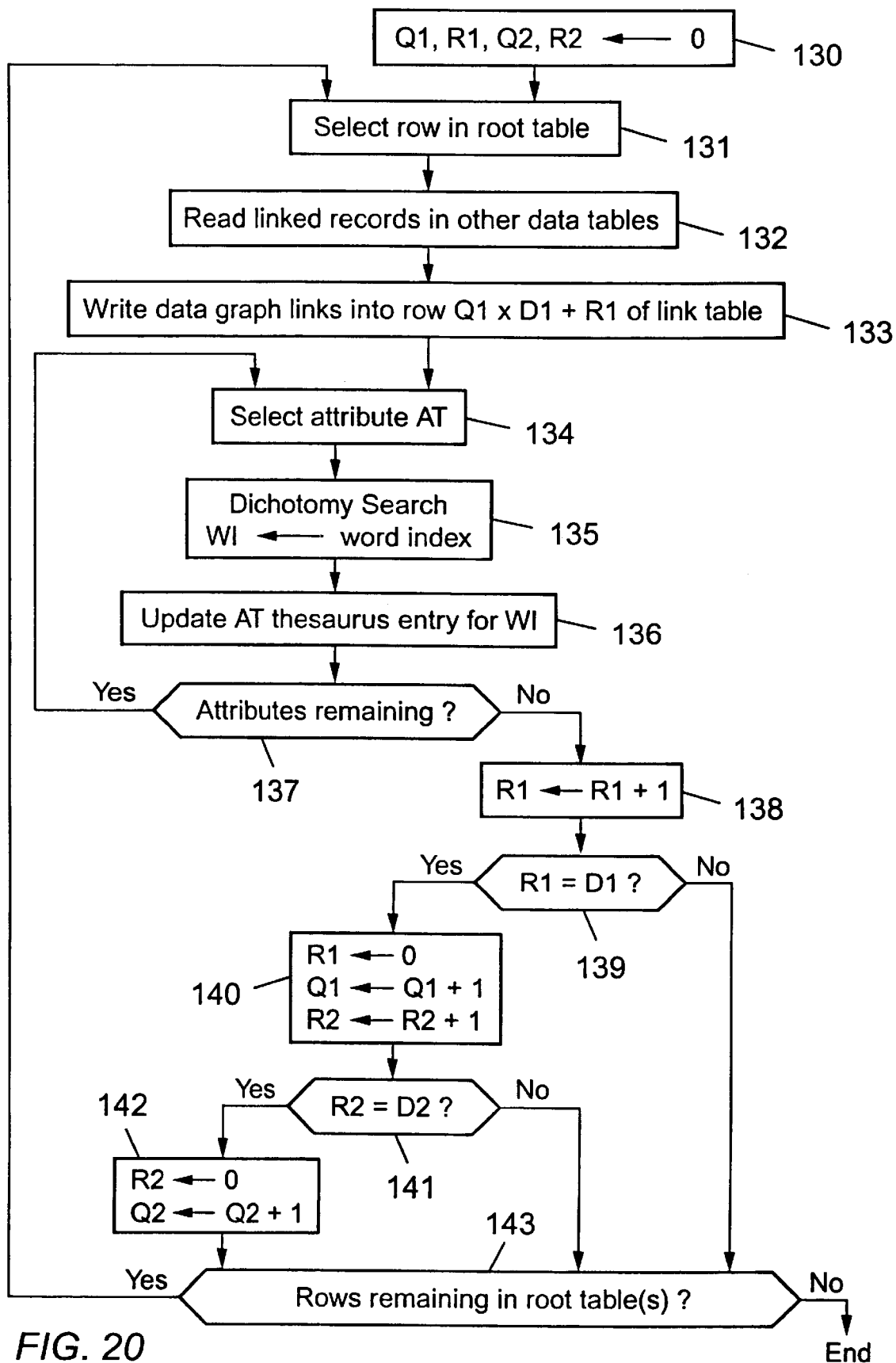
FIG. 20 is a flow chart showing a procedure applicable in stage 124 of FIG. 19.

Clearly, the procedure of FIG. 20 is readily extended to n>2 encoding layers, by initializing all Qk and Rk parameters to 0 in step 130 and by developing steps 138–142 (which are equivalent to incrementing the data graph pointer Q1×D1+R1) in the higher layers.

Figure 21:
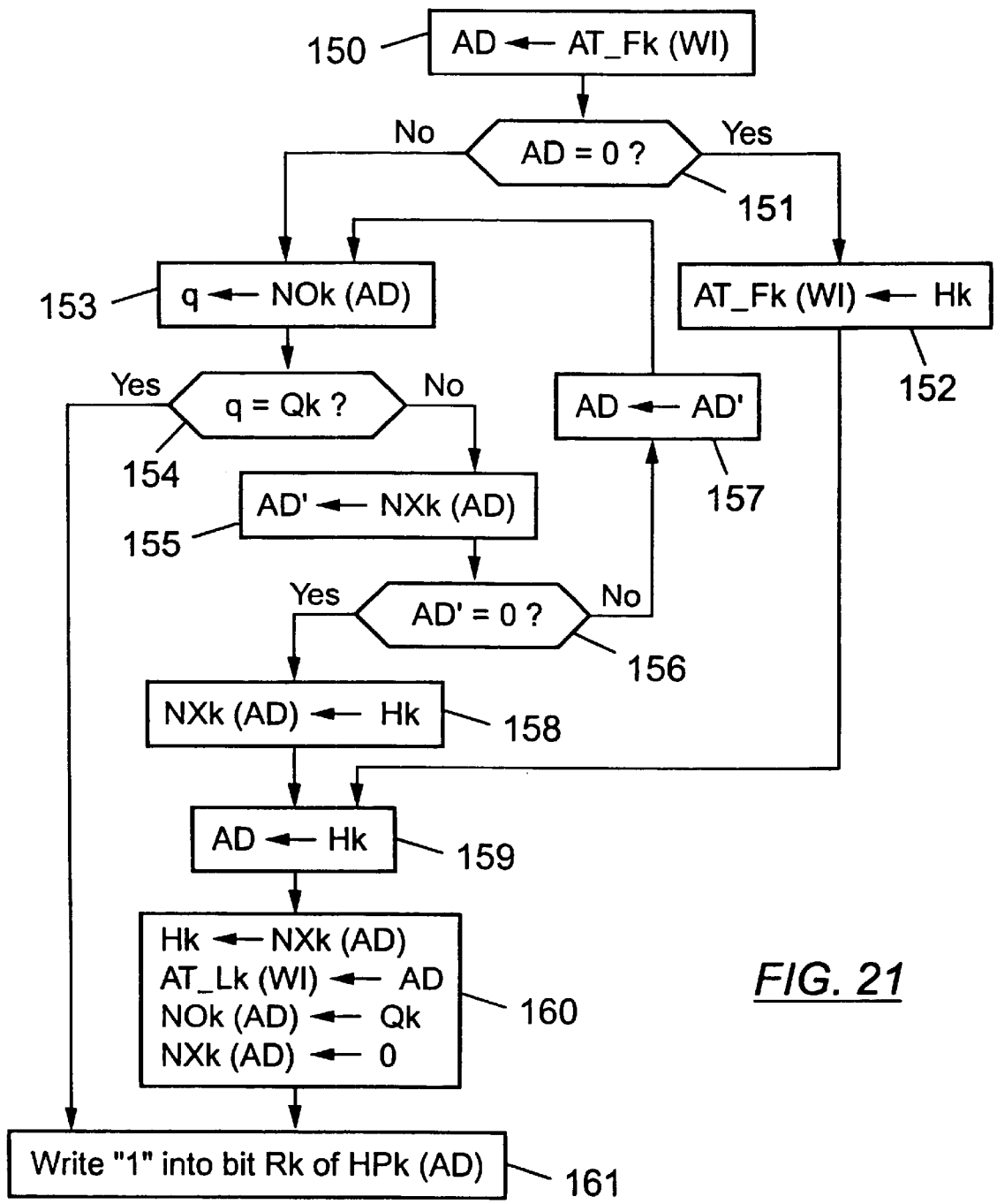
FIGS. 21 and 22 are flow charts showing procedures applicable in step 136 of FIG. 20.

FIG. 21 shows how the program can manage the record chains in the data container and the thesaurus auxiliary table in layer $k \geq 1$ for a word index WI in the thesaurus relating to an attribute AT. The first step 150 is to load the value AT_Fk(WI) stored in the auxiliary table into the address variable AD. If AD=0 (test 151), then a record chain has to be initialized for thesaurus index WI, so that the head address Hk of the free record chain in the data container is assigned to AT_Fk(WI) in step 152.

If there was already a record chain for the thesaurus index WI (AD>0 at test 151), the rank NOk(AD) is loaded into the rank variable q in step 153. If the following test 154 shows that q is different from the quotient variable Qk, the address variable AD' receives the address of the next record of the chain, i.e. NXk(AD), in step 155. If AD' is still different from 0 (test 156), the process comes back to step 153 for examining the next rank variable of the record chain, after substituting AD' for AD in step 157. When AD=0 in test 156, a data container record has to be appended to the chain for thesaurus index WI, so that the head address Hk of the free record chain, in written into the next record field NXk(AD) in step 158.

After step 152 or 158, the head address Hk of the free record chain is loaded into the address variable AD in step 159. Step 160 is then executed to update the auxiliary table and data container. This update operation 160 consists in:

replacing the head address Hk by the next address NXk (AD) of the free chain;

writing the current value of the address variable AD into AT_Lk(WI); and writing Qk and 0, respectively, in the fields NOk(AD) and NXk(AD) of the data container.

After step 160, or when q=Qk in the above-mentioned test 154, the bitmap segment HPk(AD) is updated in step 161 by writing the digit "1" at bit position Rk of that segment.

In FIG. 20, it has been considered that both the layer 1 and layer 2 coding data are updated in step 136. This means that the procedure of FIG. 20 is executed once for k=1 and once for k=2. Another possibility is to execute it only for k=1, and to generate the layer 2 coding data subsequently, by processing the layer 1 rank data produced in stage 124.

Figure 22:
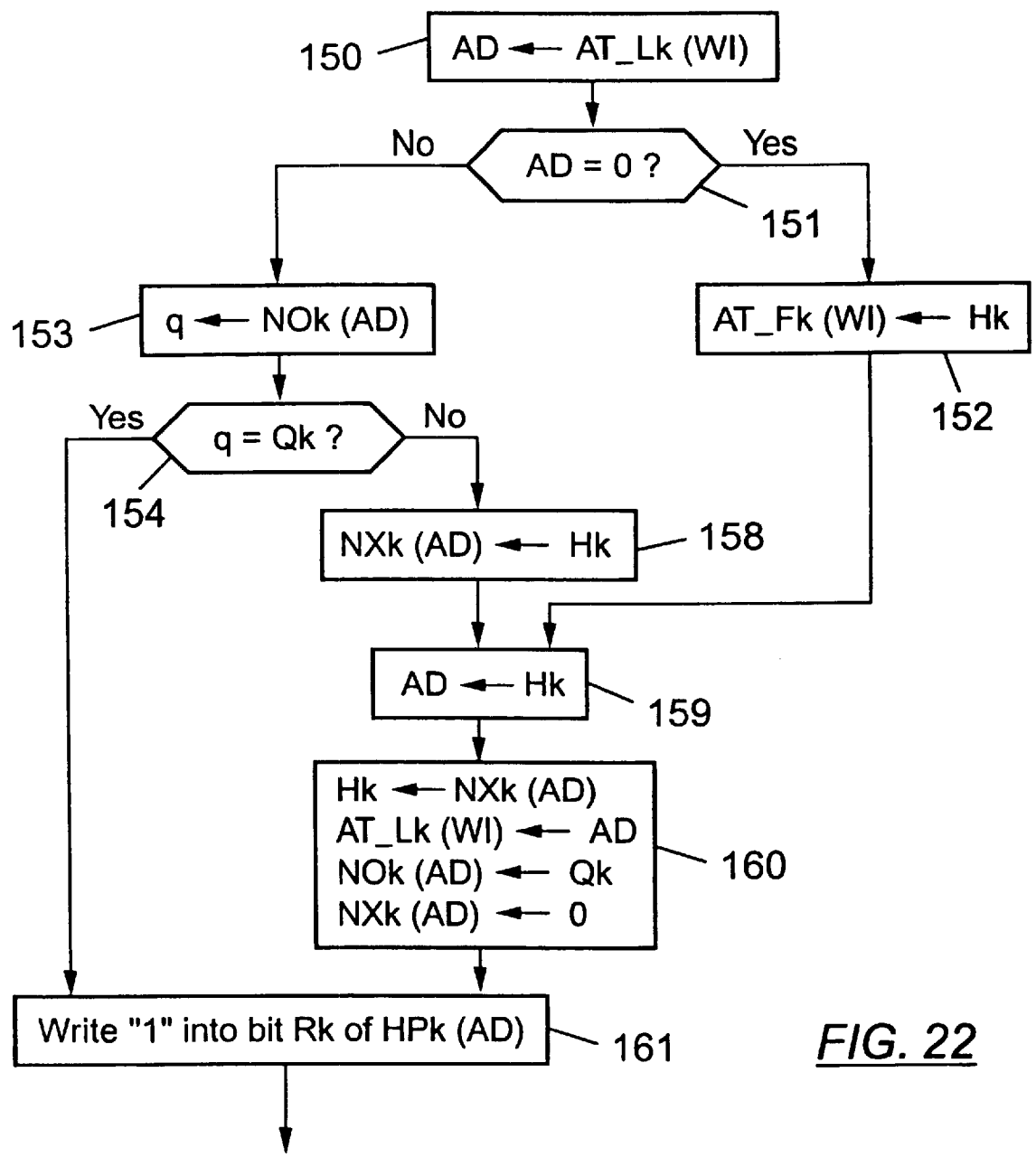

It is worth noting that when initializing the VDG's from a legacy database as in FIG. 20, the rank data Qk appear in an increasing order (we always have $q \leq Qk$ in test 154 of FIG. 21). Accordingly, it is possible to move directly to the record chain tail, i.e. to take AD=AT_Lk(WI) instead of AD=AT_Fk(WI) in step 150. In this case, step 158 is executed directly when Qk>q in test 154, thereby avoiding the scanning of the record chain. Such embodiment is illustrated in FIG. 22.

In the latter embodiment, once the VDG initialization is over, the layer k tail address fields AT_Lk with k>1 may be discarded. However, if the VDG management is such that any new VDG likely to be inserted has a flat file row-ID equal to or greater than all the flat file row-ID's of the existing VDG's (i.e. the flat file row of any deleted VDG will not be used any more), then it is advantageous to keep all the tail address fields AT_Lk in order to perform any subsequent update in accordance with the embodiment of FIG. 22.

In the form depicted in FIG. 21, the update procedure is applicable independently of any hypothesis on the rank values Qk.

Figure 23:
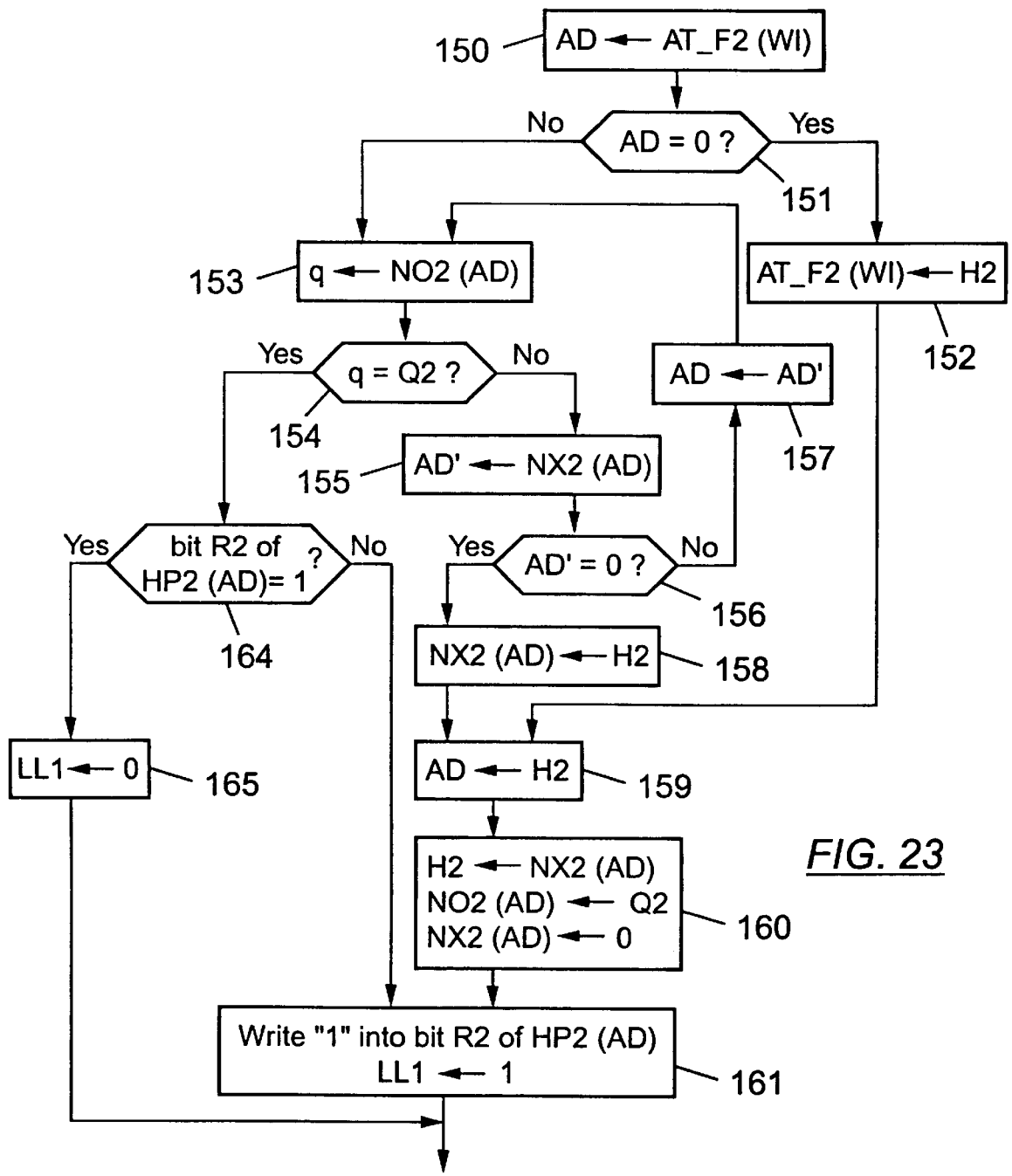
FIGS. 23 and 24 are flow charts showing another procedure applicable in step 136 of FIG. 20 in two successive coding layers.
Figure 24:
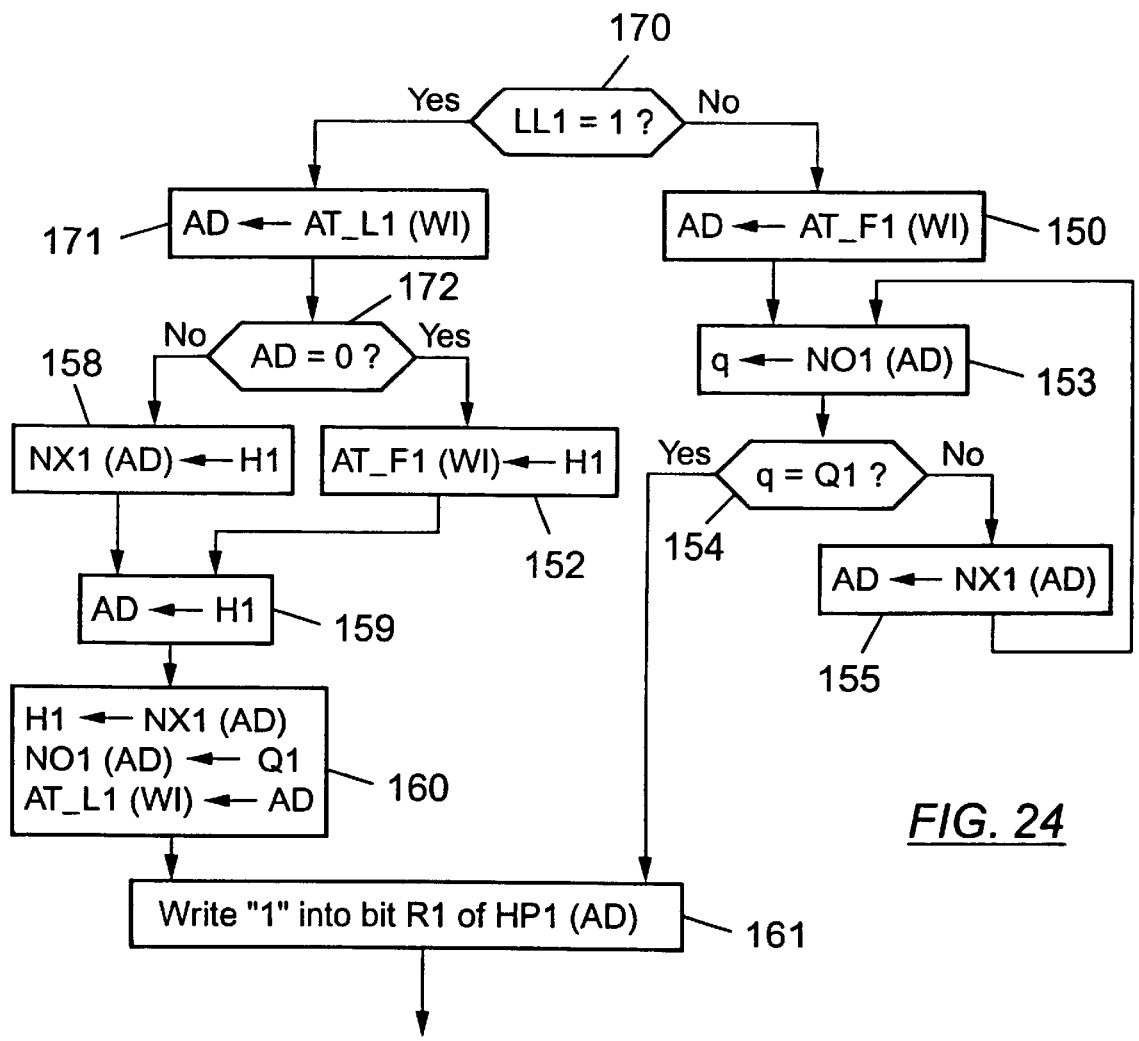

FIGS. 23 and 24 show an alternative method of updating the auxiliary table and data containers with respect to the AT thesaurus entry for the word index WI in step 136, which takes advantage of the tail address field AT_L1 of the auxiliary table in layer 1 (with n=2 coding layers). FIG. 23 illustrates the layer 2 processing which is performed before the layer 1 processing of FIG. 24. Most of the steps of FIGS. 23–24 are very similar to steps of FIG. 21, so that corresponding reference numerals have been used.

The layer 2 processing of FIG. 23 is essentially the same as that of FIG. 21 (k=2), with the following differences:

it is not necessary to deal with tail address fields AT_L2 (WI) in step 160;

step 161 further includes setting to "1" the binary variable LL1, which means that the current layer 1 rank data Q1 does not belong to the layer 1 record chain relating to the word index WI;

when q=Q2 in test 154, another test 164 is made to determine whether the bit position R2 of the layer 2 segment HP2(AD) contains the value "1"; step 161 follows only if that test 164 is negative;

if test 164 is positive, the current layer 1 rank data Q1 already belongs to the layer 1 record chain relating to the word index WI, so that the variable LL1 is set to "0" in step 165.

The layer 1 processing of FIG. 24 begins at step 170 by testing whether LL1 is 0 or 1. If LL1=0, step 150 is executed to load the value AT_F1(WI) stored in the layer 1 auxiliary table into the address variable AD, and a loop 153–155 is executed to find the data container address AD where the data relating to the rank Q1 are stored. Steps 153 and 154 are the same as in FIG. 21, and in step 155 the next address NX1(AD) is directly loaded into the address variable AD (AD is never 0 because LL1=0). The program proceeds to step 161 when q=Q1 in test 154.

If LL1=1 in test 170, step 171 is executed to load the value AT_L1(WI) stored in the layer 1 auxiliary table into the address variable AD. If AD=0 (test 172), the sequence of steps 152, 159–161 is executed as in FIG. 21 (however, it is not necessary to deal with next address fields NX1(AD) in step 160). If AD=1 in test 172, the sequence of steps 158–161 is executed as in FIG. 21.

The procedure of FIGS. 23–24 avoids the scanning of the layer 1 record chains when the rank data Q1 are not in such chains, without any hypothesis on the rank values.

After all the coding data for the individual word thesauruses have been generated, the next stage 125 of the procedure shown in FIG. 19 is to rearrange the stored coding data. As indicated previously, this is done to organize the record chains in the coding data container of each layer so that records pertaining to the same thesaurus word have contiguous addresses in order to be accessible in one or few disc accesses by means of the CPU cache memory. A simple way to do this is to reserve memory space for a new auxiliary table and new coding data containers. The thesaurus words are considered one by one, and for each of them, the coding data pointed to in the old auxiliary table are read sequentially and copied into the new data container at an address AD incremented after each write operation. When proceeding to the next thesaurus word index WI+1, new pointers AT_Lk (WI)=AD−1 and AT_Fk(WI+1)=AD are determined and stored into the new auxiliary table. After all the coding data records have been thus read and rewritten into the new data container, the old data container and auxiliary table are discarded.

Such rearrangement can be performed separately for each coding layer k.

If there are several data containers for different thesauruses in a coding layer, they may also be reordered separately.

As indicated before, the rearrangement step 125 is dispensed with when the thesauruses are organized in the manner illustrated by FIG. 17, since the coding data files naturally fulfill the grouping condition with respect to the thesaurus words.

In the following stage 126 of the procedure shown in FIG. 19, the macroword thesaurus entries are generated. For each macroword and each layer, this is done simply by merging the rank coding data Q1, Q2 of the words (or lower level macrowords) covered by the macroword, and by obtaining the corresponding bitmap segments by a logical OR of those relating to the words (or lower level macrowords). If the coding data have been rearranged for the word thesauruses as indicated in stage 125, the same grouping of the coding data will automatically be achieved for the macroword thesauruses.

In stage 127, the now useless link columns of the original data tables (FIGS. 1–3) can be deleted. The Null records which have been added in stage 121 can also be deleted, their occurrence being indicated by the default value −1 in the link table (FIG. 9).

Finally, the elements to be stored in the hard drive 105 in the above-described embodiment are:

the data tables as illustrated in FIGS. 1–3, without the link columns. Parameters defining the data table tree structure of FIG. 4 are stored in association with the tables;

the link table as illustrated in FIG. 9;

the sorted thesauruses comprising an index register and an auxiliary table for each desired attribute. FIGS. 25–26 show the index registers for the attributes AT=CN ("client name") and AT=AA ("accident amount") in our simplified example. FIGS. 28–29 show the corresponding auxiliary tables;

the macroword thesauruses organized like the individual word thesauruses, with a specified truncation or prefix length. The index register of each macroword thesaurus further has an additional column containing, for each macroword, the row-ID, in the index register of the thesaurus of lower level for the same attribute, of the first word (or macroword) covered by the macroword. FIGS. 27 and 30 show the index register and auxiliary table for the attributes AT=CN and the truncation length 3;

the coding data container(s) for each coding layer, each having a variable head address for its free record chain. FIGS. 31 and 32 show layer 1 and layer 2 data containers shared by the thesauruses of FIGS. 24–29 (free record chain head addresses 30 and 27, respectively);

optionally, one or more thesauruses stored in a "low density" format suitable for attributes of high cardinality. In the low density format, n=0 and the flat file row-ID's are stored as explicit (short) integer lists, for example by means of record chains. If the coding data for layers 1 through n are needed, they are easily calculated by performing n successive Euclidean divisions from each stored integer of the list. For a given high cardinality attribute, it may be appropriate to provide an individual word thesaurus in the low density format and one or more macroword thesauruses in the "normal" encoded format.

The data containers of FIGS. 31 and 32 are derived from those shown in FIGS. 15 and 16 pursuant to the rearrangement stage 125, in which the auxiliary tables of FIGS. 28–30 are also obtained from those of FIGS. 14A, 14G and 14H, respectively. For treating a query concerning the client called André, the processor would have to read records #20, #11 and #2 of FIG. 15 (limiting ourselves to layer 1) if the coding data container were not rearranged, whereas it reads the physically contiguous records #1, #2 and #3 of the rearranged container of FIG. 31. The latter reading can typically be done by loading a single block into the cache memory. More disc accesses, and hence a longer processing time, are required for reading scattered records.

The columns separated by broken lines in FIGS. 9 and 28–32 are preferably stored separately. For example, the storage address of one value in such a column may be defined as a start address assigned to the column plus an offset equal to its row-ID multiplied by a field length.

Accordingly, the links of a link table row (data graph) are stored at corresponding addresses given by the flat file row-ID. This separate storage of the link column accelerates the data retrieval when some of the data tables need not be accessed to produce the output data requested in the query.

Likewise, some elementary operations performed in the query processing require only coding data for one layer, so that it is advantageous to separate the information concerning each layer in the auxiliary tables to accelerate the processing. Other operations imply the rank data and the bitmap segment data independently, so that it is advantageous to separate those data in the data containers as shown in FIGS. 31 and 32.

In an alternative way of storing a thesaurus, the word index register and the auxiliary table are merged in a single table with a Huffman type of indexing: each row of that table contains a value of attribute AT, the AT_Fk and AT_Lk data, a next row pointer (the next row contains the next value of the attribute in the sorted thesaurus) and optionally a preceding row pointer.

In an embodiment, the maintenance of VDG's created as described hereabove may involve the following operations:
1/ Record Insertion A new virtual data graph, i.e. a new row in the flat file, is generally generated in response to the insertion of a new record in a data table.

However, if the new record has a link to an existing record of another target table such that no other link points to said existing record, then there is no need for a new data graph, but for the update of an existing data graph. For example, if client Oscar subscribes a first policy, e.g. for his car, a new record is added to the policy data table without creating any new VDG: the data graph of FIG. 7 is simply modified to place the new data in the node corresponding to the policy table. If Oscar then subscribes a second policy, e.g. for his house, a new VDG will be necessary.

To generate the new VDG, all records from the other data tables, related to the new inserted record, including Null records, are identified by their respective row-ID's which, if necessary, can be retrieved by queries based on attribute values of those related records.

After appending the new record to the data table, the first thing to do is to initialize any new thesaurus entry which may be necessary if new attribute values occur (all AT_Fk and AT_Lk fields are initialized to 0). The new virtual flat file row and its corresponding thesaurus entries may be generated as in steps 133–142 of FIG. 20. Any higher level macroword thesaurus is updated accordingly.

2/ Record Attribute Modification

Changing or adding an attribute value in an already existing data table record has no effect on the link table which does not reflect the table contents but the link structure. Adding is a particular case of changing when the preceding attribute value was Null. Likewise, deleting an attribute value from a record is a particular case of changing when the new attribute value is Null.

If the new attribute value requires a new thesaurus entry, such entry is initialized (AT_Fk=AT_Lk=0). The list L of the link table row-ID's corresponding to flat file records comprising the data record to be amended is obtained by placing a suitable query. The latter list L is merged (bitmap OR operation) with the flat file row-ID list L' of the new attribute value, and the coding data of the merged list LvL' are assigned to the new attribute value. The complement $\overline{L}$ of list L is also determined (bitmap NOT operation) to be intersected (ANDed) with the flat file row-ID list L" of the preceding attribute value. If the resulting intersection list $\overline{L}\Lambda L"$ is not empty, its coding data are assigned to the preceding attribute value. This may transfer to the free record chain of one or more data containers records that previously belonged to the record chain associated with the preceding attribute value. If the intersection list $\overline{L}\Lambda L"$ is empty, the preceding attribute value may be deleted from its word thesaurus. The same intersection and update sequence is performed for any higher level macroword thesaurus.

3/ Record Link Modification

Changing a link in a source data table leads to corresponding changes in every occurrence of the link in the link table. The list L of the concerned link table rows can be determined by processing a suitable query.

If the target table record pointed to by the former link has no more link pointing thereto (its row-ID does not occur any more in the corresponding column of the link table after the modification), a new VDG is generated. Downstream of the modified link, this new VDG has the same content as the one(s) which is (are) being amended. Upstream of the modified link, it consists of Null records. The new virtual flat file row and its corresponding thesaurus entries may be generated as in steps 133–142 of FIG. 20. Any higher level macroword thesaurus is updated accordingly.

After that, a procedure similar to the one described in the preceding section can be performed for each attribute of the target table: /a/ the list L is merged with the flat file row-ID list L' of the new attribute value (the value occurring in the target table record pointed to by the new link); /b/ the coding data of the merged list LvL' are assigned to the new attribute value; /c/ the complement $\overline{L}$ of list L is intersected with the flat file row-ID list L" of the preceding attribute value (the value occurring in the target table record pointed to by the former link); /d/ the coding data of the resulting intersection list $\overline{L}\Lambda L"$ are assigned to the preceding attribute value; and /e/ the same intersection and update sequence is performed for any higher level macroword thesaurus.

If the first target table (for the modified link) has a link column to a second target table, the link value stored in the column of the link table associated with the second target table and in each row of list L is also changed, and the above procedure /a/–/e/ is performed for each attribute of the second target table. This is repeated for any data table located downstream of the first target table in the data table tree (FIG. 4).

For example, if a correction is made in the accident table of FIG. 3 to indicate that accident #6 was under policy #2 instead of policy #0, i.e. concerned Max's house instead of Ariane's car, the link from the accident table in the data graph of FIG. 5 has to be changed to point to policy record #2, and the link from the policy table has to be changed to point to client record #4. A new row is inserted in the virtual flat file, to contain the useful information about Ariane's car policy under which no accident took place. As a result, row #6 of the link table of FIG. 9 is changed to include the values 4, 2 and 6, respectively, in the client, policy and accident link columns, and a new row #12 is added including the values 2, 4 and −1, respectively, with corresponding changes in the thesauruses.

4/ Record Cancellation

Canceling a record from a root table involves deleting the row(s) of the flat file containing that record. The corresponding flat file row-ID's are removed from the lists encoded in the thesauruses, i.e. zeroes are written at the associated locations of the bitmap vectors. These flat file row-ID's may be made available for further VDG insertion, for example pursuant to section 1/ or 3/ hereabove. They may also remain as blank rows if the virtual flat file size is not a major concern. Likewise, canceling a record from a target table which has no link pointing thereto in the corresponding source table involves deleting the row(s) of the flat file containing that record (these row were representing data graphs with Null records upstream of the cancelled record).

If the cancelled record belongs to a target table for a compulsory link (e.g. the client or policy table in our example), any flat file row containing that record is also deleted. If the cancelled record belongs to a target table for an optional link (e.g. the third party or broker table in the example of FIG. 4), the cancellation comprises a link modification whereby any link pointing to that record is replaced by a link to a Null record (link value=−1). Such modification may be performed as described in the above section 3/ (but without generating any new VDG).

For any link of the cancelled record which pointed to a non-Null target table record whose row-ID does not occur any more in the corresponding column of the link table, it is necessary to generate a new VDG containing the same data as the cancelled record in and downstream of said non-Null target table record and Null values in and upstream of the cancelled record. The new virtual flat file row and its corresponding thesaurus entries may be generated as in steps 133–142 of FIG. 20. Any higher level macroword thesaurus is updated accordingly.

5/ Thesaurus Update and Sorting

With the above-described structure of the thesaurus entries, the cancellation of a word in a thesaurus, which occurs when its flat file row-ID list becomes empty, could be done by leaving the thesaurus entry with zeroes in its HPk data. However, this is not optimal regarding memory usage.

A more efficient method is to update the record chains in the data container, so that the auxiliary table has AT_Fk(WI)=AT_Lk(WI)=0 for the entry WI of the cancelled word. In such a case, the word index WI can be released, a default value (e.g. −1) being written into the word index column for the cancelled word in the thesaurus index register.

The creation of a new word thesaurus entry can be done as illustrated in FIGS. 21–24 (AD=0 in test 151 or 172). The word index WI is obtained by incrementing a counter representing the number of thesaurus entries, or by selecting an available word index (e.g. which has been released previously when canceling another word). In this process, a (useful) row is added to the auxiliary table of the corresponding attribute, with row-ID=WI.

Similar procedures can be applied for updating the macroword thesauruses. A macroword index WI may be released when canceling a macroword (all its constituent words have been cancelled). In the case of a word creation, it is first checked whether the macroword already exists, in which case its macroword index WI is recovered; otherwise, a macroword is also created.

It is thus appreciated that, once words have been removed and/or added, the auxiliary tables are no more sorted in the ascending order of the thesaurus words. The word index register has to be manipulated in order to maintain the thesaurus sorting.

However, it is not necessary to perform such manipulation of the word index register immediately. This is very advantageous because the updated database is made available for any new query without requiring a sorting operation in the whole thesaurus, which may take some time.

The newly created words or macroword of a thesaurus can have their word indexes stored in a separate, secondary index register, whereas they share the same auxiliary table and coding data containers as the former words of the thesaurus. Only this secondary index register can be sorted when a thesaurus entry is added, which is a relatively light job since most of the thesaurus words belong to the primary register. When a word is deleted, its row in the primary or secondary index register remains with the default value in the word index column. Accordingly, to access the coding data relating to a given word range, the range boundaries are searched, by dichotomy, in both the primary and secondary index registers to determine the relevant word indexes which are then used in the usual way to address the common auxiliary table and data containers.

From time to time, when the CPU 101 is available, a batch task is run to merge the primary and secondary index registers while deleting their rows having the default value in the word index column. This is a straightforward external sorting operation since both registers are already sorted. The resulting merged register is saved to replace the primary register, and the secondary register is cancelled.

If the secondary word index register becomes too big (i.e. its sorting requires a too long time every time an entry is added) before such merge operation is carried out, it is possible to create a further, tertiary index register to receive the new thesaurus entries, and so forth.

6/ Data Container Optimization

This is useful if the thesaurus organization is of the type shown in FIGS. 25–32 rather than of the type shown in FIG. 17.

As records are inserted and deleted in a coding data container, the above-mentioned condition that the record chains should preferably be arranged so that records pertaining to the same thesaurus word have contiguous addresses is no more fulfilled. This does not prevent the database system from operating satisfactorily. However, in order to optimize the query processing time, it is preferable to rearrange the records of the coding data container and the corresponding columns of the thesaurus auxiliary table(s) as in the above-described step 125. Like the word index register sorting, such rearrangement can be carried out when CPU time is available.

ALTERNATIVE THESAURUS ARRANGEMENTS

If the thesauruses are arranged according to the preferred organization illustrated by FIG. 17, with distinct files for each word or macroword, the flow charts of FIGS. 19–24 are somewhat simplified. First, stage 125 of FIG. 19 is not performed (it is an advantage of the file organization to dispense with such sorting when the VDG's are created and maintained). In FIG. 20, the dichotomy search 135 and the thesaurus update of step 136 may be replaced by the procedure illustrated in FIG. 33.

In this procedure, imax(AT, W, k) designates the current number of layer k records in the coding data file relating to thesaurus AT and word W. These parameters are set to zero for all values of AT, W and k at the initialization step 130.

Figure 33:
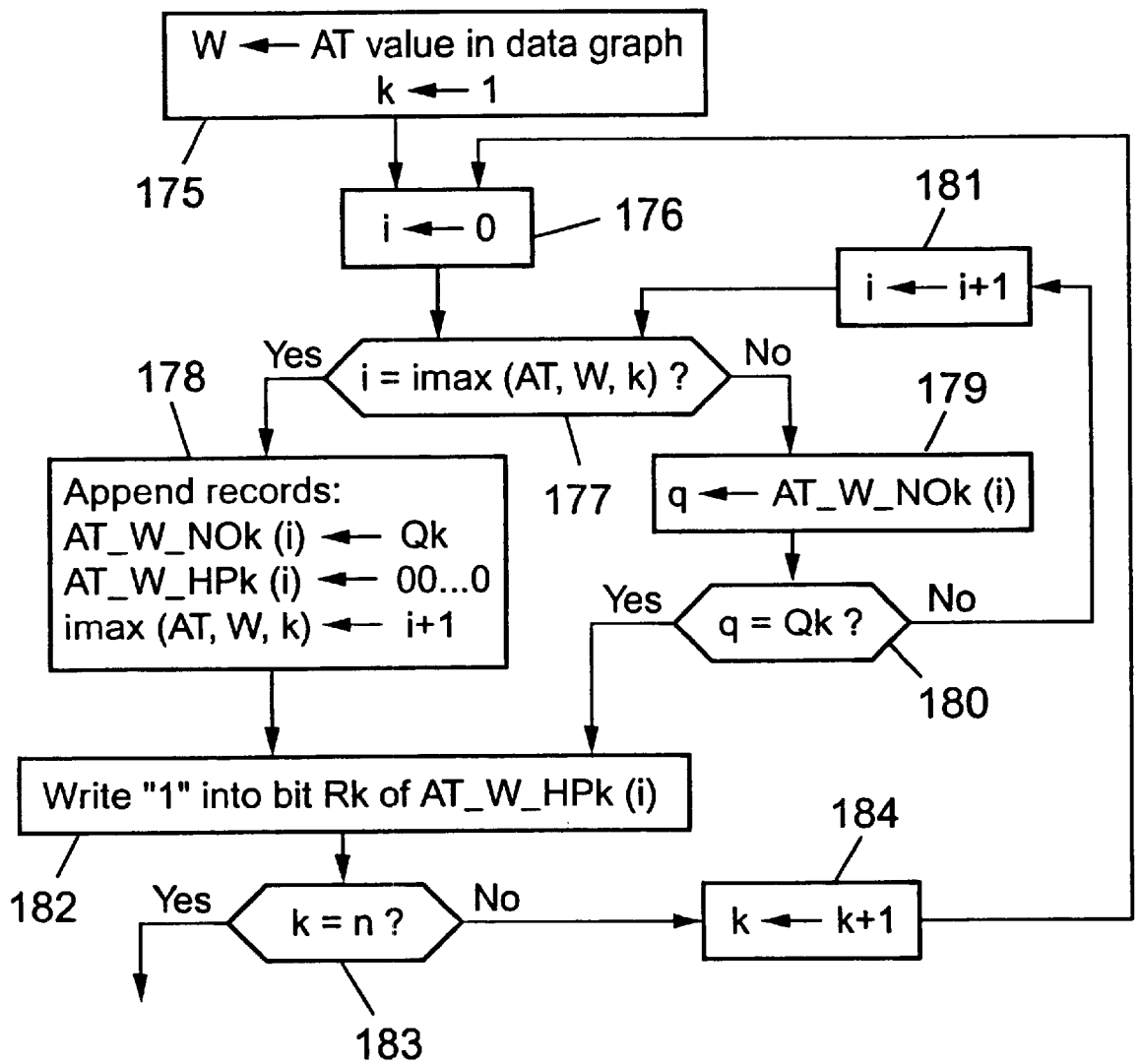
FIG. 33 is a flow chart showing an alternative way of executing steps 135 and 136 of FIG. 20 when the thesauruses are stored as shown in FIG. 17.

The value in the current data graph of the attribute AT selected in step 134 of FIG. 20 is allocated to the variable W in step 175 of FIG. 33, and the coding layer index k is initialized to 1. The integer i, which points to the records of the coding data file is first set to zero in step 176. If i=imax(AT, W, k) in the following test 177, a record AT_W_NOk(i) having the value Qk is appended to the layer k rank file pertaining to word W and a record AT_W_HPk(i) having the all-zero value is appended to the corresponding bitmap segment file. This is done in step 178, where imax(AT, W, k) is also incremented by one unit. If i<imax(AT, W, k) in test 177, the rank AT_W_NOk(i) is loaded into the rank 30 variable q in step 179. If the following test 180 shows that q is different from the quotient variable Qk, the integer i is incremented by one unit in step 181 and the process comes back to step 177 for examining the next rank variable of the file, if any. Accordingly, the scanning of the coding data record chain for each layer k (corresponding to loop 153–156 in FIG. 21) is performed within the AT_W_NOk file which is smaller than the data container common to all words of the thesaurus. Therefore, the minimum number of disc accesses is ensured.

After step 178, or when q=Qk in test 180, a "1" is written into the bit of rank Rk of the bitmap segment AT_W_HPk (i) in the relevant coding data file (step 182). The coding layer index k is compared with n (or to a lower value if the higher layer coding data are calculated afterwards) in test 183. If k<n, the index k is incremented by one unit in step 184 before coming back to step 176. When k=n, the thesaurus update is over and the program proceeds to step 137 of FIG. 20.

In the procedure of FIG. 33, the rank data AT_W_NOk (i), each consisting of an integer value can be read in large blocks from the hard drive 105 to the cache memory, so that the procedure is very quick.

Another option which can be used in the thesauruses is to include in each entry relating to a word an indication of the representation format of the flat file row-ID list. Indeed, the format (e.g. low or normal density) can be chosen word by word depending on the number of data graphs including the word under consideration. This is illustrated in broken lines in the right part of FIGS. 25–27 in the case where there are only two formats, i.e. low density (0) and normal density with n=2 coding layers (1). In the example, all the thesaurus entries are in the normal density format. There could be more than two formats; for example, the format data in the thesaurus could specify the number of coding layers for each word. When the flat file row-ID list are represented by data stored in data containers common to one or more thesauruses, distinct containers are provided for the different coding formats.

When the above option is used, the format for each thesaurus entry can be modified as the database lives, in order to optimize the storage. This is a low priority task since the query engine can work with any format. For example, when thesaurus entries are being updated, it is possible to mark any entry for which a format change appears to be desirable, based on predefined conditions fulfilled by the density of the word in the amended database. For example, a word or macroword could be changed from low to normal density format when a certain number of data graphs are identified in its thesaurus entry, and vice versa. Afterwards, when processor time is available, the marked entries can be translated into the new format to optimize the system.

It has been mentioned above that, when n>1, storing the rank data in every coding layer is somewhat redundant, since the flat file row-ID lists are completely defined by the bitmap segment data in all layers and the rank data in the last layer.

FIGS. 34A–B illustrate an alternative way of arranging the coding data files, which avoids storing the layer k ranks with k<n. In this arrangement, it is sufficient that the auxiliary tables (FIGS. 28–30) point to a first record in the layer n data container: the addresses AT_F1 and AT_L1 are not necessary. The data container of the highest layer n=2, shown in FIG. 34A, is the same as that of FIG. 32, with an additional field in each record to contain the head address F(n−1)(AD)=F1 (AD) of a record chain in the data container of the lower layer n−1=1. The latter data container (FIG. 34B) has one record chain for each layer n rank pertaining to each thesaurus entry covered by the data container. Each record of a layer k<n data container comprises a first field for containing the address NXk(AD) of the next record of the chain (this address is 0 if there is no further address), and a second field for containing the corresponding bitmap segment HPk(AD). The layer k<n chain is ordered in accordance with the non-zero bits of the bitmap segment HP(k+1) stored in the record of the upper layer data container which contains the head address of the chain. If 1<k<n (not shown), the record further has a third field for containing the head address of a record chain in the data container of the lower layer k−1 (and so forth until k=1).

The procedure for retrieving a flat file row-ID list from a thesaurus pointing to data containers of FIGS. 34A–B may be as follows. The word index WI is used to obtain the address of the first relevant record in the layer 2 data container. For this address (and then for each address of the chain defined by the NX2 field), the layer 2 rank NO2 is read and the bitmap segment HP2 is scanned. Every time a "1" is found in this scanning, at a bit position R2, a layer 1 rank NO1=NO2×D2+R2 is determined and a corresponding record of the lower layer data container is read (the first time at the head address given by the column F1 in the layer 2 data container, and then at the addresses pointed to by the NX1 addresses in the layer 1 data container). By this method the layer 1 bitmap segments HP1 and their positions NO1 are retrieved to assemble the bitmap vector representing the desired flat file row-ID list.

In the general case, the data containers are accessed from layer n. Each segment HPk read after determining a rank NOk with k>1 is scanned to locate its non-zero bits. Each non-zero bit of HPk located in a position Rk provides a lower layer rank NO(k−1)=NOk×Dk+Rk, and a corresponding bitmap segment HP(k−1) is read in the chain designated in the lower layer container. The process is repeated recursively until k=1: the numbers NO1×D1+R1 are the flat file row-ID's for the thesaurus entry.

The coding data files illustrated in FIGS. 34A–B can be created by a method similar to that described with reference to FIGS. 19–21. All the HPk and F(k−1) fields are initialized with zeroes before stage 124. The procedure of FIG. 21 is executed only for k=n, with step 161 replaced by the loop depicted in FIG. 35 in which the coding layer index k decreases from n to 1.

The first step 450 of this loop consists in writing the digit "1" at bit position Rk of the bitmap segment HPk(AD). If the coding layer k is greater than 1 (test 451), it is decremented by one unit in step 452, and the first address M=Fk(AD) is read in the layer (k+1) coding data container (step 453).

If M is zero (test 454), the head address Hk of the free record chain in the layer k coding data container is written into the first address field Fk(AD) of the layer (k+1) coding data container (step 455), to create a new chain. The value of AD is then replaced by Hk (step 456), and the record chains are updated in the layer k coding data container (steps 457–458): Hk is replaced by NXk(AD) before NXk(AD) is set to 0. After step 458, the process loops back to step 450.

If M>0 in test 454, the index R is set to 0 in step 460 to initialize the scanning of the bitmap segment HP=HP(k+1) (AD). If R is smaller than the remainder R(k+1) corresponding to the current data graph identifier, the corresponding bit HP(R) of the bitmap segment HP is evaluated (test 462). If HP(R)=0, the program proceeds to step 463 for incrementing R by one unit before coming back to test 461. When HP(R)=1 in test 462, it is necessary to move forward in the layer k record chain: the integer M' receives the value of M in step 464, and M is replaced by NXk(M') in step 465. If the new value of M is not zero (test 466), the program proceeds to the above-mentioned step 463. Otherwise, the end of the layer k record chain is reached, so that the head address Hk of the layer k free record chain is assigned to NXk (M') in step 467 before proceeding to the above-mentioned step 456.

If R is equal to the remainder R(k+1) in test 461, the corresponding bit HP(R) of the bitmap segment HP is also evaluated (test 470). If HP(R)=1, the rank Qk already exists in the layer k+1 input list relating to the current thesaurus entry, so that it is not necessary to create a new record in the layer k coding data container: the value of AD is simply replaced by M in step 471, and the process loops back to step 450.

If HP(R)=0 in test 470, the value of AD is replaced by the head address Hk of the free record chain (step 472), and the Huffman-type record chains are updated in the layer k coding data container (steps 473–474): Hk is replaced by NXk(AD) before NXk(AD) is set to M. After step 474, the process loops back to step 450.

Figure 35:
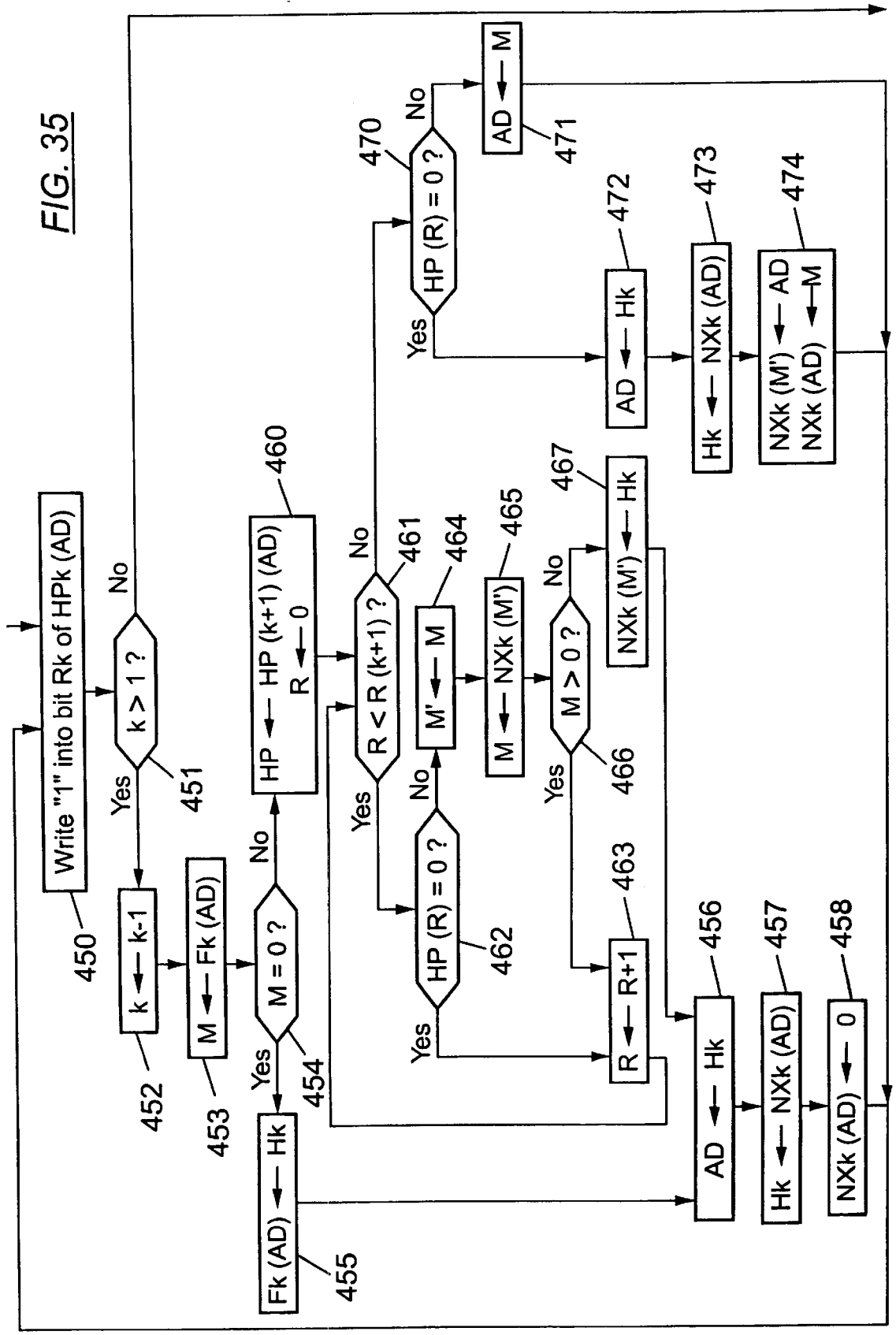
FIG. 35 is a flow chart showing a procedure applicable in the management of tables of the type shown in FIGS. 34A and 34B.

The loop of FIG. 35 is over when k=1 in test 451.

FIGS. 34C and 34D show tables whose contents are equivalent to those of FIGS. 34A and 34B, and in which the bitmap segments HPk for k>1 are not explicitly stored. The layer n coding data container (FIG. 34C) is identical to that described with reference to FIG. 34A, but without the HPn column. Each layer k coding data container for k<n (FIG. 34D) is identical to that described with reference to FIG. 34B, with an additional column R(k+1) containing layer k+1 remainders. The presence of a remainder value R(k+1) in a record to the layer k coding data container means that there is a "1" at position R(k+1) in the non-stored higher layer bitmap segment HP(k+1).

It will be appreciated that the scheme of FIG. 17, i.e. distinct coding data files for each thesaurus entry to minimize the disc accesses, is also applicable when the stored coding data do not include the ranks for layers 1, . . . , n−1. The layer n ranks and bitmap segments may be stored as in FIG. 17. For the lower layers, there are several options. There can be one data container for each thesaurus word and each coding layer k<n, with record chains pointed to in the records relating the upper layer k+1. The layer k record chains can also be isolated in distinct files whose name include the attribute name AT, the word or macroword value W, the coding layer index k and a layer k+1 rank NO(k+1). Each record of such file AT_W_k_NO(k+1) then contains a layer k+1 remainder R(k+1) and a layer k bitmap segment HPk which is located at rank NOk=NO(k+1)×D(k+1)+R(k+1).

QUERY CRITERIA HANDLING

As in any RDBMS, queries can be expressed in accordance with the Structured Query Language (SQL), which has been adopted as a standard by the International Standard Organization (ISO) and the American National Standard Institute (ANSI).

Figure 36:
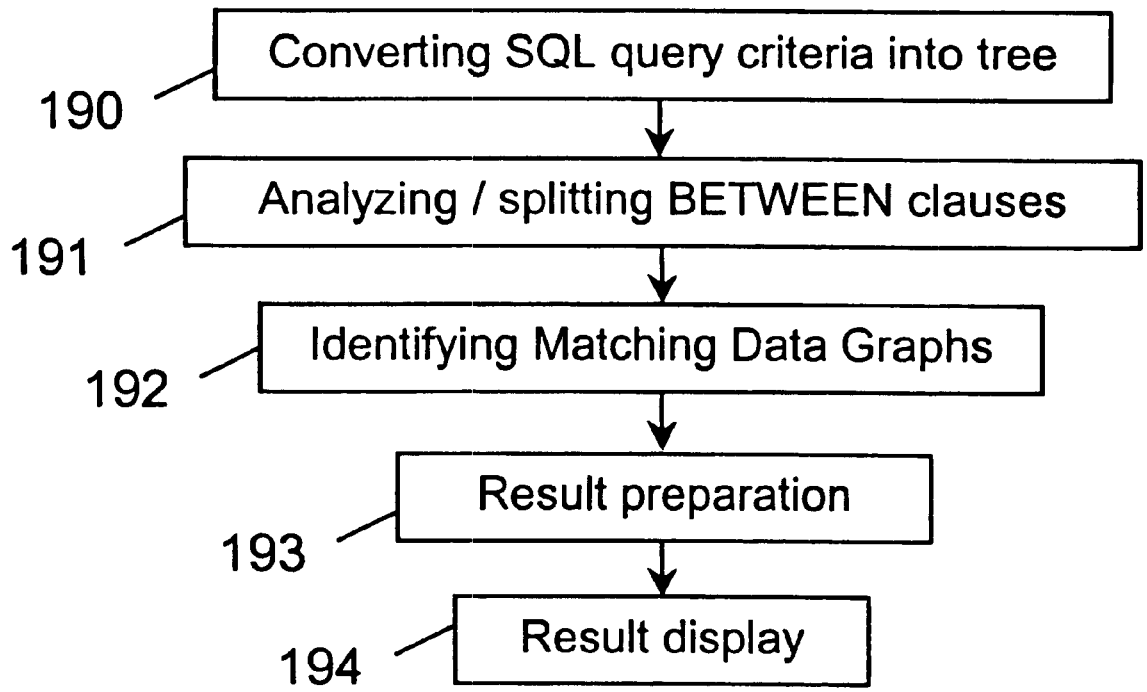
FIG. 36 is a general flow chart of a query processing procedure in accordance with an embodiment of the invention.

A general flow chart of the query processing procedure is shown in FIG. 36.

The query criteria, contained in the SQL "WHERE" clause, are converted into a request tree in stage 190 of FIG. 36. The query criteria are analyzed and structured according to a tree in which the leaves correspond to ranges for respective attributes values as defined in the SQL query and the nodes correspond to logical operations to be performed from those leaves. The leaves are also referred to as "BETWEEN clauses" of the SQL query. An individual attribute value defined in the SQL query is a BETWEEN clause covering a single word.

EXAMPLE 3

Figure 37:
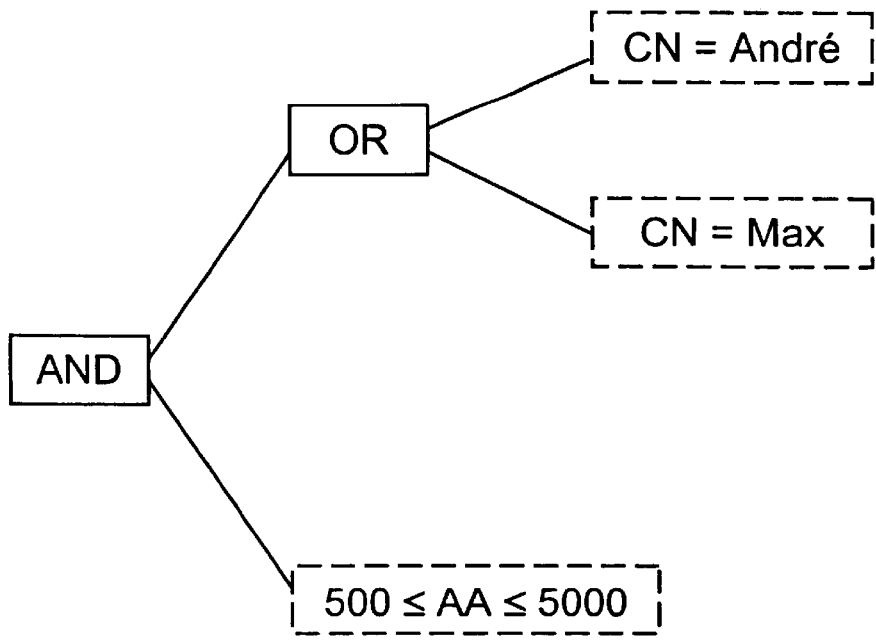
FIG. 37 is a diagram showing an example of query tree referring to the example of FIGS. 1–3.

An example of such a tree is shown in FIG. 37 in the illustrative case of a query which consists in finding all data graphs relating to accidents undergone by client André or client Max and having a damage amount AA such that 500≦AA≦5000. That tree has three leaves, indicated by broken lines, corresponding to the BETWEEN clauses defined in the query: [André, André] and [Max, Max] for the client name attribute and [500, 5000] for the accident amount attribute. The tree also has two nodes, one for the OR operation between the two CN criteria, and one at the root for the AND operation with the AA criterion.

The tree decomposition is not unique. The one having the minimum number of nodes is preferably selected.

The next stage 191 is a tree expansion made by analyzing and splitting the BETWEEN clauses relating to attributes having macroword thesauruses. This is done from the tree obtained in step 190, with reference to the sorted thesaurus word and macroword index files associated with the attributes used in the query. The lower and upper bounds of each range defined in a BETWEEN clause are compared with the words of the thesaurus associated with the attribute, to find a decomposition of the range into sub-ranges, whereby each sub-range is also defined as a BETWEEN clause in a word or macroword thesaurus.

In a preferred embodiment, the decomposition is optimized to make maximum use of the macrowords. This optimization consists in retaining the lowest possible number of words or macrowords to form the sub-ranges to be mapped onto the range defined in the BETWEEN clause. The system selects the highest level macrowords that are included in the interval, and repeats the same process in the remaining parts of the range until the atomic word level is attained or the words of the range are exhausted.

In the expanded tree produced in stage 191, the BETWEEN leaves which have been split are replaced by sub-trees made of OR nodes and leaves associated with the sub-ranges. Those leaves are also in the form of BETWEEN clauses, covering thesaurus entries relevant to the query. The expanded tree defines a combination of the relevant thesaurus entries for the subsequent processing.

All the leaves of the expanded tree are associated with respective word or macroword (sub-)ranges. Such range may be defined by its bounds in terms of word or macroword row-ID's in the thesaurus index file.

Figure 38:
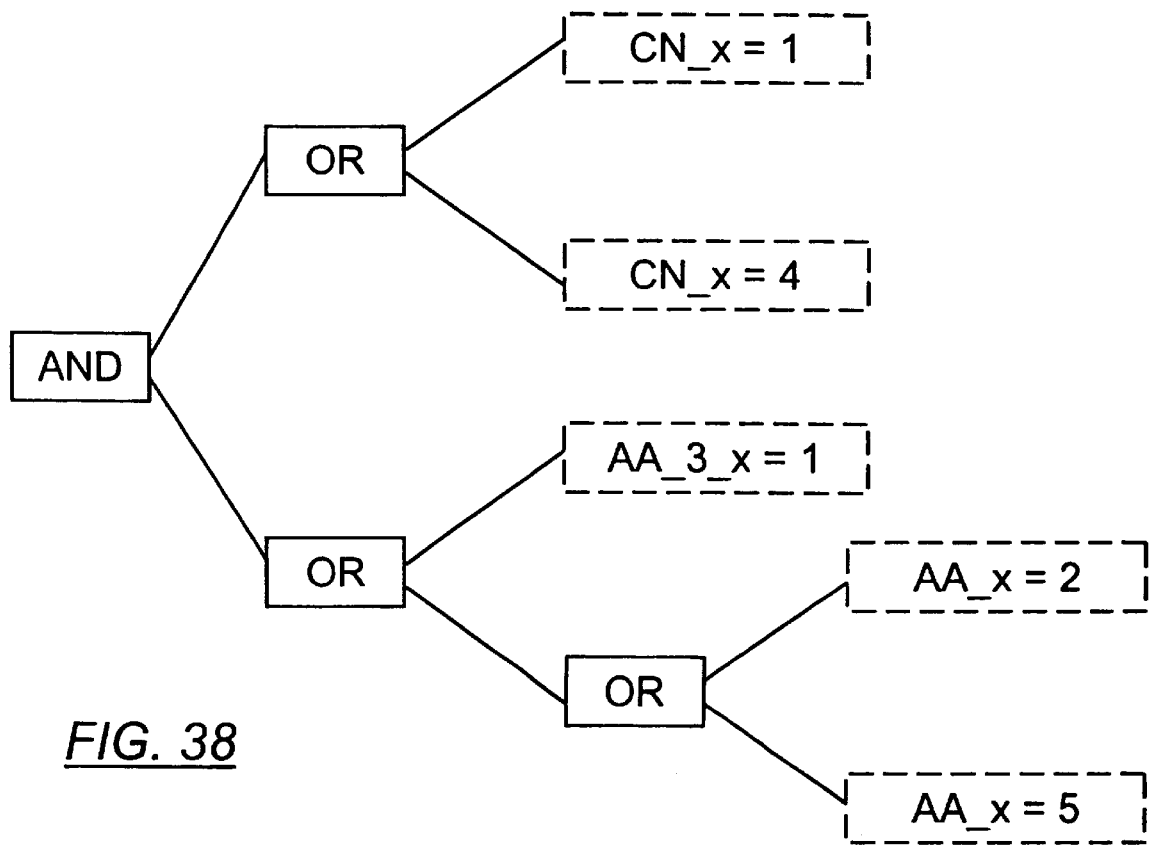
FIG. 38 is another diagram showing an expanded query tree obtained by analyzing the query tree of FIG. 37.

FIG. 38 shows the expanded tree corresponding to the tree of Example 3 (FIG. 37). It is obtained by means of the thesaurus index files of FIGS. 25–27. The one-word ranges "CN=André" and "CN=Max" are not split, but simply encoded by the row-ID's CH__x=1 and 4 of the words in the thesaurus index file, obtained by dichotomic searches. Another search in the accident amount thesauruses of FIGS. 26 and 27 leads to splitting the range 500≦AA≦5000 into three sub-ranges, one for the individual words AA__x=2 and 5, and one for the macroword AA__3__x=1.

Figure 39:
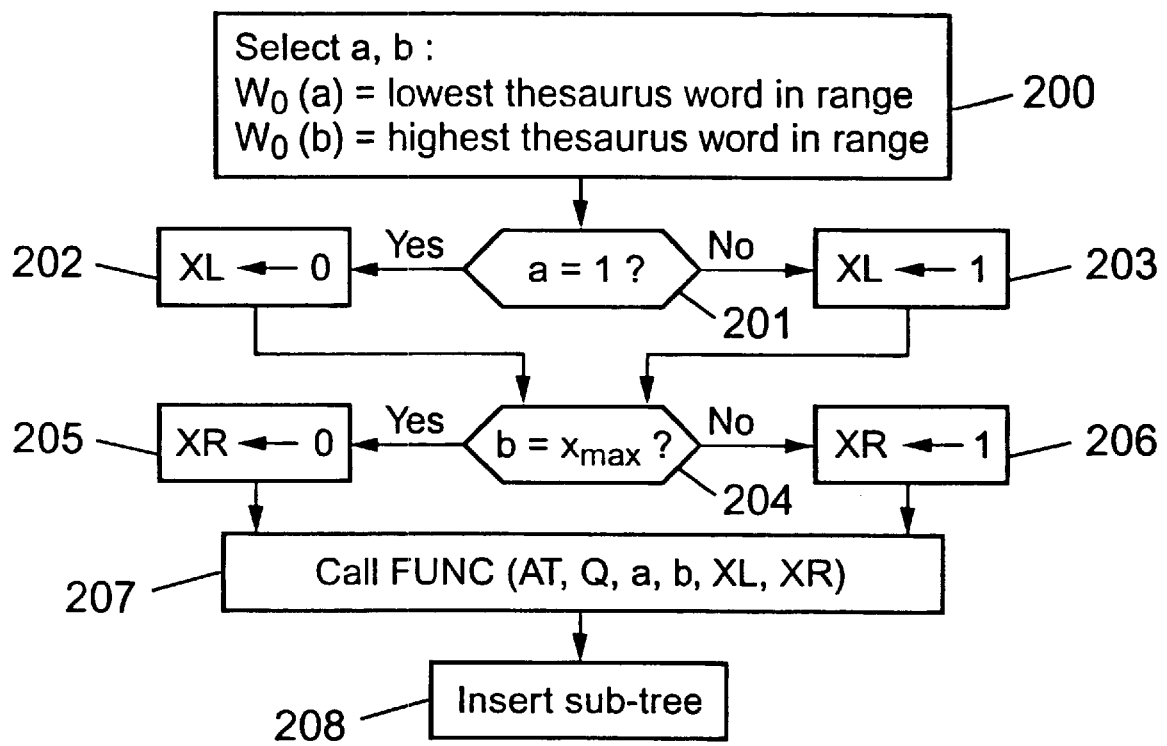
FIG. 39 is a flow chart showing a procedure of analyzing the query tree.

FIG. 39 shows a flow chart of an optimal procedure for splitting a BETWEEN clause in stage 191 of FIG. 36. It is assumed that the (connected) range does not include the Null value (otherwise the leaf can be first split into two substitute leaves linked by an OR node, one leaf with the individual word row-ID AT__x=0, and the other satisfying the above assumption).

It is also assumed that the attribute AT considered in the BETWEEN clause has a number Q≧0 of macroword thesauruses indexed by an integer level parameter q with 1≦q≦Q, the level q=0 designating the individual word thesaurus. For a level q thesaurus, the prefix length (e.g. number of ASCII characters) is noted P(q), with P(0)>P(1)> . . . >P(Q). P(0) is the individual word length. In FIGS. 39–40, $x_{max}$ designates the number of non-Null words in thesaurus 0, $W_q(x)$ designates the (macro)word stored at row-ID=x in the level q thesaurus, and $[W]_{P(q)}$ designates the macroword obtained by truncating a word W to keep its prefix of length P(q), for q≧1.

In the initial step 200 of the procedure of FIG. 39, the program selects the word thesaurus row-ID's a and b such that $W_0(a)$ and $W_0(b)$ are respectively the lowest and highest thesaurus words included in the range defined for the leaf being processed. The integers a and b are readily selected by dichotomic searches in the word thesaurus based on the range bounds. If the search shows that the range covers no thesaurus word, the procedure is terminated by specifying that the leaf output will be an empty flat file row-ID list.

If $W_0(a)$ is the lowest word of the thesaurus (a=1 in test 201), the binary variable XL is initialized as XL=0 in step 202. Otherwise, it is initialized as XL=1 in step 203. If $W_0(b)$ is the highest word of the thesaurus (b=$x_{max}$ in test 204), the binary variable XR is initialized as XR=0 in step 205. Otherwise, it is initialized as XR=1 in step 206. In the following steps, the value XL (XR)=0 denotes the fact that the lower (upper) bound of the range under consideration is aligned with a macroword boundary. If it is aligned with a macroword boundary from a level q thesaurus, then this is also true for any level q' thesaurus with 1≦q'≦q. The initialization 201–206 is valid for q=Q.

Figure 40A:
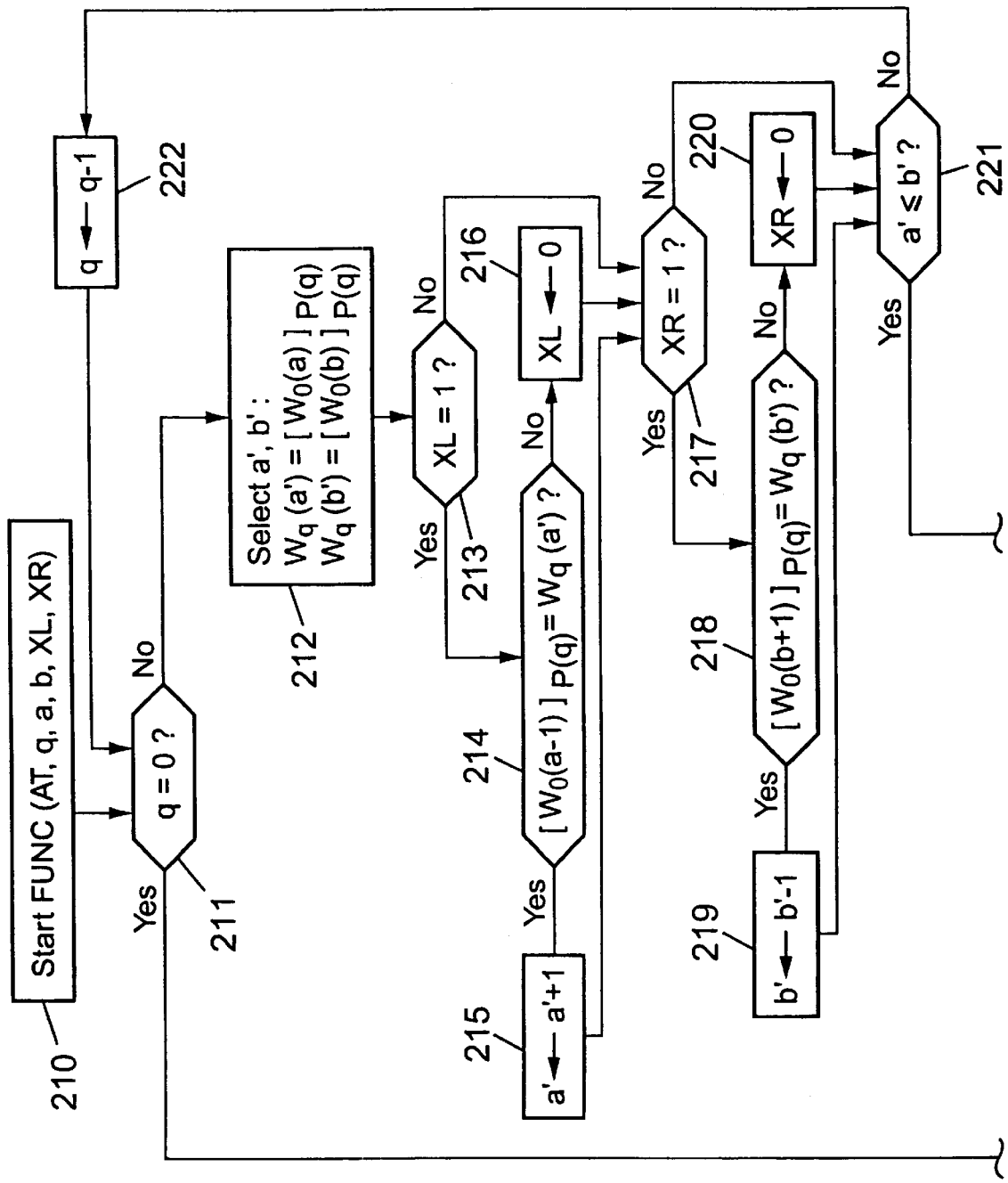
FIG. 40, which is obtained by placing FIG. 40A above
FIG. 40B, is a flow chart of a recursive function referred in the procedure of FIG. 39.

In step 207, the program invokes a function FUNC whose flow chart is represented in FIG. 40. This function returns data describing a sub-tree to be inserted in the place of the processed leaf (step 208). The function FUNC has six arguments input when starting its execution in step 210 of FIG. 40A: the attribute reference AT; a thesaurus level parameter q (q=Q when the function is first invoked in step 207 of FIG. 39); the thesaurus row-ID's a and b of the lowest and highest AT words in the range of interest; and the above-defined variables XL and XR.

After step 210, it is determined whether the thesaurus level parameter q is zero (test 211). If q>0, two macroword thesaurus row-ID's a' and b' are selected in step 212, such that $W_q(a')=[W_0(a)]_{P(q)}$ and $W_q(b')=[W_0(b)]_{P(q)}$. This is done by simple dichotomic searches in the level q thesaurus after truncating the words $W_0(a)$ and $W_0(b)$.

In the following test 213, the variable XL is evaluated. If XL=1, it is determined in test 214 whether the consecutive words $W_0(a-1)$ and $W_0(a)$ share the same level q macroword, i.e. whether $[W_0(a-1)]_{P(q)}=W_q(a')$. If so, the integer a' is increased by one unit in step 215. If $[W_0(a-1)]_{P(q)}<W_q(a')$ in test 214, the value of XL is changed to 0 in step 216 since the lower bound of the range under consideration is aligned with a level q macroword boundary. After step 215 or 216, or when XL=0 in test 213, the variable XR is evaluated (test 217). If XR=1, it is determined in test 218 whether the consecutive words $W_0(b)$ and $W_0(b+1)$ share the same level q macroword, i.e. whether $[W_0(b+1)]_{P(q)}=W_q(b')$. If so, the integer b' is decreased by one unit in step 219. If $[W_0(b+1)]_{P(q)}>W_q(b')$ in test 218, the value of XR is changed to 0 in step 216 since the upper bound of the range under consideration is aligned with a level q macroword boundary.

After step 219 or 220, or when XR=0 in test 217, the variables a' and b' are compared in test 221. If a'>b', no level q macroword is spanned by the range under consideration, the program decrements q by one unit in step 222 and comes back to step 211.

Figure 40B:
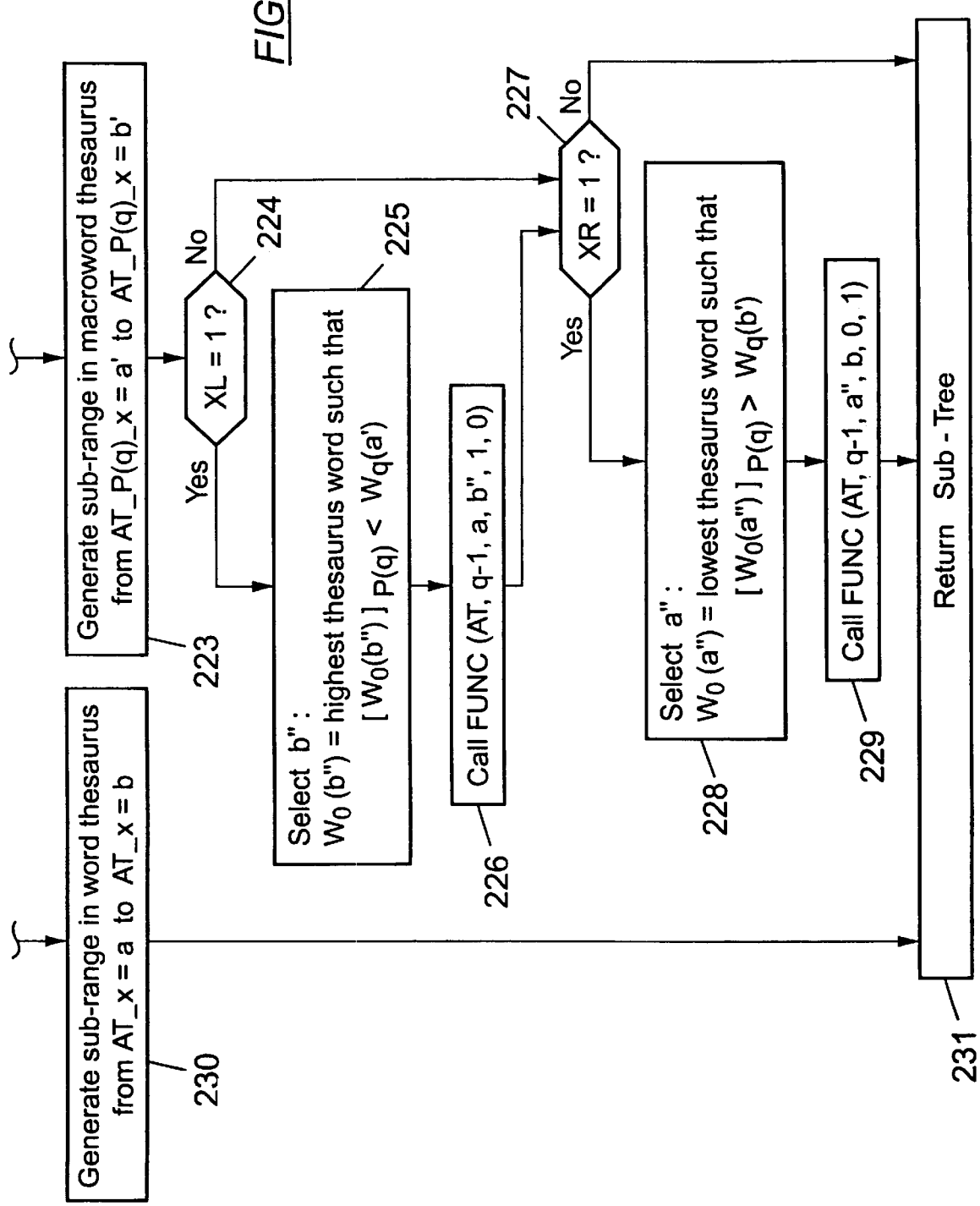

When a'≦b' in test 221, a sub-range of b'−a'+1 macrowords is generated for insertion into the expanded query tree (step 223 in FIG. 40B). This sub-range covers the macroword row-ID's from AT__P(q)__x=a' to AT__P(q)__x=b'.

Afterwards, the variable XL is evaluated again in step 224. If XL=1, another range has to be considered, below the sub-range generated in step 223. In step 225, the row-ID b" of the upper bound of that lower range is determined: the corresponding word $W_0(b")$ is the highest of the AT thesaurus such that $[W_0(b")]_{P(q)}<W_q(a')$. The function FUNC(AT, q−1, a, b", 1, 0) is then called recursively in step 226, to deal with the additional lower range. After step 226, or when XL=0 in test 224, the variable XR is evaluated again in step 227. If XR=1, another range has to be considered, above the sub-range generated in step 223. In step 228, the row-ID a" of the lower bound of that upper range is determined: the corresponding word $W_0(a")$ is the lowest of the AT thesaurus such that $[W_0(a")]_{P(q)}>W_q(b')$. The function FUNC(AT, q−1, a", b, 0, 1) is then called recursively in step 229, to deal with the additional upper range.

When q=0 in test 211, a sub-range of b−a+1 words is generated for insertion into the expanded query tree (step 230). This sub-range covers the individual word row-ID's from AT__x=a to AT__x=b.

After step 229 or 230, or when XR=0 in test 227, the execution of the function FUNC is terminated in step 231 by returning the data describing the sub-tree, which have been generated in step 223 or 230 and/or which have been returned by the function recursively called in steps 226 and/or 229.

Once the stage 191 of analyzing and expanding the query tree is completed, the expanded tree is processed in stage 192 of FIG. 36, starting from the highest coding layer n. If n>1, the processing is performed successively in the layers k, with k decreasing from n to 1, as shown in the loop represented in FIG. 41.

Figure 41:
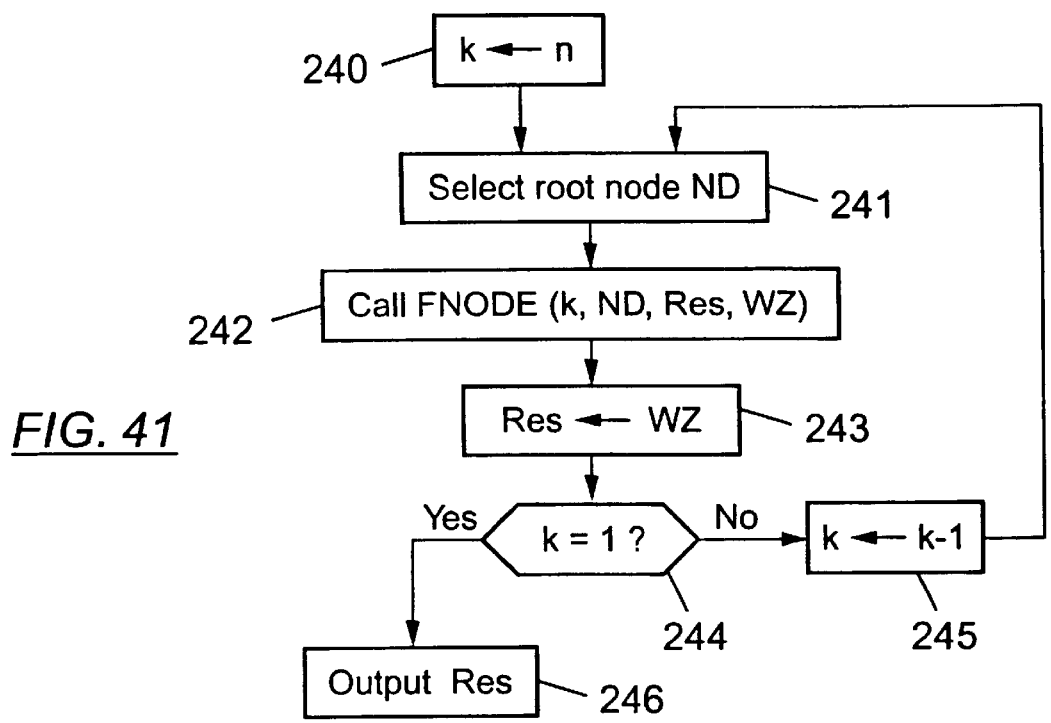
FIG. 41 is the flow chart procedure for identifying matching data graphs based on an expanded query tree as illustrated in FIG. 38.

The coding layer index k is initialized with the value n in step 240 of FIG. 41. The layer k processing is started in step 241 by selecting the root ND of the expanded query tree as a node for calling a function named FNODE (step 242). The input to this function comprise the coding layer index k, the parameters describing node ND and its children nodes, and a bitmap vector Res (initialized in an arbitrary manner for k=n). Its output is a bitmap vector noted WZ. In layer 1, the bits of value 1 of the output bitmap vector WZ indicate the VDG's (flat file row-ID's) matching the query criteria defined by the tree whose root is node ND. In layer k>1, they indicate the respective layer k−1 ranks of the groups of $\Delta k$ flat file row-ID's which include at least one matching flat file row-ID. In each coding layer index k, the function FNODE is called recursively to process all the nodes of the expanded query tree.

The bitmap vector WZ output by the function called in step 242 is saved as the layer k query result Res in step 243, to be used in the subsequent layer k−1 processing if k>1. If so (test 244), the index k is decremented by one unit in step 245, and the next layer processing is started from step 241.

For k=1, Res is the bitmap representation of the desired flat file row-ID list, output in step 246.

A flow chart of function FNODE is shown in FIG. 42. The bitmap vector WZ is considered there as a succession of segments of Dk bits. The segment of rank N of vector WZ (i.e. the (N+1)-th segment with $N \geq 0$) is noted WZ[N]. The bit of rank N of vector WZ (i.e. the (N+1)-th bit with $N \geq 0$) is noted WZ(N). After the function is started (step 248), a working zone is reserved in RAM 103 for containing the bitmap vector WZ (step 249).

In test 250, it is first determined whether ND designates a preset node. A preset node (not illustrated in the example of FIG. 38) is a node for which a flat file row-ID list has already been determined. Typically, that list has been produced as a matching data graph identifier list in the processing of a previous query (output of step 192). It may also be a combination of such matching identifier lists. One or more preset nodes can be defined in the conversion step 190 when the SQL query refers to the results of one or more previous queries, for example to restrict the response to records which were included in the response to the previous queries. This feature is particularly useful when the database is used in interactive mode.

The flat file row-ID list previously determined for a preset node can be stored in RAM 103 or saved in hard drive 105 (preferably in compressed form in the latter case). That list is encoded according to the n coding layers to provide layer k input lists in the form of bitmap vectors for $1 \leq k \leq n$. Such layer k bitmap vector is loaded as WZ in step 251 when test 250 reveals that the node ND is preset.

Otherwise, if ND does not designate a leaf but an operator node (test 252), its first child node ND1 is selected in step 253, and the function FNODE is called recursively in step 254 to obtain the bitmap vector WZ1 corresponding to node ND1. The second child node ND2 of the operator node ND is then selected in step 255, and the function FNODE is called again in step 256 to obtain the bitmap vector WZ2 corresponding to node ND2.

In step 257, the bitmap vectors WZ1 and WZ2 are combined bitwise to form the bitmap vector WZ. The combination (WZ(N)=WZ1(N)⊕WZ(N) for any N) is in accordance with the Boolean operator ⊕ described in the parameters of node ND, e.g. AND, OR, Exclusive OR, etc. operation. It is essentially a superposition of bitmap vectors, which is performed very quickly since both operand vectors are stored in RAM 103. In step 258, the RAM space which has been allocated to working zones WZ1 and WZ2 is released. In FIG. 42, the case where the operator node has two child nodes is only considered. Clearly it can be extended to the case where there are more than two operands. Moreover, some operations may involve a single operand, such as the NOT operation, so that the function FNODE may be call only once.

When node ND is a leaf (test 252), all the bits of the working zone WZ are set to zero in the initialization step 260. In addition, the thesaurus pointer x is initialized to the value x1 of the first row-ID of the BETWEEN range defined for node ND.

If node ND relates to an attribute AT and macroword index q for which the thesaurus is stored in the "low density" format (test 261), the leaf processing is as described below with reference to FIG. 43 (step 262) to obtain the relevant bitmap vector WZ. If the thesaurus format is "normal density", the processing depends on whether the program is in the (chronologically) first layer, that is k=n (test 263). The processing of FIG. 44 is applied if k=n (step 264), and that of FIG. 45 if k<n (step 265).

After step 251, 258, 262, 264 or 265, the execution of function FNODE is terminated in step 266 by returning the bitmap vector WZ.

Figure 43:
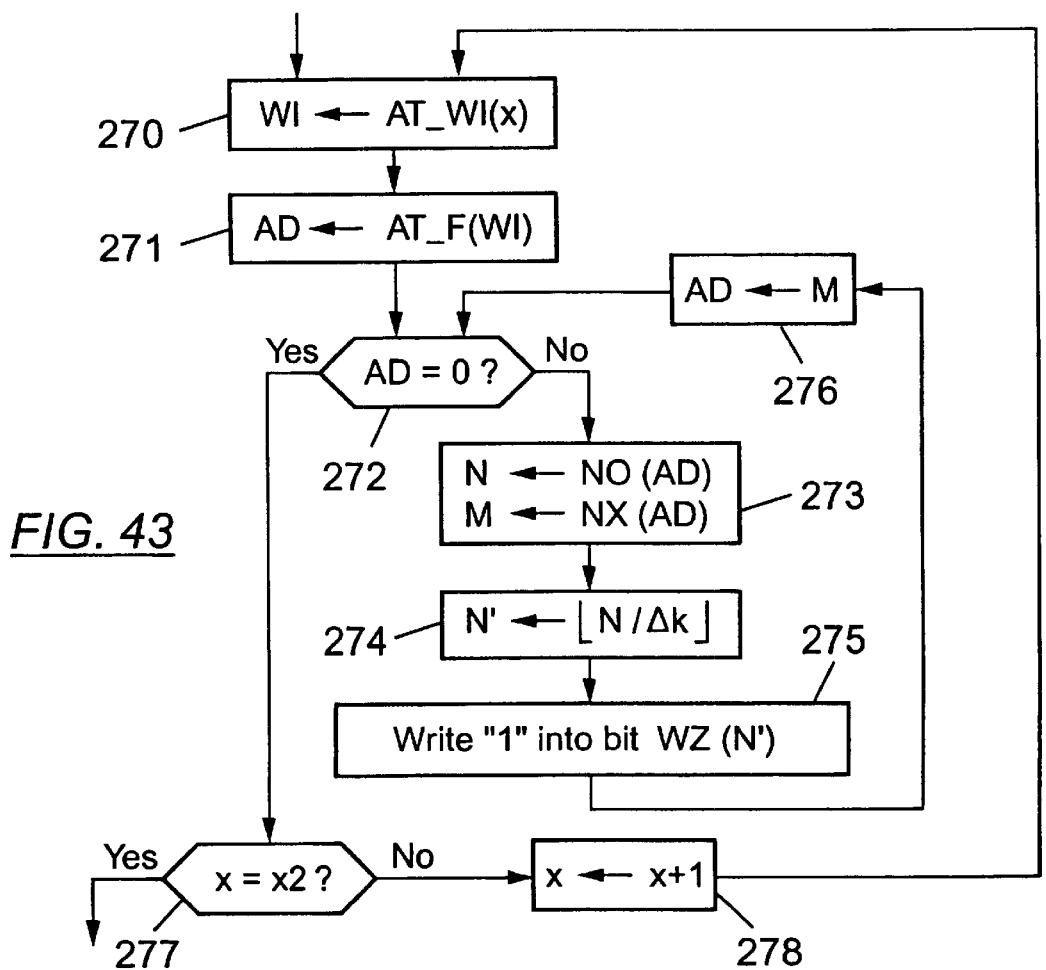
FIGS. 43–45 are flow charts illustrating procedures executed in steps 262, 264 and 265 of FIG. 42, respectively.
Figure 44:
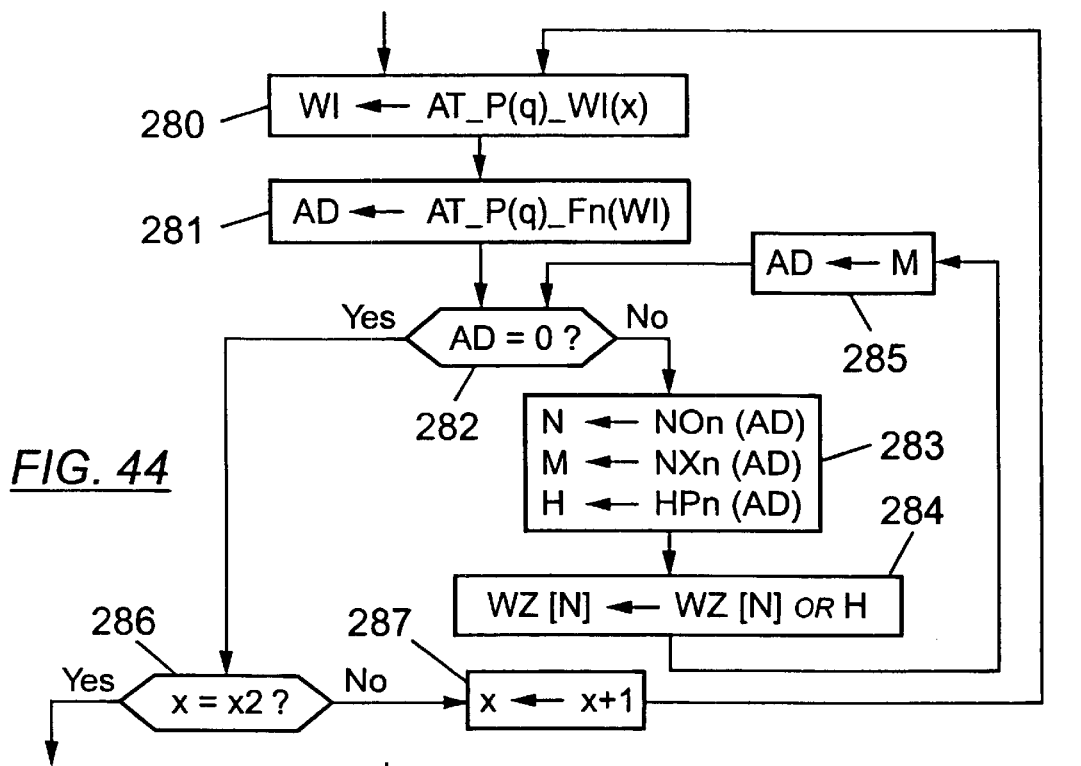

For explaining the low density processing, we assume in FIG. 43 that the thesaurus storage also makes use of record chains: the thesaurus has an index file similar to those of FIGS. 25–27 (the word index stored at row-ID x being noted AT_WI(x)) and an auxiliary table addressed by the word indexes and containing the addresses AT_F(WI) in a data container of the first flat file row-ID's of the record chains. In each record of address AD>0, this data container has, in addition to a flat file row-ID value NO(AD), a next address field for containing a pointer to the next address NX(AD) of the record chain. The chain tail has NX(AD)=0. Alternatively, the low density lists could be stored in individual files for each word (similarly to FIG. 17).

The low density processing of FIG. 43 has a loop in which the words of the BETWEEN range are successively handled. In each iteration, the program first obtains the word index WI=AT_WI(x) in step 270, and then the head address AD=AT_F(WI) in step 271 to initiate the scanning of the record chain. If AD>0 (test 272), there remains at least one item to be examined in the record chain, so that the flat file row-ID value NO(AD) and the next address NX(AD) are read as variables N and M, respectively, in step 273. The Euclidean division of N by $$\Delta k = \prod_{k'=1}^{k-1} Dk'$$

($\Delta 1 = 1$) is made in step 274 to obtain the layer k−1 quotient (rank) N'. For k=1, N'=N. For k>1, this operation 274 is simply a deletion of the $$\sum_{k'=1}^{k-1} \delta k'$$

least significant bits of N (remainder) if the layer k' divisors Dk' are $2^{\delta k'}$ with δk' integer (1≦k'<k). A "1" is then written into bit WZ(N') of the bitmap vector WZ (step 275). The next address M is substituted for AD in step 276 before coming back to the test 272. When the record chain has been completely examined (AD=0 in test 272), it is determined whether the current word×is the last one x2 of the BETWEEN range (test 277). If x<x2, the thesaurus pointer x is incremented by one unit in step 278 for the next iteration of the loop. The loop is over when x=x2 in test 277, and the program proceeds to step 266 of FIG. 42.

The layer n normal density processing of FIG. 44 has a similar loop in which the words or macrowords of the BETWEEN range are successively handled, but without recalculating the (stored) coding data. In each iteration, the program first obtains the word index WI=AT_P(q)_WI(x) in step 280, and then the head address AD=AT_P(q)_Fn (WI) in step 281 to initiate the scanning of the record chain. If AD>0 (test 282), there remains at least one item to be examined in the record chain, so that the layer n rank value NOn(AD), the next address NXn(AD) and the corresponding layer n bitmap segment HPn(AD) are read as variables N, M and H, respectively, in step 283. The bitmap segment H is then superimposed, by an Boolean OR operation, onto the segment WZ[N] of bitmap vector WZ (step 284), and M is substituted for AD in step 285 before coming back to test 282. When the record chain has been completely examined (AD=0 in test 282), it is determined whether the current word x is the last one x2 of the BETWEEN range (test 286). If x<x2, the thesaurus pointer x is incremented by one unit in step 287 for the next iteration of the loop. The loop is over when x=x2 in test 286, and the program proceeds to step 266 of FIG. 42.

Figure 45:
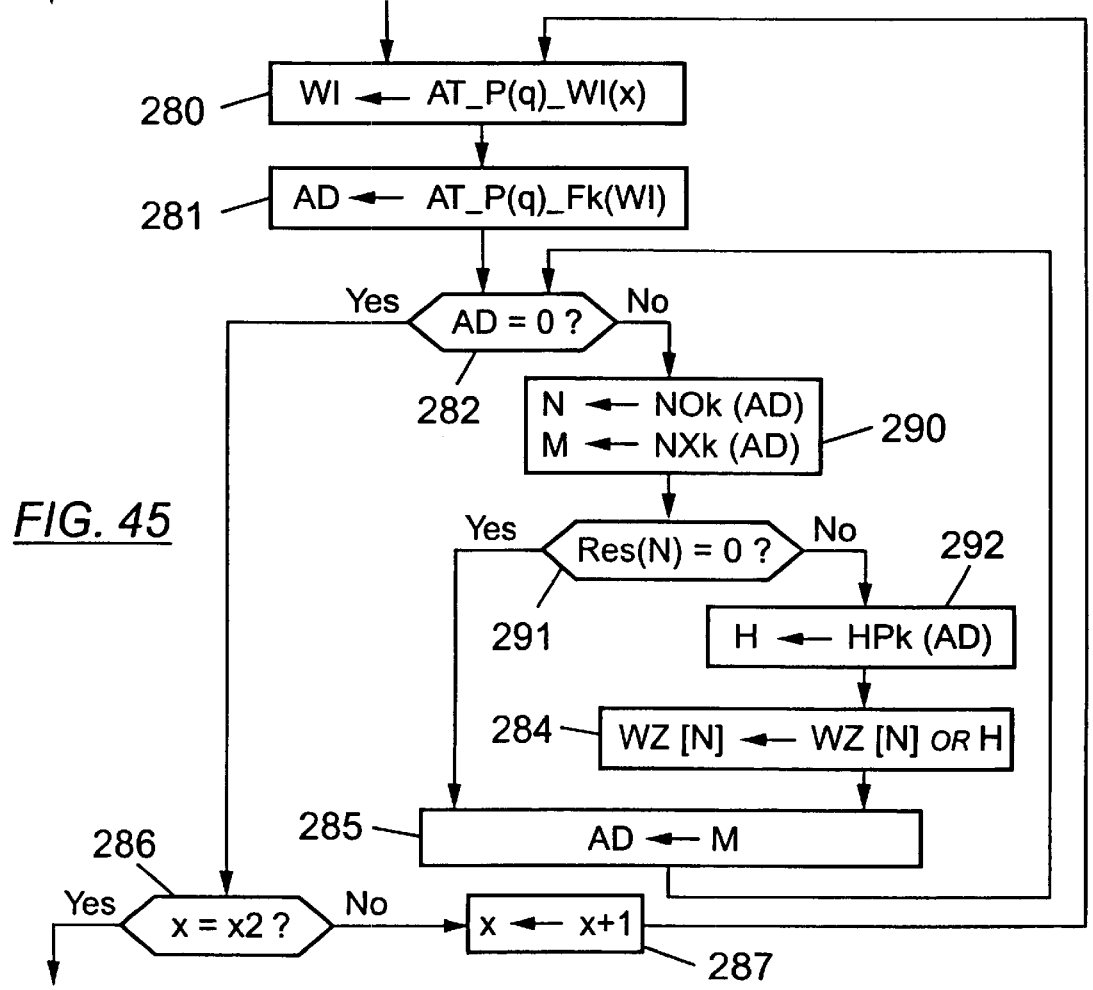

The layer k<n normal density processing is detailed in FIG. 45 in the case where the thesauruses are arranged as illustrated in FIGS. 25–32. It takes advantage of the fact that, even where NOk(AD) belongs to a layer k rank list associated with a word or macroword of the BETWEEN range, it is useless to access the bitmap segment HPk(AD) if there is a zero in the bit of rank NOk(AD) of the bitmap vector Res obtained in the preceding layer k+1.

The procedure of FIG. 45 is comparable to that of FIG. 44. Steps 280–282 and 285–287 are the same with k substituted for n. However, when a record chain is to be examined (AD>0 in test 282), only the layer k rank value NOk(AD) and the next address NXk(AD) are read as variables N and M in step 290. The bit Res(N) of the layer k+1 result bitmap Res is then evaluated in test 291. If Res(N)=0, the rank N is filtered out by jumping directly to step 285. Otherwise (Res(N)=1), the bitmap segment HPk(AD) is read in step 293 before proceeding to step 284.

With the arrangement of the thesaurus entry coding data, it is noted that the loops of FIGS. 44 and 45 will generally imply the successive reading of contiguous data container records (steps 283 and 290), because each word of index WI has its coding data stored at consecutive addresses AD in the data container, as well as most consecutive words of the BETWEEN range. Therefore, those loops can be executed efficiently by loading blocks of data container records by means of the computer cache memory, thereby reducing the required number of disc accesses. The same consideration applies to the low density data NO(AD) and NX(AD) read in step 273 of FIG. 43.

Figure 46:
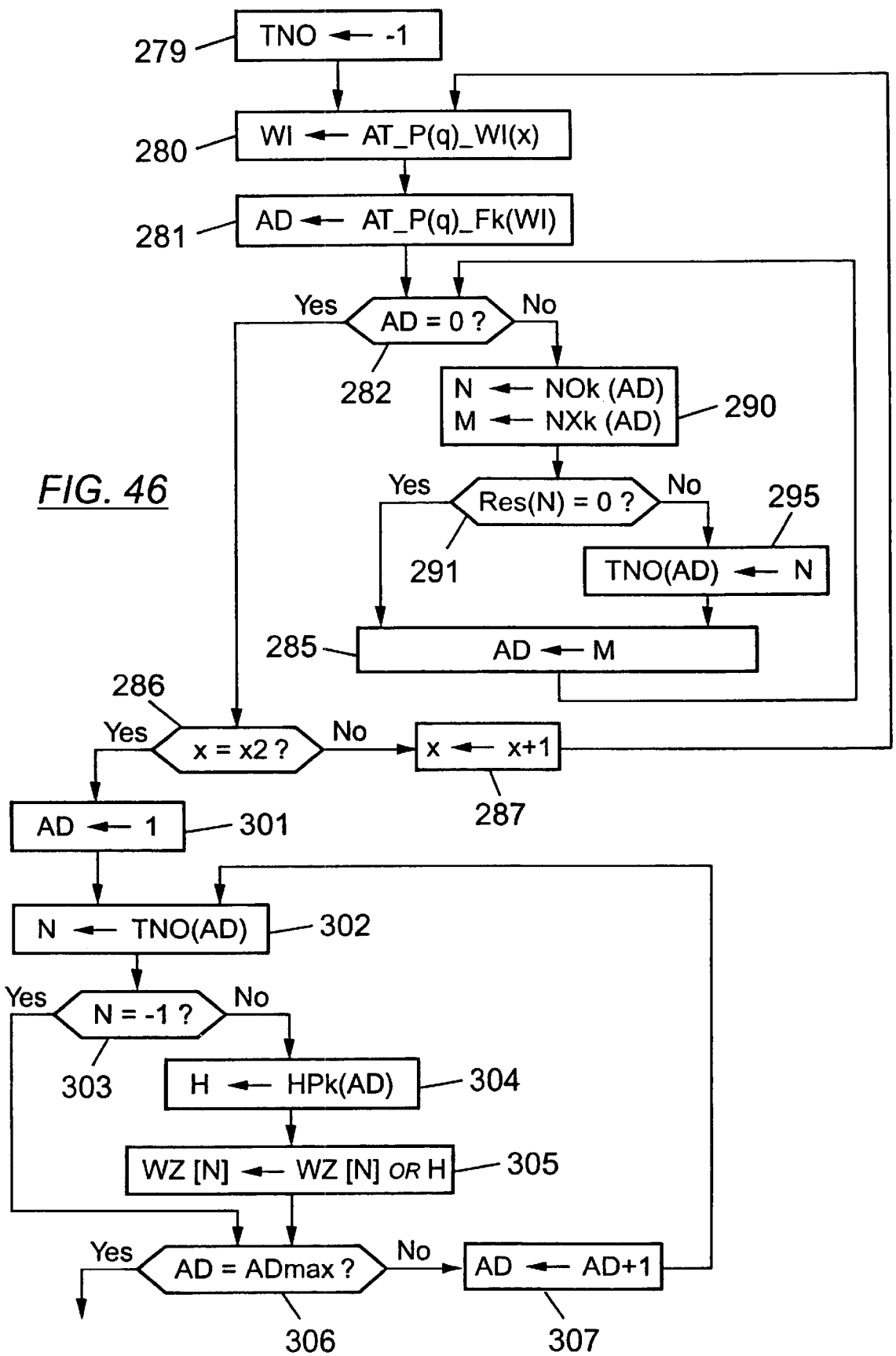
FIG. 46 is a flow chart showing an alternative embodiment of the procedure of step 265 of FIG. 42.

A further improvement is obtained with the layer k<n normal density processing shown in FIG. 46, which is made of two successive loops. The first loop, indexed by the thesaurus pointer x, is for determining a temporary rank table noted TNO, which is used to handle the bitmap segments in the second loop. Table TNO has a number of addresses which is at least equal to the number of addresses ADmax of the data container in which the layer k coding data of the current thesaurus (AT, q) are stored. Each entry TNO(AD) of address AD in the rank table TNO is for containing an integer representing the rank NOk(AD) if it is useful to access the bitmap segment HPk(AD), or else a default value (−1).

In the initialization step 279, all entries of the rank table TNO are set to the default value −1. The first loop is comparable to that of FIG. 45. When Res(N)=1 in test 291, the rank N is written at address AD into table TNO in step 295 before substituting M for AD in step 285.

When the first loop is over (x=x2 in test 286), the program proceeds to the second loop which is initialized with AD=1 in step 301. In each iteration of the second loop, the contents N of the rank table TNO at address AD, read in step 302, are compared with the default value in test 303. If N is a valid rank value (≠−1), the bitmap segment HPk(AD) is read (step 304) and superimposed, by a bitwise Boolean OR operation, onto the segment WZ[N] of the bitmap vector WZ (step 305). If AD<ADmax (test 306), the rank table address AD is incremented by one unit in step 307 before coming back to step 302. The second loop is over when AD=ADmax in test 306, and the program proceeds to step 266 of FIG. 42.

In addition to filtering out the bitmap segments HPk(AD) that are not worth reading, the procedure illustrated by FIG. 46, owing to the rank table TNO, groups the read operations in the file containing the layer k bitmap segment data based on the address AD (step 304 in the second loop). Such grouping is not only done word by word but for all words of the BETWEEN range: when the HPk file is eventually read in the second loop, no more distinction is made between the words for which a rank value has been written into table TNO. This takes maximum advantage of the blockwise access to the HPk file, and provides a very significant advantage because the lower layers, especially layer 1, imply the largest HPk files and the highest numbers of read operations therein.

Figure 47:
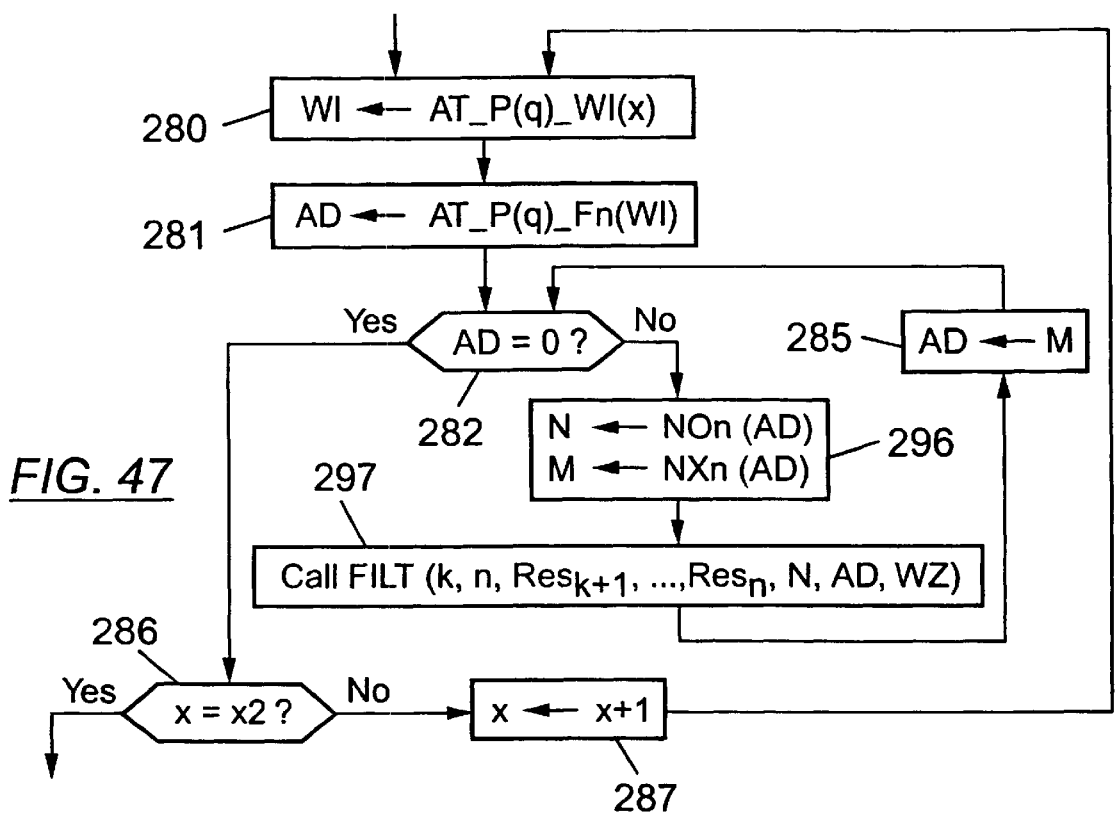
FIG. 47 is a flow chart showing another alternative embodiment of the procedure of step 265 of FIG. 42, when the thesauruses are stored as illustrated in FIGS. 34A and 34B.

FIG. 47 shows how the procedure of FIG. 45 can be adapted when the coding data containers are stored as illustrated in FIGS. 25–30 and 34A–B. The loop has a similar structure. However, since the coding data are accessed from the highest layer n, the address AD read in step 281 is the head address AT_P(q)_Fn(WI) of the record chain in the layer n data container, and when AD>0 in step 282, the rank value NOn(AD) and next address NXn(AD) read as variables N and M in step 296 also relate to layer n. After step 296, a filtering function FILT is called in step 297 before substituting M for AD in step 285.

Figure 48:
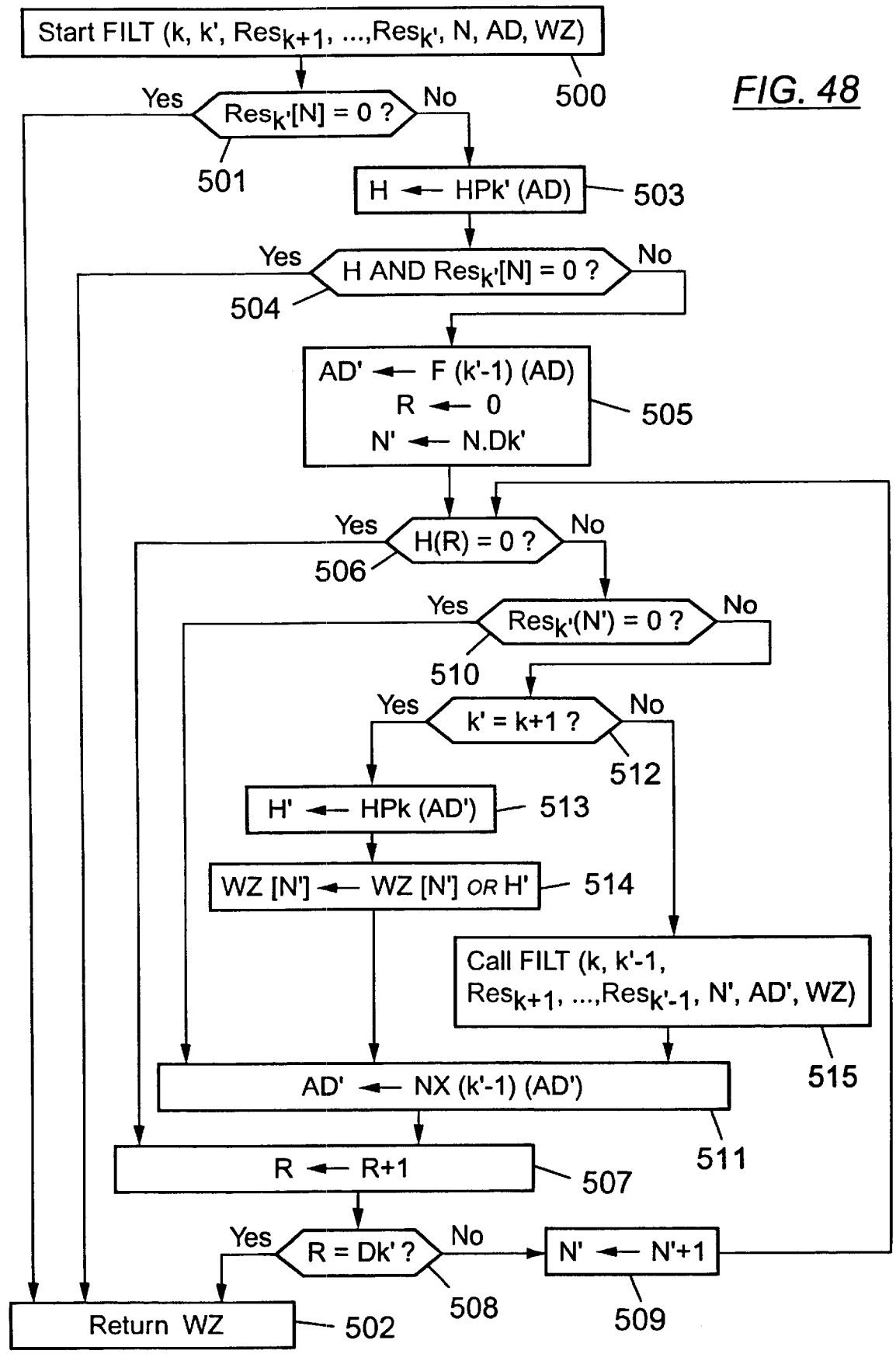
FIG. 48 is a flow chart of a recursive function FILT called in the procedure of FIG. 47.

A flow chart of this function FILT is shown in FIG. 48. Its arguments, input when starting its execution in step 500, are as follows (in addition to the attribute name and macroword level which are implicit in FIGS. 47–48):

a first coding layer index k, corresponding to the first argument of the function FNODE called in step 242 of FIG. 41;

a second coding layer index k'>k, with k'=n when the function FILT is called in step 297 of FIG. 47;

k'−k bitmap vectors $Res_{k+1}$, $Res_{k+2}$, . . . , $Res_{k'}$, where $Res_{k+1}$ is the layer k+1 query result Res. If k'>k+1, $Res_{k+2}$, . . . , $Res_{k'}$ to are the bitmap vectors obtained, in step 243 of FIG. 41, by encoding Res in the higher layers;

a layer k' rank N, with N=NOn(AD) when the function FILT is called in step 297 of FIG. 47;

the corresponding record address AD in the layer k' data container; and the bitmap vector WZ which is being calculated.

In test 501, it is determined whether the (N+1)-th segment of the bitmap vector $Res_{k'}$ is only made of zeroes. If so, it is not necessary to read any further coding data relating to the layer k' rank N, so that the execution of the function is terminated in step 502 by returning the bitmap vector WZ.

If the segment $Res_{k'}[N]$ has at least one "1" in test 501, the bitmap segment HPk'(AD) is read as segment variable H in step 503, and the intersection segment H AND $Res_{k'}[N]$ is evaluated in test 504. If this intersection segment is only made of zeroes, it is also useless to read any further coding data, and the program directly proceeds to step 502.

If test 504 reveals that H AND $Res_{k'}[N]$ has at least one "1", it is necessary to get into the lower layer record chain. Its head address F(k'−1)(AD) is read as variable AD' in step 505, while the layer k' remainder R is initialized to 0 and the layer k'−1 rank N' is initialized to N×Dk'. The bitmap segment H=HPk'(AD) is scanned in a loop in which its bits H(R) are successively examined (test 506) to ascertain whether the rank N'=N×Dk'+R should be regarded. If H(R)=0, the rank N' is not in the layer k' coding data of the current thesaurus entry, so that it is disregarded: R is incremented by one unit in step 507 and if the new R is still smaller than Dk' (test 508), N' is also incremented by one unit in step 509 before proceeding to the next iteration from test 506.

If H(R)=1 in test 506, the (N'+1)-th bit of the vector $Res_{k'}$ is examined in test 510 to determine whether the layer k'−1 rank N' has been filtered out in the higher layer processing. If so ($Res_{k'(N')}=0$), the program jumps to the next position in the layer k'−1 record chain by replacing AD' by the next address NX(k'−1)(AD') in step 511. After step 511, the program proceeds to the above-described step 507.

If $Res_{k'}(N')=1$ in test 510, the processing depends on whether the coding layer k' is immediately above k (test 512). If k'=k+1, the bitmap segment HPk(AD') is read (step 513) and superimposed, by a bitwise Boolean OR operation, onto the segment WZ[N'] of the bitmap vector WZ (step 514). If k'>k+1 in test 512, the recursive function FILT is called in step 515 with the arguments k, k'−1, $Res_{k+1}$, ..., $Res_{k'-1}$, N', AD' and WZ. After step 514 or 515, the program proceeds to the above-described step 511.

The scanning of the bitmap segment H=HPk'(AD) is over when R=Dk' in test 508. The updated bitmap vector WZ is then returned in step 502.

When the coding data containers are arranged as illustrated in FIGS. 34C–D, the scanning of the layer k' bitmap segment in loop 505–509 is replaced by the scanning of the layer k' remainders in the record chain of the layer k'−1 coding data container.

The procedure of FIGS. 47–48 has the advantage that the lower layer record chains are accessed only when it is strictly necessary. In particular, it is noted that the loop 282–285 of FIG. 45 requires the reading of all the layer k ranks (step 290) relating to the current thesaurus entry while it may be already known from the k+1 processing that some ranks will be disregarded (Res(N)=0 in test 291). When this occurs in FIGS. 47–48, the rank N is not read in the hard drive (it is not even stored). This advantage is very significant since the lower layers, particularly layer 1, have the largest coding data containers, so that plenty of useless read operation are avoided.

It is noted that the use of a rank table TNO according to FIG. 46 is quite compatible with the procedure of FIGS. 47–48. The first loop 280–287 of FIG. 46 is simply replaced by that of FIG. 47, and steps 513–514 of FIG. 48 are replaced by writing N' into TNO(AD').

It is noted that the loops of FIGS. 43–47 may cover not only a BETWEEN range in a thesaurus, but generally words and/or macrowords whose coding data are stored in the same data container, and which are combined in an OR type of operation. Instead of running the loops from x=x1 to x=x2, an iteration is made for each one of such word or macroword.

For example, if the word and macroword thesauruses for a given attribute share the same data container, the loop may be executed only once for all relevant values of the attribute, i.e. for the sub-tree which, in stage 191 of FIG. 36, has been substituted for the corresponding node of the query tree.

In addition, such words and/or macrowords may possibly belong to different thesauruses (which requires a suitable labeling of the OR nodes of the query tree). For example, if a query aims at the accidents undergone by a certain client or having a damage amount greater than a given value, and if the client and accident amount thesauruses share the same data containers (as in FIGS. 31–32), the client and accident amount attributes may be examined within the same first loop of FIG. 46, and the TNO table scanned only once to retrieve all the relevant HP1 segments.

However, it is preferable to have one data container for each thesaurus and each macroword level, as indicated previously. An advantage of this is to reduce the sizes of the rank tables TNO used in the procedure of FIG. 46.

It is also noted that, when encoding the leaves of the expanded query tree, it is possible to use the word indexes AT_P(q)_WI(x) instead of the thesaurus row-ID's x. A list of word indexes is then encoded for each leaf of the expanded query tree. Accordingly, the tree expansion procedure 191 is carried out with reference to the thesaurus word index files, whereas they are not used in the processing of stage 192, which directly calls the record chain head addresses by means of the word indexes. This is useful when the word indexes do not coincide with the thesaurus row-ID's (contrary to FIGS. 25–27), which will normally happen as the database lives.

In the preferred case where separate coding data files are used for each thesaurus word, as in FIG. 17, the layer n processing of step 264 is similar to that shown in FIG. 44. The loop is not performed in a common data container (with the loop index AD), but in the individual coding data files AT_P(q)_W_NOk and AT_P(q)_W_HPk (with a loop index i as in FIG. 33). Optimal disc access is ensured without any thesaurus sorting. The layer k<n processing of step 265 does not need two loops as in FIG. 46. It may be in accordance with FIG. 49.

Figure 49:
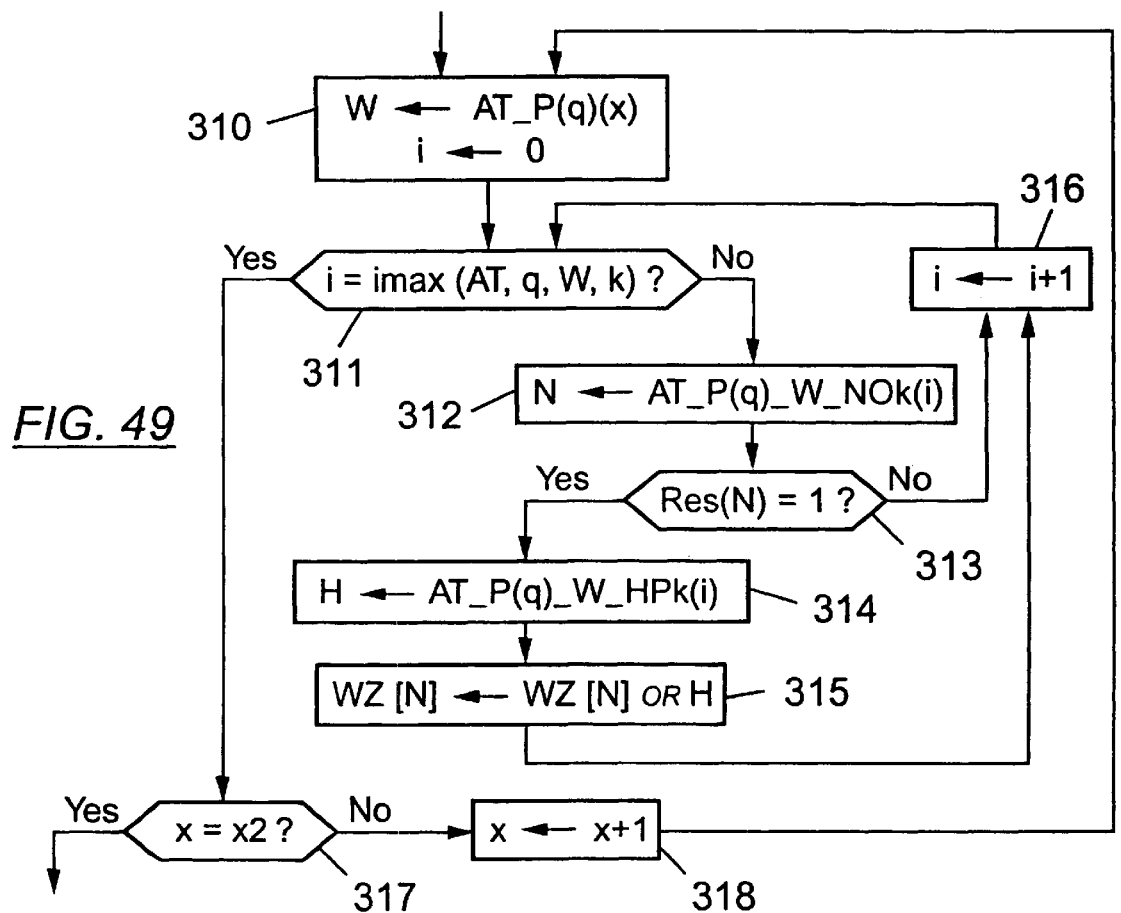
FIG. 49 is a flow chart showing another alternative embodiment of the procedure of step 265 of FIG. 42, when the thesauruses are stored as illustrated in FIG. 17.

The first step 310 of the procedure shown in FIG. 49 consists in allocating the value AT_P(q)(x) of the word of rank x in the current thesaurus to the word variable W, and in initiating the loop index i to zero. As long as i is lower than the total number imax(AT, q, W, k) of layer k records in the coding data file relating to thesaurus AT, macroword level q and word W (test 311), steps 312–315 are performed. In step 312, the rank AT_P(q)_W_NOk(i) is assigned to the integer variable N. Those rank data are read block by block to minimize the disc accesses. In the following test 313, the bit Res(N) of the layer k+1 result bitmap Res is evaluated. If Res(N)=1, the bitmap segment AT_P(q)_W_HPk(i) is read in step 314 and superimposed, by an Boolean OR operation, onto the segment WZ[N] of bitmap vector WZ in step 315, whereby any "1" in AT_P(q)_W HPk(i) is written at the corresponding position into WZ[N] and any "0" in AT_P(q)_W HPk(i) leaves unchanged the corresponding bit of WZ[N]. The bitmap segment data AT_P(q)_W_HPk(i) are also read by blocks. In step 316, performed after step 315 or when Res(N)=0 in test 313, the loop index i is incremented by one unit before coming back to test 311. When the relevant coding data have been completely examined (i=imax(AT, q, W, k) in test 311), it is determined whether the current word x is the last one x2 of the BETWEEN range (test 317). If x<x2, the thesaurus pointer x is incremented by one unit in step 318 before coming back to step 310 for the next iteration of the loop. The loop is over when x=x2 in test 317.

Figure 50:
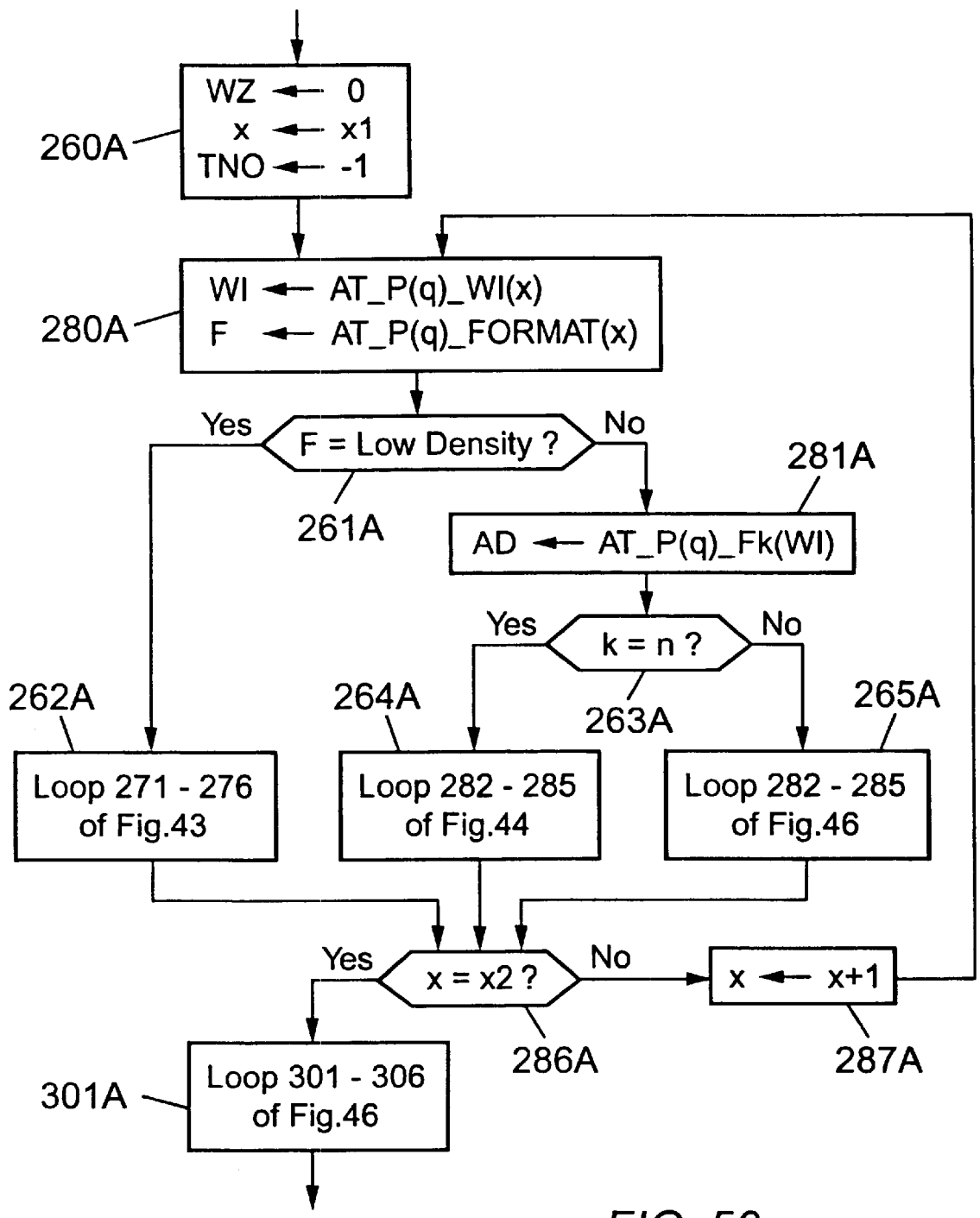
FIG. 50 is a flow chart of a variant of a leaf processing used in the function of FIG. 42.

FIG. 50 shows an alternative way of performing the leaf processing of FIG. 42 (when test 252 is positive), in the case where the coding format of the flat file row-ID lists is specified in the thesaurus index registers, as shown in the right part of FIGS. 25–27.

The initialization step 260A is similar to that 260 of FIG. 42, except that the rank table TNO is initialized to the default value at the same time. In step 280A, the word index WI=AT_P(q)_WI(x) and the corresponding format F=AT_P(q)_FORMAT(x) are read from the AT level q thesaurus index register. If F designates "low density" (test 261A), the loop 271–276 depicted in FIG. 43 is executed in step 262A. Otherwise (F designates "normal density" with n coding layers), the head address AD=AT_P(q)_Fk(WI) is read in step 281A to initiate the scanning of a record chain. If we are in the first coding layer k=n (test 263A), the loop 282–285 depicted in FIG. 44 is executed in step 264A. Otherwise, the first loop 282–285 of FIG. 46 is executed in step 265A. After step 262A, 264A or 265A, the current thesaurus pointer x is compared with the upper bound x2 of the BETWEEN range in test 286A, to be incremented in step 2870A before coming back to step 280A if x<x2. When x=x2 in test 286A, the table TNO is exploited in step 301A, which is identical to the second loop 301–306 of FIG. 46, in order to complete the bitmap vector WZ returned in step 266 of FIG. 42.

QUERY OUTPUT

The SQL query further specifies how the data matching the query criteria should be presented in the response. Therefore, the next stage 193 of the query processing (FIG. 36) is the preparation of the results for their display in stage 194.

Typically, the query defines a list of attributes whose values should be included in the displayed response ("SELECT" and "FROM" clauses in the SQL query, with FROM specifying the relevant data tables and SELECT specifying the relevant columns in those tables).

When a link table of the type shown in FIG. 9 is stored, the columns of that link table corresponding to the listed attributes are read in the matching rows, identified in the bitmap vector Res output in step 246 of FIG. 41, in order to obtain the links pointing to the relevant data tables. The attribute values are then retrieved from the data tables for display.

Another possibility is to scan the thesaurus relating to such attribute and to compute the bitwise Boolean AND between the result bitmap vector Res and each encoded bitmap vector of the thesaurus. Every time there is a hit between those vectors (a "1" in the AND output vector), the corresponding thesaurus word will be displayed or otherwise processed. This permits the attribute values of the response to be retrieved without using any link or data table.

The AND operations may be performed directly in layer 1. They can also be performed as previously, by decrementing the layer index from k=n to k=1. This requires the layer k results which can be calculated from the layer 1 bitmap vector Res. The latter option optimizes the disc access by taking advantage of the multi-layer VDG compression scheme.

Such scanning may also be accelerated by taking advantage of the macroword thesauruses. The highest level thesaurus of an attribute is first scanned, and the portions of the lower level thesaurus(es) covered by a given macroword are scanned only if a hit has been observed for the macroword.

Figure 51:
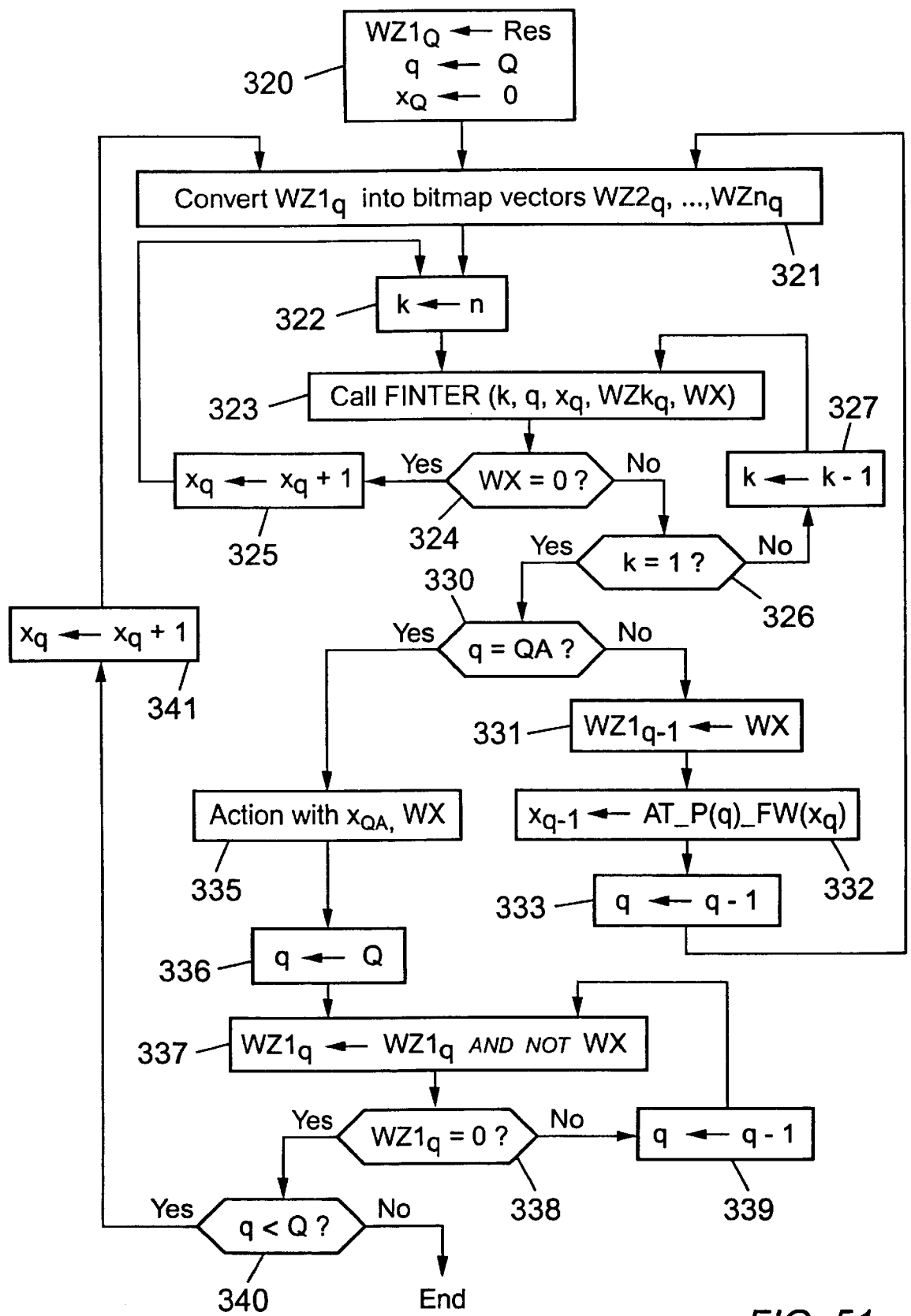
FIG. 51 is a flow chart showing a procedure applicable for scanning the thesaurus relating to a given attribute in order to retrieve the attribute values relevant to a database query.

FIG. 51 shows a procedure suitable for accessing the values to be included in the response for a given attribute AT by scanning the corresponding macroword and/or word thesauruses, which fully takes advantage of both the macroword grouping and the VDG compression scheme.

As before, it is assumed that the attribute AT has a number $Q+1 \leq 1$ of thesauruses indexed by a level parameter q with $0 \leq q \leq Q$, having respective prefix lengths P(q) with $P(0) > P(1) > \ldots > P(Q)$, the level parameter q=0 designating the individual word thesaurus, whose prefix length corresponds to the attribute word length. In the notations of FIG. 45:

QA is an integer with $0 \leq QA \leq Q$ representing a degree of accuracy expected in the query result; QA is set to 0 for maximum accuracy;

the thesaurus pointer $x_q$ is a row-ID in the AT thesaurus index register of level q;

for $q \leq QA$, $WZ1_q$ is a bitmap vector which represents a layer q target list of data graph identifiers which match the query criteria and should be examined in connection with the level q thesaurus word $x_q$. In the initialization step 320, the result bitmap vector Res, output in step 246 of FIG. 41, is assigned to the vector $WZ1_Q$ which thus represents the flat file row-ID's matching the query criteria;

for k>1, $WZk_q$ designates a bitmap vector in which each bit of rank N (i.e. the (N+1)-th bit) indicates whether the (N+1)-th segment of D(k−1) bits of $WZ(k-1)_q$ includes at least one "1", in accordance with the VDG compression scheme ($0 \leq q \leq Q$). $WZk_q$ is referred to as a layer k and level q filtering list for $QA \leq q \leq Q$ and $1 \leq k \leq n$. Working zones are reserved in RAM 103 for containing the bitmap vectors $WZk_q$ which need not be stored in the hard drive.

In the initialization step 320, the indexes q and $x_Q$ are set to q=Q and $z_Q=0$, in order to start scanning the highest level thesaurus. In the conversion step 321, the bitmap vector $WZ1_q$ is processed to provide the corresponding higher layer vectors $WZk_Q$ (1<k≤n).

The coding layer index k is set to n in step 322, and a function FINTER is called (step 323) to determine the intersection between the integer list represented in the layer k coding data of the thesaurus entry $x_q$ and the filtering list represented by the bitmap vector $WZk_q$. The input to this function comprise the coding layer index k, the (macro)word thesaurus level q, the (macro)word index $x=x_q$, and the bitmap vector $WZ=WZk_q$. Its output is another bitmap vector having the same dimension, noted WX, which represents the integer list intersection.

The bitmap vector WX output by the function FINTER called in step 323 is tested in step 324 to determine whether at least one of its bits is "1". If not, the (macro)word pointed to by $x_q$ does not cover any attribute value relevant to the query, so that the thesaurus pointer $x_q$ is incremented by one unit in step 325, and the program comes back to step 322 to examine the next (macro)word of the level q thesaurus.

If the bitmap vector WX has at least one "1" and if k>1 (following test 326), the layer index k is decremented by one unit in step 327. The next layer processing is then started from step 323.

When k=1 in test 326, WX≠0 is the bitmap representation of the list of flat file row-ID's which are represented both in the result bitmap vector Res and in the coding data of the current (macro)word $x_q$.

If q>QA (test 330), this bitmap vector WX is saved as $WZ1_{q-1}$ in step 331. The row-ID AT_P(q)_FW($x_q$) of the first "child" of macroword $x_q$ in the lower level thesaurus is then read in the level q thesaurus and assigned as a starting value of the thesaurus pointer $x_{q-1}$ (step 332). The thesaurus level q is then decremented by one unit in step 333, and the lower level processing is started from step 321.

When q=QA in test 330, the word pointed to by $x_{QA}$ (if QA=0), or a word covered by the macroword pointed to by $x_{QA}$ (if QA>0), is an attribute value of a data graph matching the query criteria. In step 335, a certain action is taken based on this word or its thesaurus pointer $x_{QA}$ and the corresponding bitmap vector WX. The latter vector identifies the rows of the flat file which contain the (macro)word $x_{QA}$ in the AT column and which satisfy the query criteria. The type of action depends on the SQL query. Different possibilities will be described further on.

After step 335, the higher level bitmap vectors $WZ1_q$ are updated to remove any "1" present at the same location as in WX. Such a "1" stands for a data graph having the word pointed to by $x_{QA}$ (if QA=0), or a word covered by the macroword pointed to by $x_{QA}$ (if QA>0), as the value of attribute AT; therefore, no other word will have a hit with it, so that it can be removed. To initialize the update, the index q is taken equal to Q in step 336. In step 337, the Boolean operation $WZ1_q$ AND NOT WX is performed bit by bit, and the result becomes the updated $WZ1_q$. If the resulting bitmap vector $WZ1_q$ has at least one "1" remaining (test 338), the thesaurus level index q is decremented by one unit in step 339, and step 337 is repeated.

If $WZ1_q$ consists only of zeroes in test 338, it is not necessary to continue the update in the lower levels. If q≦Q (test 340), the (macro)word pointed to by $x_q$ does not cover any more attribute value relevant to the query: the thesaurus pointer $x_q$ is incremented in step 341, and the program comes back to step 321 to examine the next (macro)word of the level q thesaurus.

The scanning of the thesauruses for attribute AT is over when q=Q in test 340.

Figure 52:
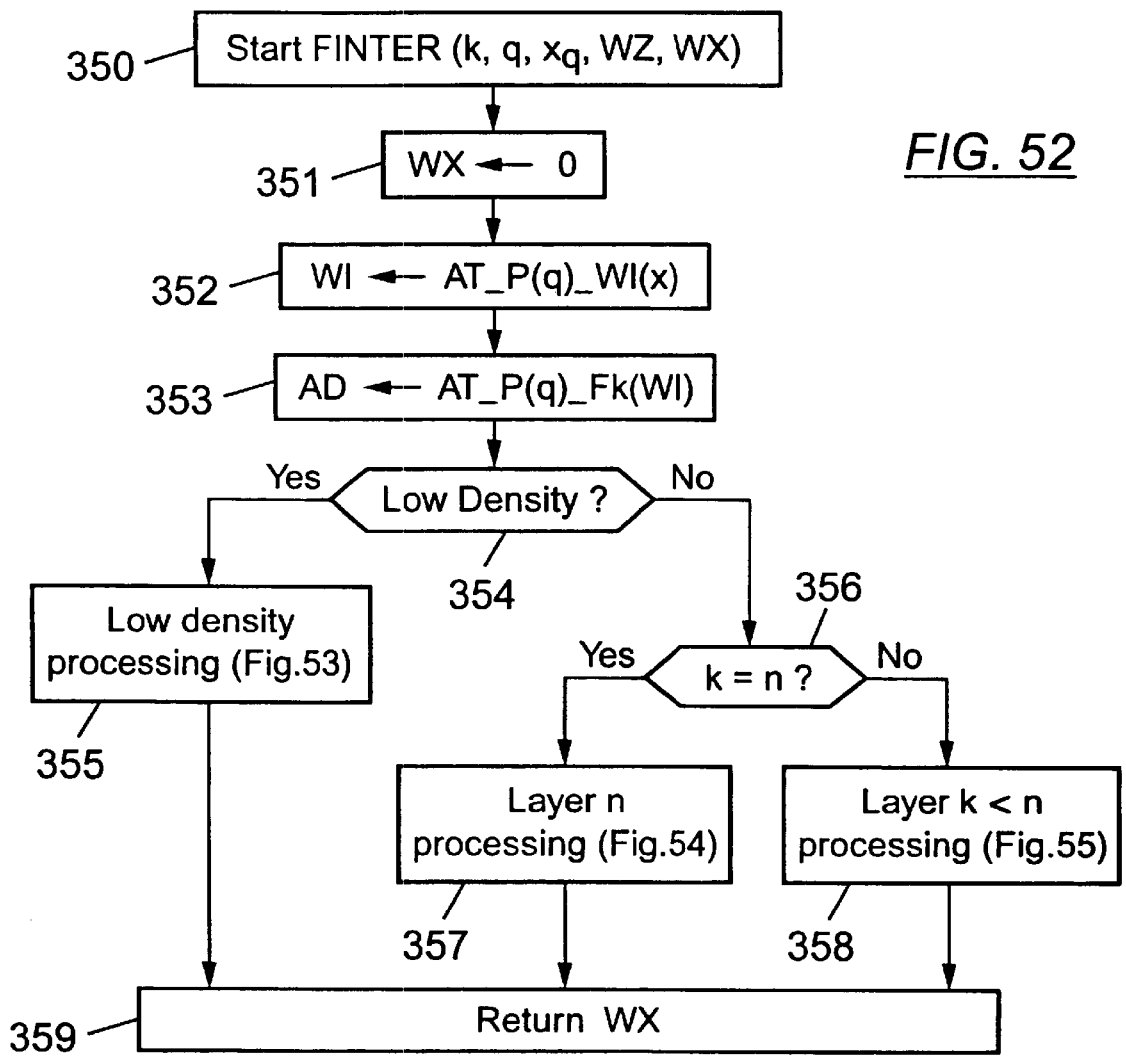
FIG. 52 is a flow chart of a function FINTER referred to in the procedure of FIG. 51.

This function FINTER called in step 323 may be in accordance with the flow chart shown in FIG. 52 when the thesauruses are stored as shown in FIGS. 25–32. It is started in step 350 by loading the above-mentioned input arguments k, q, x (=$x_q$) and WZ (=$WZk_q$). In step 351, the bitmap vector WX is initialized with zeroes. The program first obtains the word index WI=AT_P(q)_WI(x) in step 352, and then the head address AD=AT_P(q)_Fk(WI) in step 353 to initiate the scanning of the relevant record chain in the data container.

If the level q thesaurus entry x for attribute AT is stored in the "low density" format (test 354), the processing is as described below with reference to FIG. 53 (step 355) to obtain the intersection vector WX. If the format is "normal density", the processing depends on whether the program is in the first layer, that is k=n (test 356). The processing of FIG. 54 is applied if k=n (step 357), and that of FIG. 55 if k<n (step 358). After step 355, 357 or 358, the execution of function FINTER is terminated in step 359 by returning the bitmap vector WX.

Figure 53:
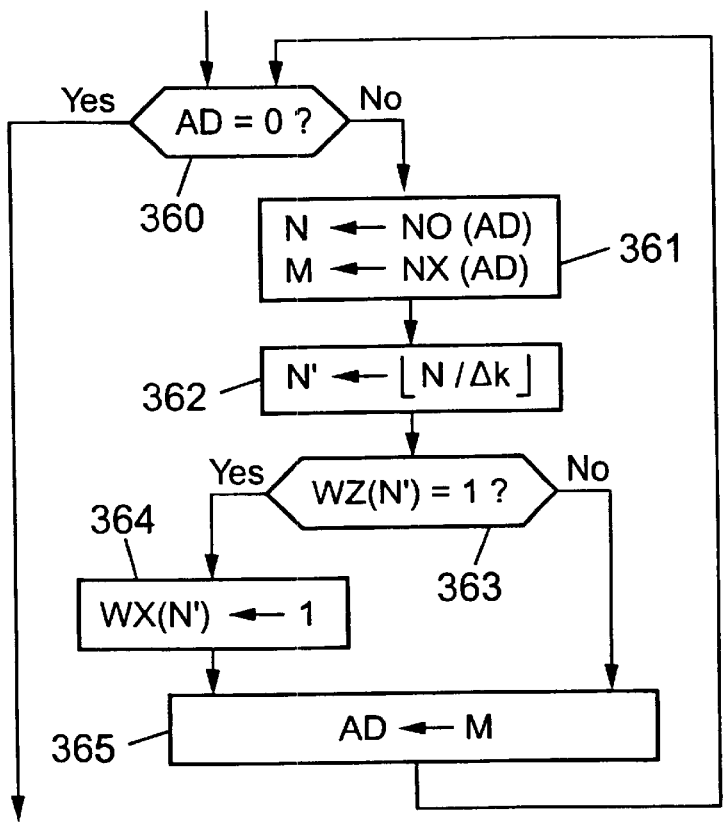
FIGS. 53–55 are flow charts showing procedures executed in steps 355, 357 and 358 of FIG. 52, respectively.
Figure 54:
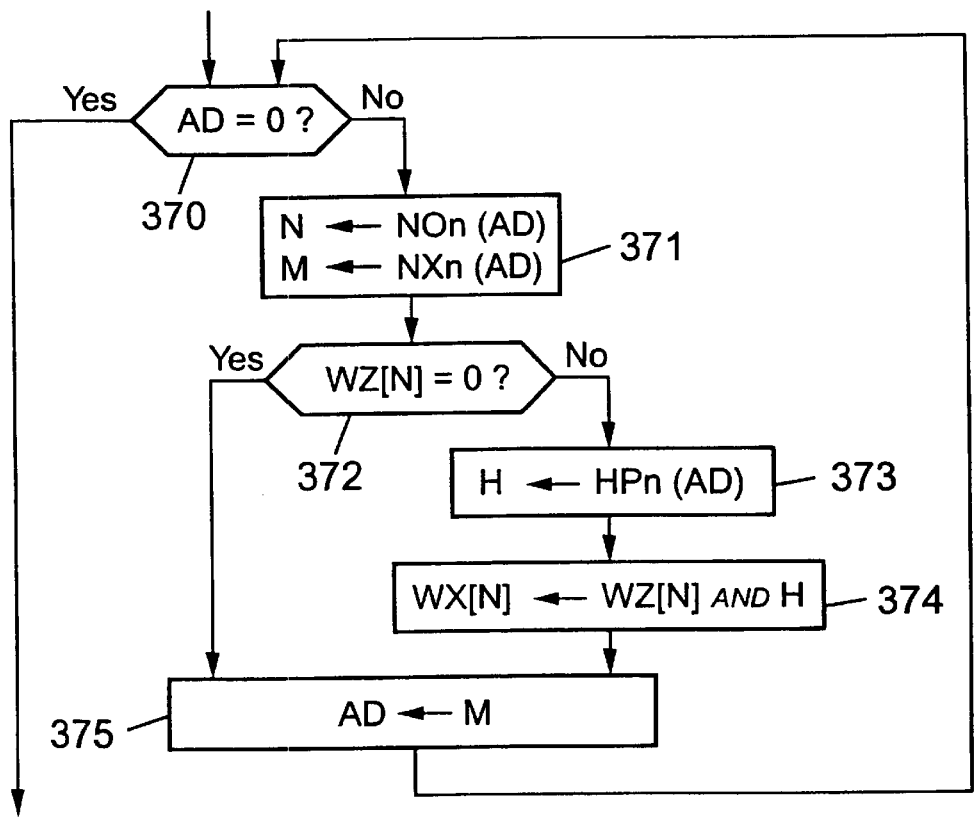

The low density processing of FIG. 53 has a loop in which each iteration begins by comparing the address AD with the end-of-chain value (0) in test 360. If AD>0, there remains at least one item to be examined in the record chain, so that the flat file row-ID value NO(AD) and the next address NX(AD) are read as variables N and M, respectively, in step 361. The Euclidean division of N by Δk is made in step 362 to obtain the layer k−1 quotient (rank) N'. If WZ(N')=1 in the following test 363, a "1" is written into bit WX(N') of the bitmap vector WX (step 364). After step 364, or if WZ(N')=0 in test 363, the variable M is substituted for AD in step 365 before coming back to test 360. The low density processing for the current (macro)word is over when the record chain has been completely examined (AD=0 in test 360), and the program proceeds to step 359 of FIG. 52.

The layer n normal density processing of FIG. 54 has a similar loop in which each iteration begins, in step 370, by comparing the address AD with the end-of-chain value (0). If AD>0, the layer n rank value NOn(AD) and the next address NXn(AD) are read as variables N and M, respectively, in step 371. If the segment of rank N in the bitmap vector WZ has at least one "1" (WZ[N]≠0 in the following test 372), the bitmap segment HPn(AD) is read (step 373) and combined with the bitmap segment WZ[N] in a bitwise Boolean AND operation to provide the segment WX[N] of the bitmap vector WX (step 374). After step 374, or if WZ[N]=0 in test 372, the variable M is substituted for AD in step 375 before coming back to test 370. The layer n normal density processing for the current (macro)word is over when the record chain has been completely examined (AD=0 in test 370), and the program proceeds to step 359 of FIG. 52.

Figure 55:
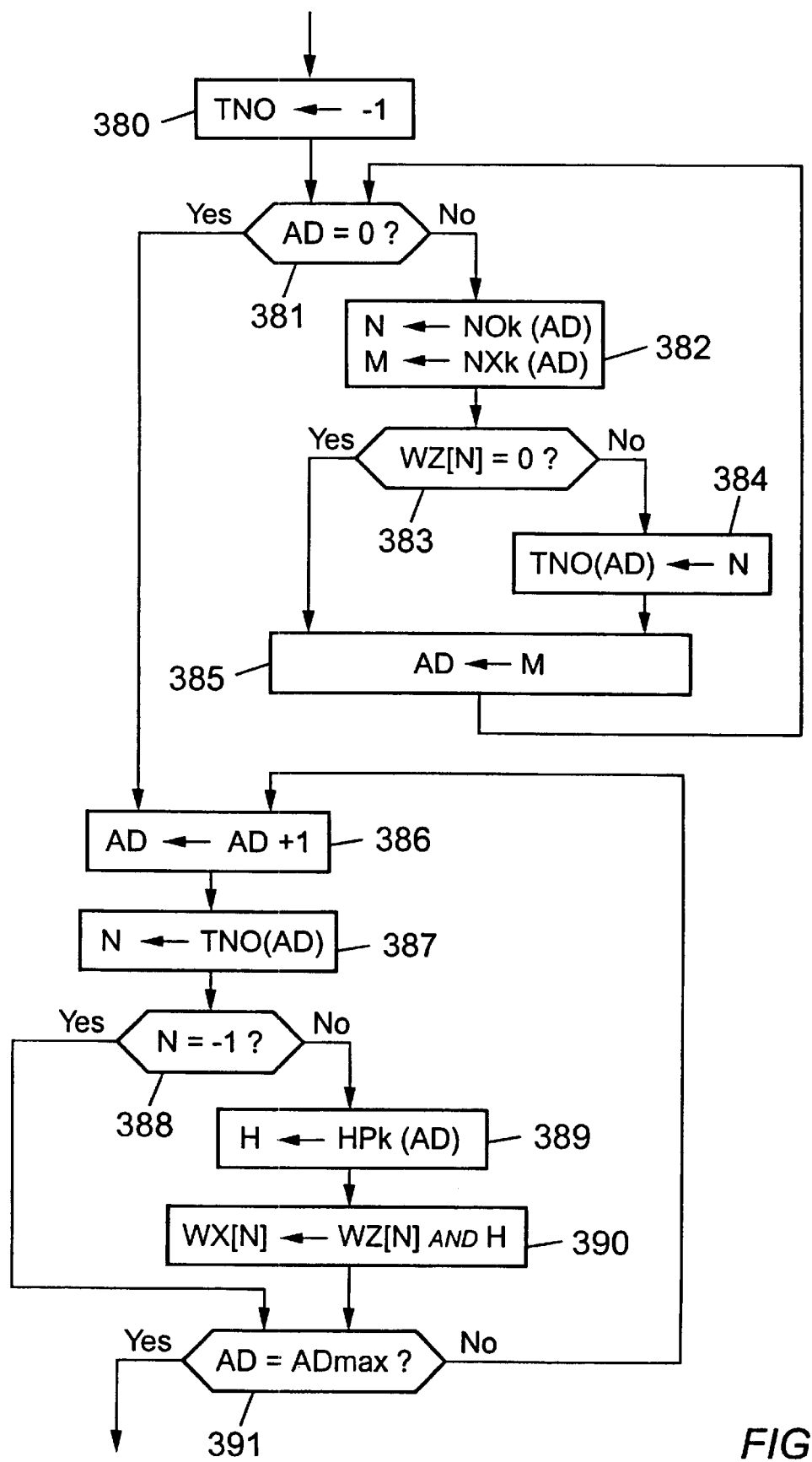

The layer k<n normal density processing is advantageously made of two successive loops (FIG. 55). The first loop is for determining a temporary rank table TNO, which is used to handle the bitmap segments in the second loop, like in the procedure described previously with reference to FIG. 46. Table TNO has a number of addresses which is at least equal to the number of addresses ADmax of the data container in which the layer k coding data of the current thesaurus (AT, q) are stored. Each entry TNO(AD) of address AD in the rank table TNO is for containing an integer representing the rank NOk(AD) if it is useful to access the bitmap segment HPk(AD), or else a default value (−1). Such access is useless if NOk(AD) does not belong to the layer k rank list associated with the current (macro)word $x_q$, or if there are only zeroes in the segment of rank NOk(AD) in the bitmap vector WZ $WZk_{q+1}$.

In the initialization step 380, all entries of the rank table TNO are set to the default value −1. Each iteration of the first loop begins in step 381 by comparing the address AD with the end-of-chain value (0). If AD>0, the layer k rank value NOk(AD) and the next address NXk(AD) are read as variables N and M, respectively, in step 382. The segment WZ[N] of rank N in the bitmap vector WZ is examined in test 383. If that segment WZ[N] has at least one "1" (WZ[N]≠0 in test 383), the rank N is written at address AD into table TNO in step 384 before substituting M for AD in step 385 and coming back to test 381 to examine the next record of the chain. Otherwise (WZ[N]=0), the rank N is filtered out by jumping directly to step 385.

The first loop is over when the record chain has been completely examined (AD=0 in test 381). The program then proceeds to the second loop 386–391. In each iteration of the second loop, the contents N of the rank table TNO at address AD, read in step 387 after having incremented AD in step 386, are compared with the default value in test 388. If N is a valid rank value (≠−1), the bitmap segment HPk(AD) is read (step 389) and combined with the bitmap segment WZ[N] in a bitwise Boolean AND operation to provide the segment WX[N] of rank N in the bitmap vector WX (step 390). If AD<ADmax (test 391), the rank table address AD is incremented by one unit in step 386 when starting the next iteration. The second loop is over when AD=ADmax in test 391, and the program proceeds to step 359 of FIG. 52.

The scanning of the thesauruses as explained with reference to FIGS. 51–55 has a number of significant advantages:

- it does not require any access to the original data tables. Therefore it is not compulsory to maintain the data tables in memory. Even when they are stored, they will often be accessible through a relatively low software interface, such as ODBC. The scanning method advantageously circumvents that interface;
- it is very efficient in terms of disc accesses, because it takes advantage of the record grouping in the coding data container. The procedures of FIGS. 53–55 are respectively similar to those of FIGS. 43, 44 and 46 regarding the disc accesses, and they provide the above-described advantages in this respect;
- the procedure of FIG. 51 is also very efficient owing to the filtering achieved by the updating of the bitmap vectors $WZ1_q$ (loop 336–339) This filtering takes advantage of the fact that each flat file row has a unique value (possibly Null) for each attribute. It avoids plenty of useless operations to read coding data pertaining to subsequent thesaurus words and macrowords which would not provide hits in the lowest layer (because the hit in the higher layer would be due to a flat file row-ID corresponding to an already considered thesaurus word).

Figure 56:
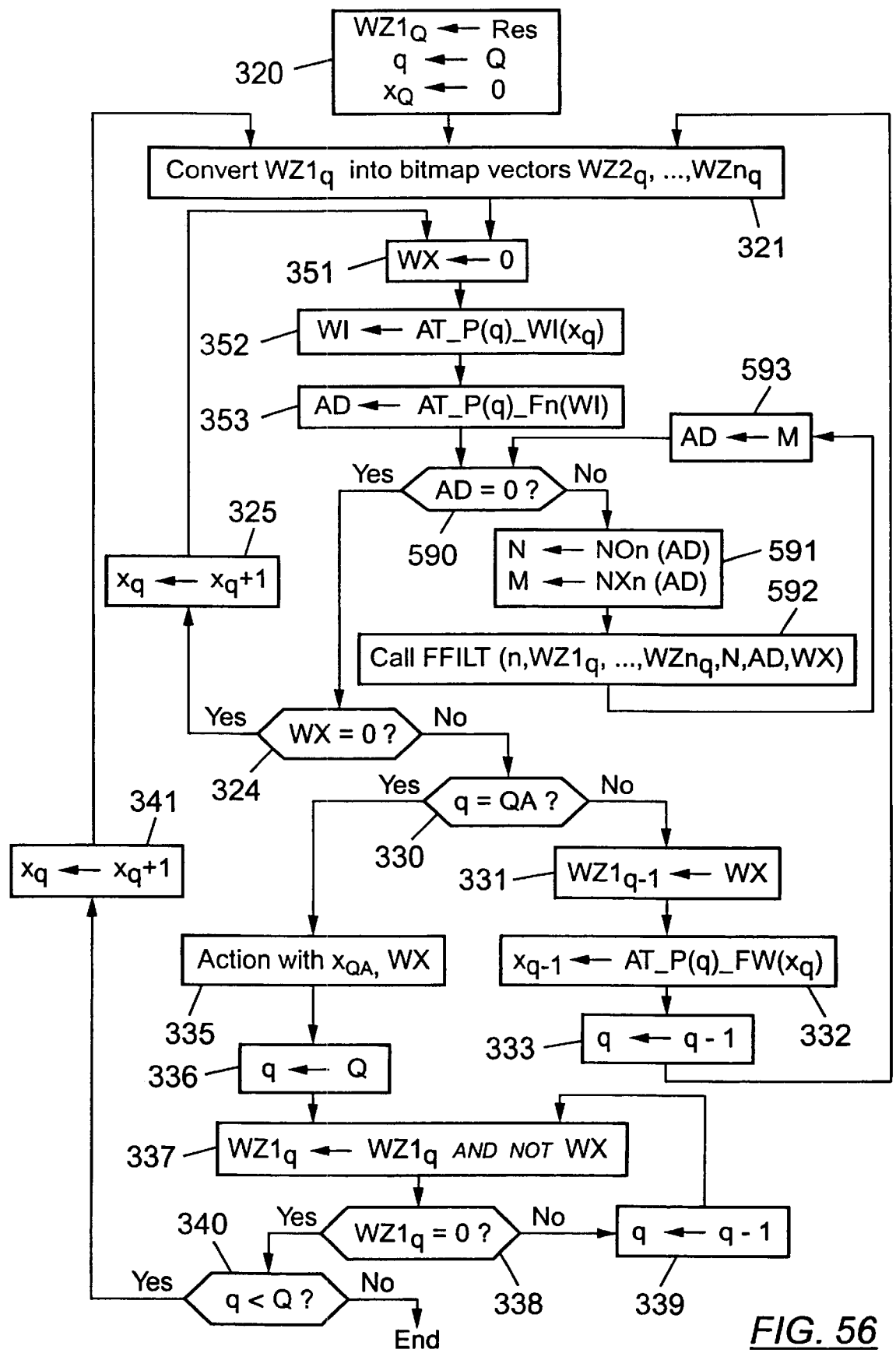
FIG. 56 is a flow chart showing an alternative procedure applicable in step 358 of FIG. 52, when the thesauruses are stored as illustrated in FIGS. 33–34.

FIG. 56 shows how the procedure of FIG. 51 can be adapted when the coding data containers are stored as illustrated in FIGS. 25–30 and 34A–B. The above-described function FINTER is replaced by a recursive function FFILT illustrated by FIG. 57. Accordingly, the loop 322–327 is replaced by a loop 590–593 after executing steps 351–353 as in FIG. 52 (with k=n). If the resulting intersection bitmap WX is made of zeroes only (test 324), $x_q$ is incremented in step 325 before coming back to step 351 for the next (macro)word of the current level q thesaurus range. If WX has at least one "1" in test 324, the program proceeds to step 330 as described before. Otherwise, the procedure of FIG. 56 is the same as that of FIG. 51.

Each iteration in the loop 590–593 begins by comparing the address AD with the end-of-chain value (0) in test 590. If AD>0, the layer n rank value NOn(AD) and the next address NXn(AD) are read as variables N and M, respectively, in step 591. Afterwards, the filtering and intersection function FFILT is called in step 592 before substituting M for AD in step 593. The computation of the intersection list WX for the current (macro)word is over when the layer n record chain has been completely examined (AD=0 in test 590), and the program proceeds to test 324 as indicated hereabove.

Figure 57:
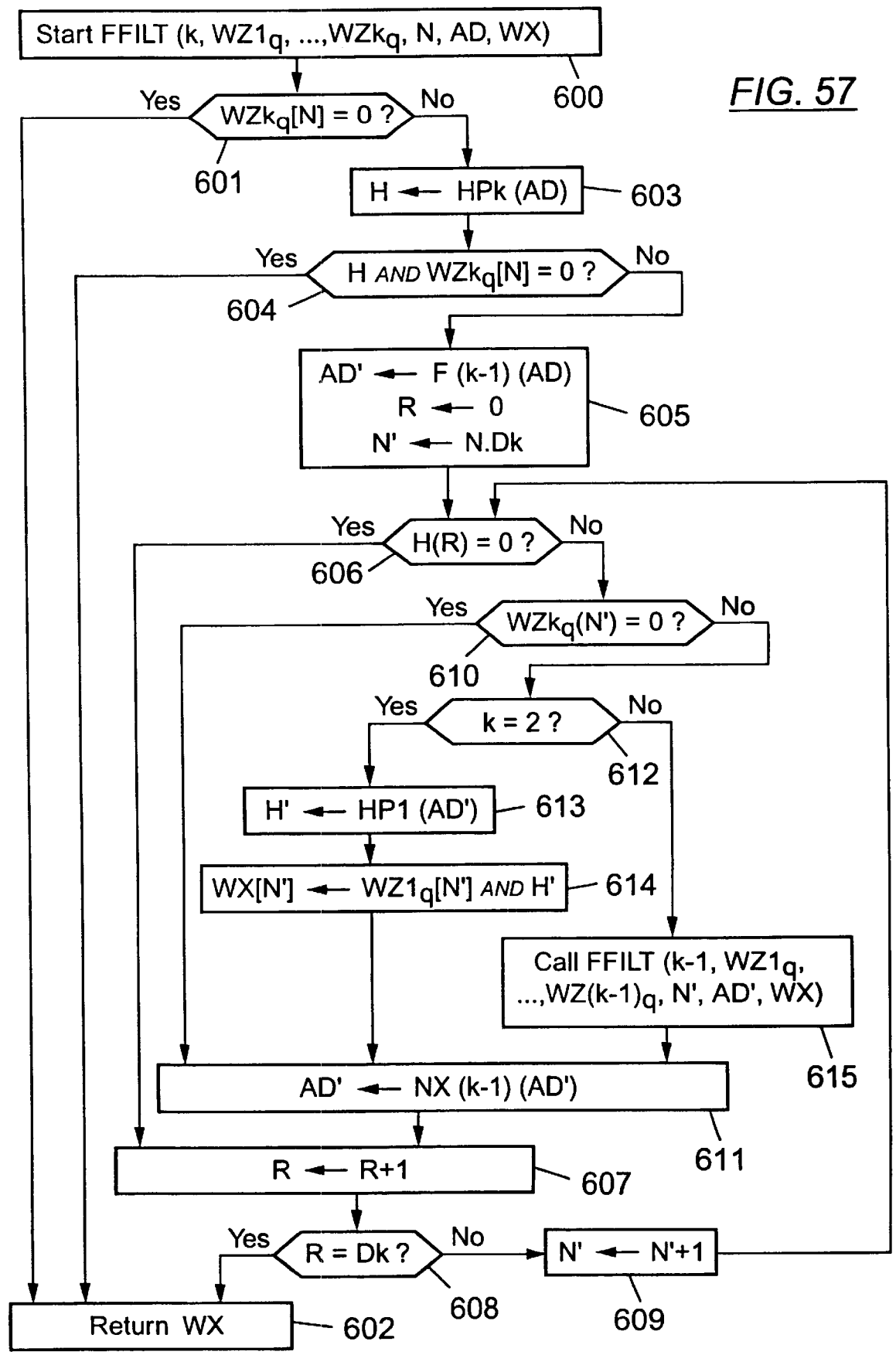
FIG. 57 is a flow chart of a recursive function FFILT called in the procedure of FIG. 56.

A flow chart of this function FFILT is shown in FIG. 57. Its arguments, input when starting its execution in step 600, are as follows:

- a coding layer index k, with k=n when the function FFILT is called in step 592 of FIG. 56;
- k bitmap vectors $WZ1_q, WZ2_q, \ldots, WZk_q$ as obtained in step 321 of FIG. 56;
- a layer k rank N, with N=NOn(AD) when the function FFILT is called in step 592 of FIG. 56;
- the corresponding record address AD in the layer k data container; and
- the intersection bitmap vector WX which is being calculated.

In test 601, it is determined whether the segment of rank N of the bitmap vector $WZk_q$ is only made of zeroes. If so, it is not necessary to read any further coding data relating to the layer k rank N, so that the execution of the function is terminated in step 602 by returning the bitmap vector WX.

If the segment $WZk_q[N]$ has at least one "1" in test 601, the bitmap segment HPk(AD) is read as segment variable H in step 603, and the intersection segment H AND $WZk_q[N]$ is evaluated in test 604. If this intersection segment is only made of zeroes, it is also useless to read any further coding data, and the program directly proceeds to step 602.

If test 604 reveals that H AND $WZk_q[N]$ has at least one "1", it is necessary to get into the lower layer record chain. Its head address F(k−1)(AD) is read as variable AD' in step 605, while the layer k remainder R is initialized to 0 and the layer k−1 rank N' is initialized to N×Dk. The bitmap segment H=HPk(AD) is scanned in a loop in which its bits H(R) are successively examined (test 606) to ascertain whether the rank N'=N×Dk+R should be regarded. If H(R)=0, the rank N' is not in the layer k coding data of the current thesaurus entry, so that it is disregarded: R is incremented by one unit in step 607 and if the new R is still smaller than Dk (test 608), N' is also incremented by one unit in step 609 before proceeding to the next iteration from test 606.

If H(R)=1 in test 606, the bit of rank N' of the vector $WZk_q$ is examined in test 610 to determine whether the layer k−1 rank N' is in the result list. If not ($WZk_q(N')=0$), the program jumps to the next position in the layer k−1 record chain by replacing AD' by the next address NX(k−1)(AD') in step 611. After step 611, the program proceeds to the above-described step 607.

If $WZk_q(N')=1$ in test 610, the processing depends on whether the coding layer k is immediately above 1 (test 612). If k=2, the bitmap segment HP1(AD') is read (step 613) and combined with the bitmap segment $WZ1_q[N']$ in a bitwise Boolean AND operation to provide the segment WX[N'] of rank N' in the bitmap vector WX (step 614). If k>2 in test 612, the recursive function FFILT is called in step 615 with the arguments k, $WZ1_q, \ldots, WZ(k-1)_q$, N', AD' and WX. After step 614 or 615, the program proceeds to the above-described step 611.

The scanning of the bitmap segment H=HPk(AD) is over when R=Dk in test 608. The updated bitmap vector WX is then returned in step 602.

It is noted that the use of a layer 1 rank table TNO (as in FIG. 55) is quite compatible with the procedure of FIGS. 56–57. The records of the table TNO are initialized with the default value in step 351; steps 613–614 of FIG. 57 are replaced by writing N' into TNO(AD'); and when AD=0 in test 590, table TNO is scanned as in loop 386–391 of FIG. 55.

A further optimization of the procedure of FIG. 51 or 56 can be achieved when the stored thesaurus data include files organized as illustrated in FIGS. 58–61. For each thesaurus, a table of the type shown in FIGS. 58–60 is stored, to associate each possible value of the layer n rank NOn with a record chain head address F_AD' in an additional data container as shown in FIG. 61. The latter data container contains the same layer n bitmap segment data HP'2=HP2 as that of FIG. 32 or 34A, but the links NX'2 define record chains which pertain to the same layer n rank rather than to the same thesaurus entry. The data container of FIG. 61 is thus obtained by sorting that of FIG. 32 or 34A based on the NO2 column, deleting the NO2, NX2 and F1 columns, and adding a column NX'2 to contain the next addresses in the record chains based on NO2 and a further column PTR where the thesaurus indexes x to which the record pertain is written. For each rank NO2 the head address of the chain is memorized in F__AD'(NO2).

Figure 62:
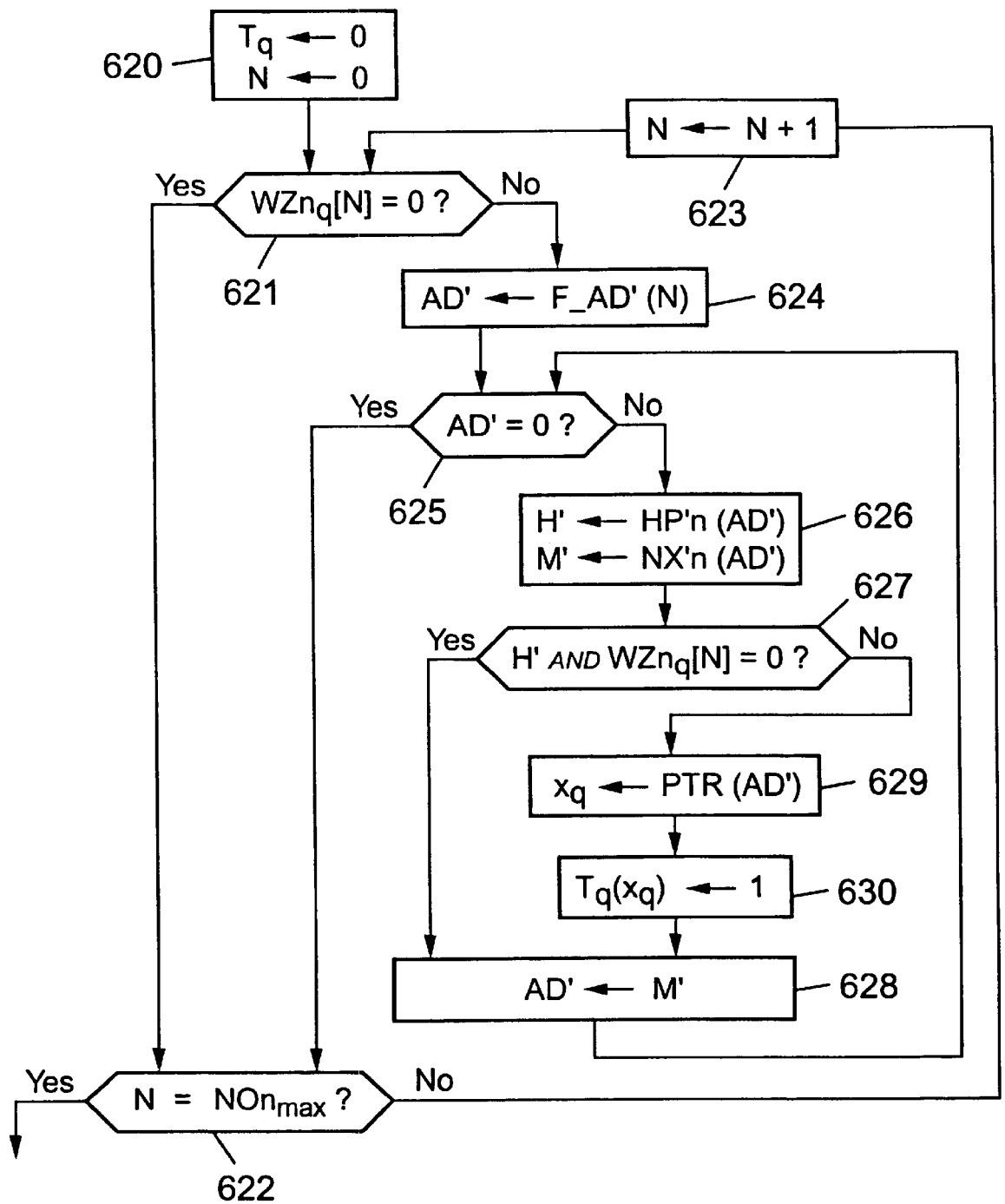
FIG. 62 is a flow chart showing a pre-filtering procedure which may be used prior to a thesaurus scanning similar to that of FIG. 51.

Before starting the procedure of FIG. 51 or 56, or after every iteration of step 321, the pre-filtering treatment shown in FIG. 62 is applied to mark thesaurus entries that will not be read for the reason that their layer n ranks are not in the layer n coding data of the matching data graph identifier list. The marking is done by means of a table $T_q$ for a macroword level q, which has one bit $T_q(x_q)$ for each level q thesaurus pointer $x_q$. Those bits, as well as the layer n rank N=NOn are initialized to zero in step 620 of FIG. 62. If the segment of rank N of $WZn_q$ is only made of zeroes (test 621), test 622 is performed to determine whether the highest possible layer n rank $NOn_{max}$ has been reached. If not, N is incremented in step 623 and test 621 is repeated. When $WZn_q[N]\neq 0$ in test 621, the head address F__AD'(N) is read as variable AD' in step 624 and compared to the end-of-chain value (0) in test 625. If AD'=0, the program proceeds to step 622. Otherwise, the bitmap segment HP'n(AD') and the corresponding next address value NX'n(AD') are read as variables H' and M', respectively, in step 626. If H' and $WZn_q[N]$ have no "1" in common (test 627), M' is substituted for AD' in step 628, and the next iteration is started from test 625. If there is at least one "1" in the bitwise Boolean AND combination of H' and $WZn_q[N]$ in test 627, the thesaurus pointer $x_q$=PTR(AD') is read in the last column of FIG. 61, and a "1" is written in the corresponding location of table $T_q$ before proceeding to step 628.

Figure 63:
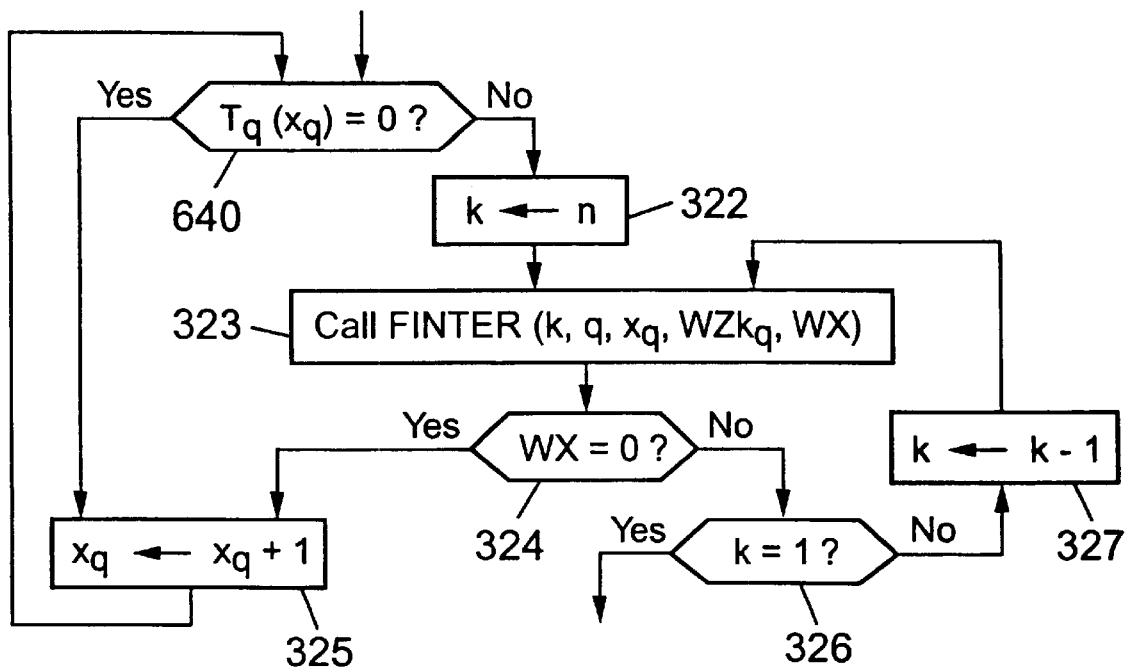
FIG. 63 is a flow chart showing a part of a thesaurus scanning procedure according to FIG. 51, adapted to take into account a pre-filtering according to FIG. 62.

After that, as shown in FIG. 63, the loop 322–327 of FIG. 51, where a relevant bitmap vector WX is calculated, is completed by an initial filtering step 640 where the bit $T_q(x_q)$ is tested. This test 640 is also performed after having incremented $x_q$ in step 325. If $T_q(x_q)$=1 in test 640, the program proceeds to step 322 as described before. If $T_q(x_q)$=0, it proceeds directly to step 325, thereby avoiding the computation of an intersection list WX that will be empty.

The same filtering step 640 can be performed before step 351 in FIG. 56.

The function FINTER illustrated in FIGS. 52–55 is readily adapted to the case where separate coding data files are used for each thesaurus word, as in FIG. 17. Steps 352–353 of FIG. 52 are replaced by the allocation of the value AT__P(q)(x) to the word variable W, and by the initialization of the loop index i to zero. The low density processing of step 355 and the layer n normal density processing of step 357 are similar to those shown in FIGS. 53 and 54. The loop is not performed in a common data container (with the loop index AD), but in the individual coding data files (with a loop index i as in FIG. 33). The layer k<n processing of step 358 does not need two loops as in FIG. 55. It may be in accordance with FIG. 64.

Figure 64:
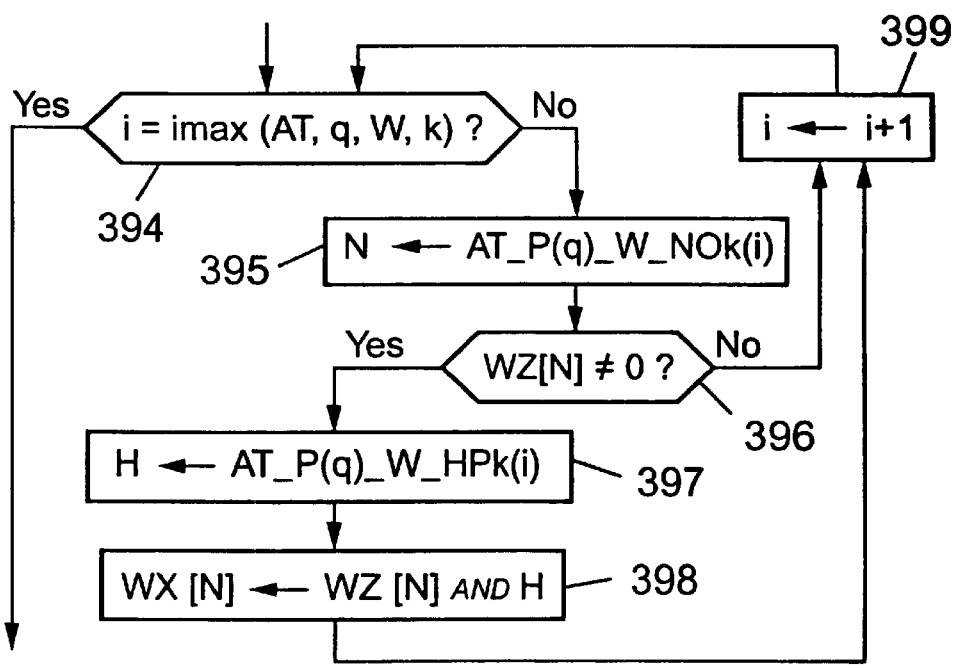
FIG. 64 is a flow chart showing an alternative procedure applicable in step 358 of FIG. 52, when the thesauruses are stored as illustrated in FIG. 17.

In the procedure shown in FIG. 64, steps 395–399 are performed as long as the loop index i is lower than the total number imax(AT, q, W, k) of layer k records in the coding data file relating to thesaurus AT, macroword level q and word W (test 394). In step 395, the rank AT__P(q)__W__NOk(i) is assigned to the integer variable N. In the following step 396, the segment WZ[N] of rank N in the bitmap vector WZ is tested. If WZ[N] has at least one "1" (WZ[N]≠0), the bitmap segment AT__P(q)__W__HPk(i) is read (step 397) and combined with the bitmap segment WZ[N] in a bitwise Boolean AND operation to provide the segment WX[N] of rank N in the bitmap vector WX (step 398). In step 399, performed after step 398 or when WZ[N]=0 in test 396, the loop index i is incremented by one unit before coming back to test 394. The loop is over when the relevant coding data have been completely examined, i.e. when i=imax(AT, q, W, k) in test 394.

The above-described procedure may involve different types of action in step 335 of FIG. 51 or 56, based on features of the SQL query.

In a relatively simple type of SQL query, a list of values of one attribute is required (e.g. name all clients who meet certain criteria). In such a case, the scanning of FIG. 51 or 56 is performed only in the thesaurus(es) relating to that attribute, with QA=0, and the action of step 335 may simply be to read the word $AT(x_0)$ which is in position $x_0$ in the individual word thesaurus (in fact, if the coding data are stored as illustrated in FIG. 17, the word $AT(x_0)$ has been read just before) and to write this word $AT(x_0)$ into an output table, or print it out. It is observed that the word list thereby produced is automatically sorted, in the ascending order. If the reverse order is required, the thesaurus may be scanned in the opposite direction.

If the SQL query has a DISTINCT keyword in the SELECT clause regarding the attribute AT, there is one output of the word $AT(x_0)$ in step 335. If not, or if the SELECT clause has the keyword ALL, there may be one output of the word $AT(x_0)$ for each non-zero bit of WX in step 335. Those non-zero bits may also be counted to provide the number of occurrences of the word $AT(x_0)$ in the matching data graphs.

If the values of the attribute are required with a reduced accuracy, the thesaurus may be scanned as shown in FIG. 51 or 56 with QA>0, thereby avoiding memory accesses to obtain irrelevant details from the level q thesauruses with q<QA. For example, if a date attribute is required expressed in years, the scanning of FIG. 51 or 56 may be stopped at the level QA corresponding to a truncation length of 4.

The SQL query frequently requires several attributes in the SELECT and FROM clauses. In order to maintain the connections between the attribute values belonging to the same data graph, some form of indexing is needed. A possibility is to reserve in RAM 103 a working zone for containing an output table having as many rows as in the virtual flat file and respective columns for receiving the attribute values of the result lists. The memory locations of the output table are initialized with a default value. The above-mentioned attribute values $AT(x_0)$, or their prefixes $AT(x_{QA})$ if QA>0, are written into the output table in the occurrences of step 335 shown in FIG. 51 or 56. Such write operation in step 335 is made into any row of the output table indicated by a non-zero bit of the bitmap vector WX. The output data are eventually produced by eliminating the empty rows from the output table (the rows that still contain the default value).

Figure 65:
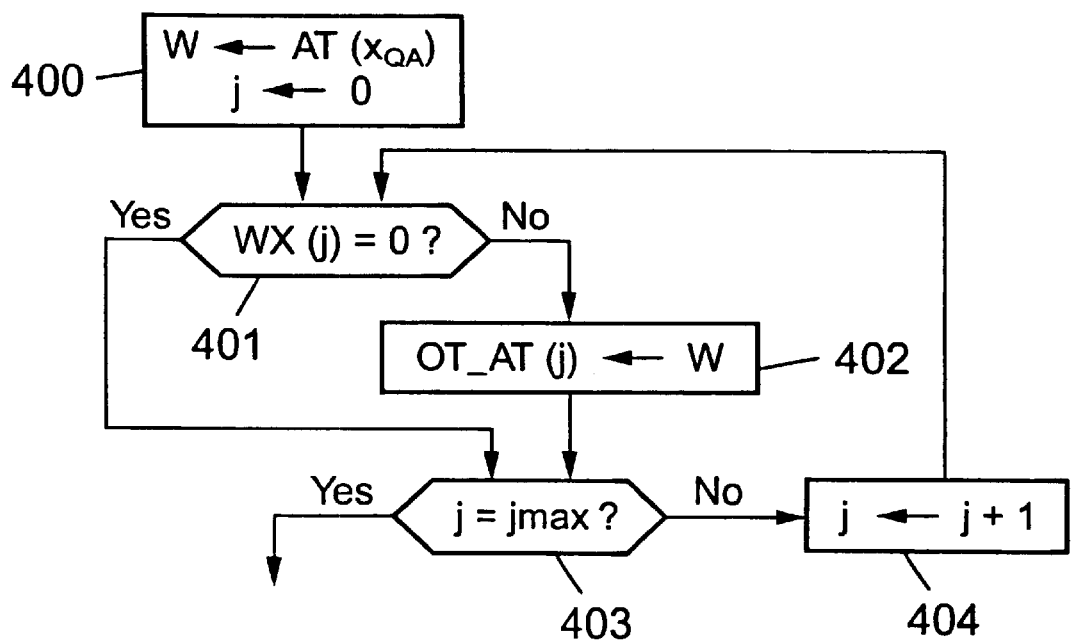
FIG. 65 is a flow chart showing a procedure applicable in step 335 of FIG. 51.

FIG. 65 shows how step 335 is developed in such a case, to write the word $W=AT(x_{QA})$ where appropriate in the column OT__AT of the output table. The row pointer j is initialized to zero in step 400, and the word W is loaded (if it has not been before). Every time the bit WX(j) is 1 (test 401), the word W is written into row j and column AT of the output table (step 402). The row pointer j is the compared to its maximum value jmax in test 403 and incremented if j<jmax (step 404). The program has finished the action of step 335 when j=jmax in test 403.

EXAMPLE 4

We consider the query criteria of Example 3 and assume that the attributes requested for display are accident date, client name and policy date. In Example 3, discussed with reference to FIGS. 37–38, the bitmap of the matching data graphs (output in step 246 of FIG. 41) is Res= 101100001000, as may be checked in FIG. 8. In this example, FIG. 66 shows the contents of the output table as described hereabove.

The above-mentioned output table may be too big to be conveniently reserved in RAM 103. In real databases, the number of rows in the virtual flat file is relatively high (e.g. millions) and if there are too many characters in one row of the output table (because there are too many attributes to be included or because some of them use a relatively high number of characters), the output table may become prohibitively big. There are several solutions to deal with this potential problem.

One of them is to write the thesaurus row-ID's $x_{QA}$ (integers) into the output table instead of the (macro)words $AT(x_{QA})$ in step 402 of FIG. 65. Once all the relevant thesauruses have been scanned, the non-empty output table rows are selected to retrieve the attribute values from the thesaurus row-ID's. This reduces the breadth of the columns of the output table since the words $AT(x_{QA})$ often require much more characters.

FIG. 67 shows the contents of such an output table in the case of Example 4, the thesauruses being sorted as in FIGS. 10A–G.

Another solution, alternative or cumulative, is to use an index in RAM 103, to associate an integer address with each data graph or flat file row-ID. A default address is initially assigned to all the data graphs. When one of them is designated for the first time by a "1" in the corresponding bit of WX in step 335 (i.e. when scanning the first thesaurus), it is allocated a new address obtained by incrementing a counter. This address is retrieved from the index when the data graph is again designated in the scanning of the subsequent thesaurus(es). This integer address is a row-ID in an output table stored in RAM 103, which has a reduced number of rows where the attribute values or prefixes $AT(x_{QA})$, or their thesaurus row-ID's $x_{QA}$, are written. The non-empty rows are consecutive and hence the total number of rows can be significantly reduced. This compressed output table is eventually read out to display the results.

Figure 68:
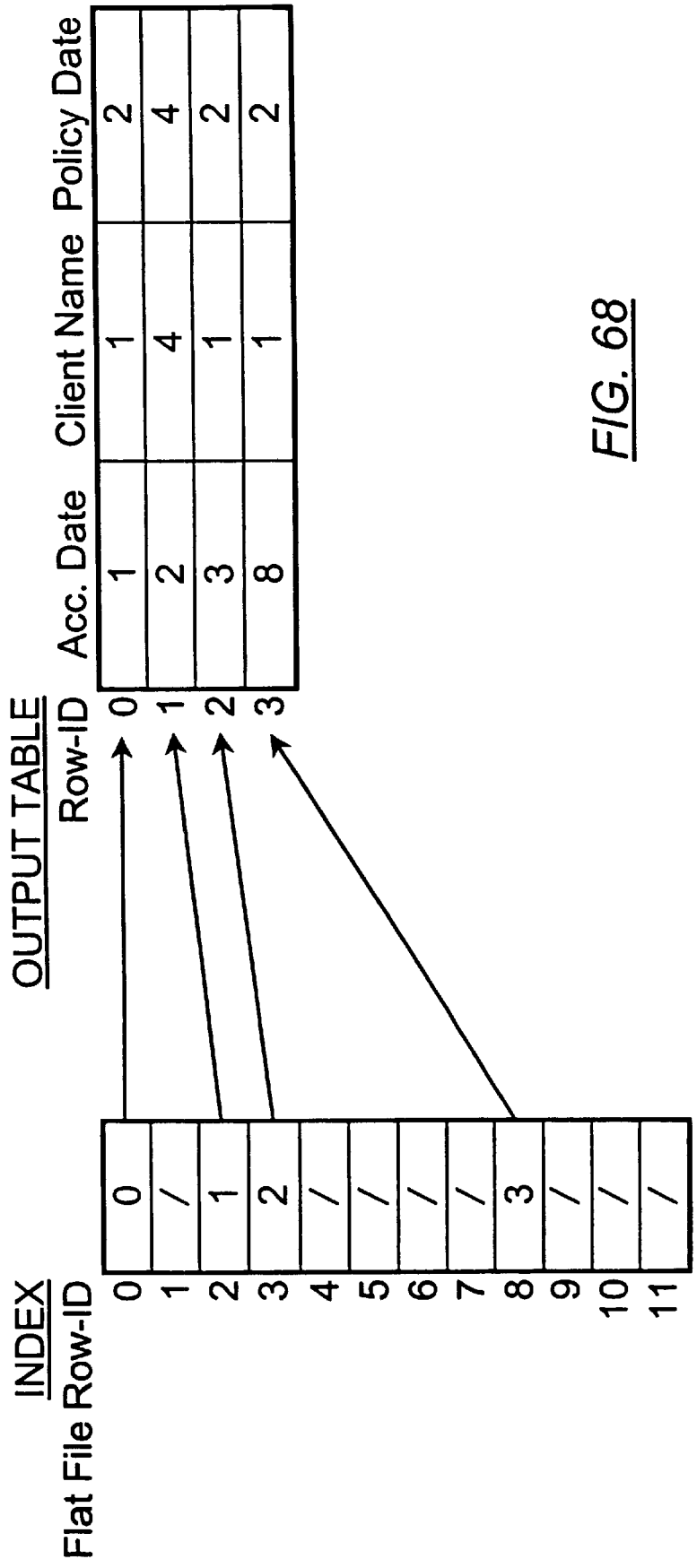
FIG. 68 is a diagram illustrating another possible structure of the output table.

FIG. 68 shows the contents of such index and output table, containing thesaurus row-ID's, in the case of Example 4.

Figure 69:
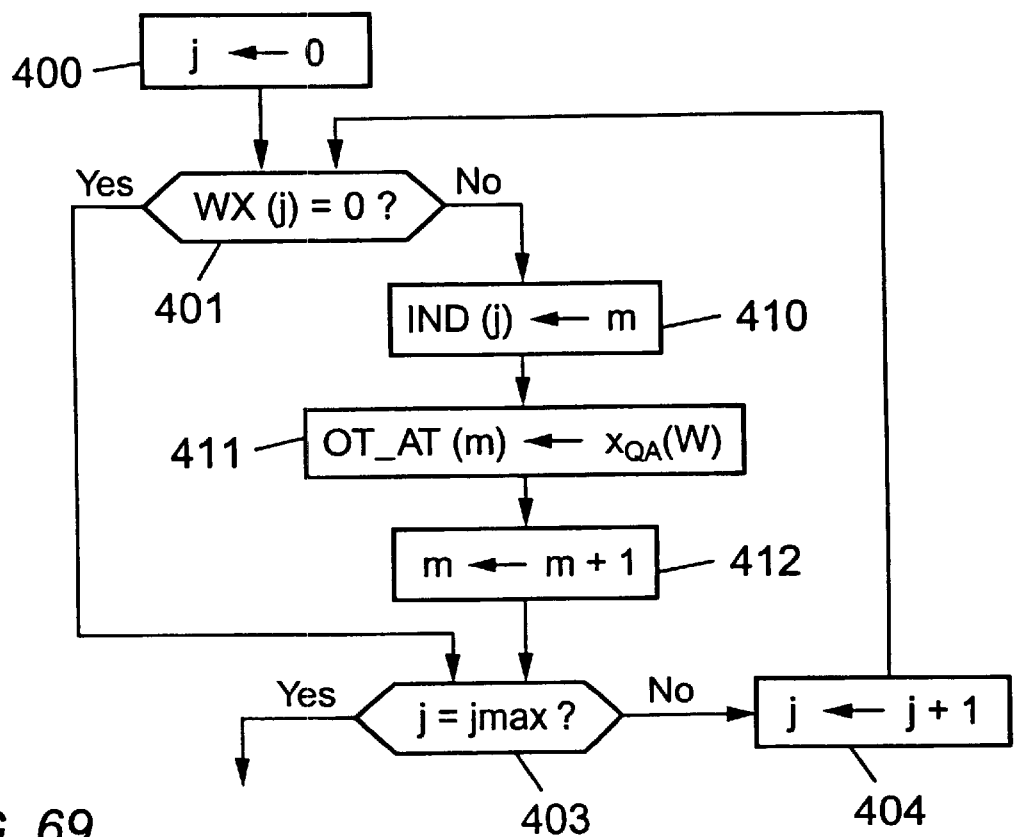
FIGS. 69 and 70 are flow charts showing procedures applicable in step 335 of FIG. 51 to construct an output table of the type shown in FIG. 68.
Figure 70:
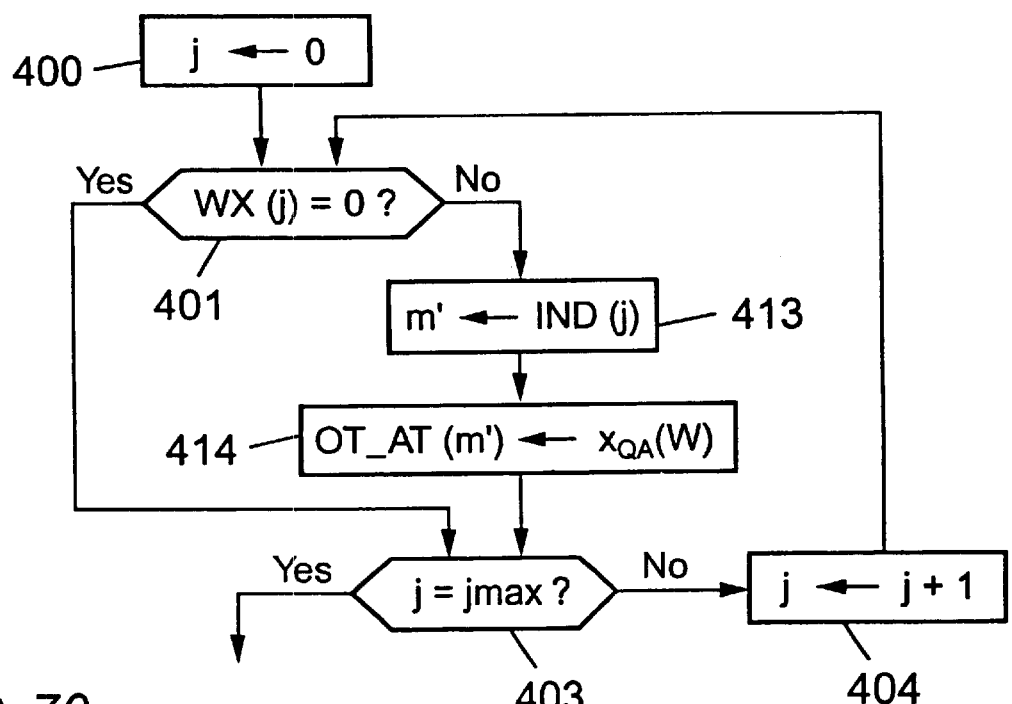

FIGS. 69 and 70 show how step 335 is developed when scanning the first thesaurus and the subsequent thesaurus (es), respectively. The steps 400, 401, 403, 404 indicated by the same reference numerals are identical to those of FIG. 65. In FIG. 69, when the bit WX(j) is 1, the counter value m (initialized to 0 in step 320 of FIG. 51 or 56) is allocated to the index IND(j) for row j (step 410), the thesaurus pointer $x_{QA}$ (or word $W=AT(x_{QA})$) is written into row j and column AT of the output table (step 411), and the counter value m is incremented (step 412). When the scanning the first thesaurus is over, m represents the number of matching data graphs. In FIG. 70, when the bit WX(j) is 1, the index IND(j) for row j is retrieved as pointer m' (step 413) and the thesaurus pointer $x_{QA}$ (or word W) is written into row m' and column AT of the output table (step 414).

The output table is easily sorted based on the contents of its columns when the SQL query has GROUP BY, ORDER BY or similar clauses. Such sorting operation may be performed hierarchically with reference to a plurality of attributes. The most significant attribute in the hierarchy is preferably subjected to the first thesaurus scanning as shown in FIG. 51 or 56 so that the first sorting criterion will be automatically fulfilled when constructing the output table. The sorting based on the remaining attributes is done within each portion of the output table that has common values for the previous attribute(s).

The sorting is particularly simple when the columns of the output table contain thesaurus row-ID's $x_{QA}$, as in FIG. 68, because it only involves sorting integer lists.

It has been indicated before that for certain attributes, in particular numerical fields, the explicit attribute values may be stored in the link table (if there is a link table). The output table of the type illustrated in FIG. 66, 67 or 68 need not have a column for such attribute. If the attribute is to be displayed or otherwise exploited, its values can be retrieved from the link table in the rows corresponding to (i.e. having the same row-ID as) the non-empty rows of the output table (FIGS. 66–67) or the valid pointers in the output table index (FIG. 68).

SQL queries may also require calculations to be made on attribute values of the matching data records, particularly in data warehousing applications. Such calculations can be performed from the data of an output table of the type illustrated in FIG. 66, 67 or 68.

EXAMPLE 5

From Example 4, we assume that the (arithmetic) mean value of the time difference between the accident date and the policy date is requested, expressed as a number of days. For each non-empty row of the output table, the program computes the difference, in number of days, between the first and third column. Those differences are accumulated and the result is divided by the number of non-empty rows (4) to obtain the desired mean value.

In fact, this mean value can be computed with an output table reduced to only one memory location: when scanning the accident date thesaurus, the attribute value expressed as a number of days from an arbitrary reference day is multiplied by the number of non-zero bits in WX in step 335 of FIG. 51 or 56 and added to an accumulation variable V (initialized to 0 in step 320) stored in the memory location of the reduced output table; then, when scanning the policy date thesaurus, the attribute value expressed as a number of days from the same reference day is multiplied by the number of non-zero bits in WX in step 335 and subtracted from V in step 335; finally, the resulting V is divided by the number of non-zero bits in the result bitmap Res to provide the desired mean value.

However, an output or computation table having more than one memory location is often useful in RAM 103 for that sort of calculations, in particular in cases where the desired quantity is not linear with respect to the attribute values (e.g. if the quadratic or geometric, rather than arithmetic, mean value is requested in Example 5).

A computation table is a particular case of output table, and it has a structure similar to that of the output table described hereabove. It may have as many rows as in the virtual flat file (as the output tables of FIGS. 66–67). Alternatively, it may be associated with an index identical to that of FIG. 68. It may also have only one row, as in the above example of the output table having one memory location. Each column of the computation table is for containing values of an operand used in the calculation to be made. Depending on the complexity of the calculation, one or more columns may be needed, but in most cases one column will be sufficient.

Figure 71:
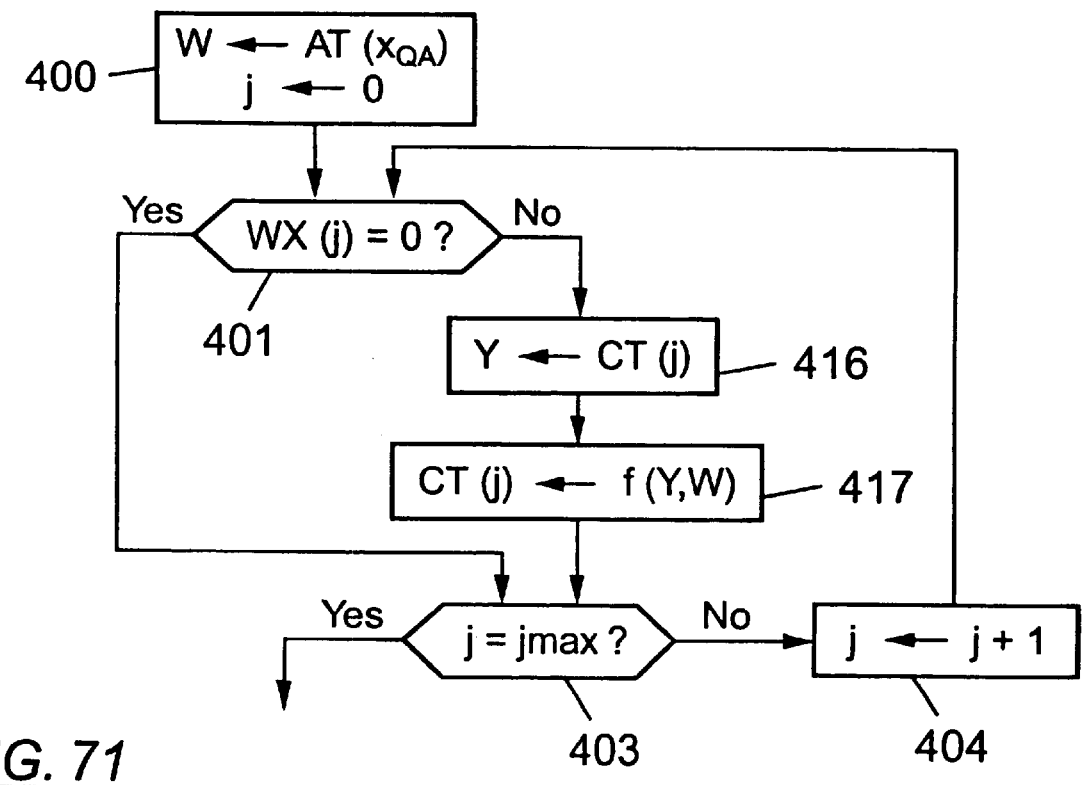
FIG. 71 is a flow chart showing a procedure applicable in step 335 of FIG. 51 to perform computations in a database system by means of a computation table.

The attribute whose values are involved in the calculation have their thesauruses scanned successively, as described with reference to FIG. 51 or 56. Step 335 may be developed as shown in FIG. 71 in the case of a computation table CT having a single column and as many rows as in the virtual flat file (when there is an index, it can be handled as in FIGS. 69–70). In FIG. 71, steps 400, 401, 403 and 404 are identical to those of FIG. 65. When the bit WX(j) is 1 in step 401, the contents CT(j) of the computation table in row j is allocated to the operand Y in step 416, and then a function f of the operand Y and of the current (macro)word W=AT($x_{QA}$) is calculated and saved as the new contents CT(j) in step 417.

The mathematical function f is selected on the basis of the calculation to be performed and of the thesaurus being scanned. Referring again to Example 5, when the accident date is first scanned, the function f(Y,W) may be the transformation of the date W expressed in the format yyyy mm dd into a number of days from a reference day (it is thus a function of W only); when the policy date thesaurus is scanned, the function f(Y,W) may consist in applying the same transformation to the date W and subtracting the result from Y. Afterwards, the mean value (arithmetic, quadratic, geometric, . . . ) of the non-empty rows of CT is calculated to provide the desired output result. Other kinds of global calculation can be performed from the columns of the computation table, for example statistical, financial or actuarial calculations.

The macrowords are advantageously used in this type of calculation if the desired accuracy is lower than that afforded by the individual words of at least one of the attributes involved.

VIRTUAL FLAT FILE PARTITIONING

For large systems, it is often advantageous to partition the virtual flat file into several portions or blocks each consisting of a determined number of rows. The data graphs are distributed into the blocks based on their identifiers (flat file row-ID's).

Preferably, each thesaurus is divided into corresponding thesaurus sections, whereby each section has entries whose flat file row-ID lists are included in the corresponding virtual flat file block. The complete flat file row-ID list associated with one word assigned to an attribute is the union of the lists represented in the entries of the corresponding thesaurus sections for that word. Accordingly the complete flat file row-ID lists of the thesaurus entries are subjected to the same partitioning as the virtual flat file: they are split into sub-lists corresponding to the thesaurus sections.

The thesaurus index file for an attribute may be common to all the sections. A separate index file may also be provided for each section.

For each one of the blocks, steps 191–193 of the processing of a SQL query (FIG. 36) are performed as described hereabove with reference to FIGS. 38–71. The results thus obtained are merged to display the response.

The processing of the query with respect to the different blocks may be performed sequentially or in parallel.

In a sequential processing, RAM availability for optimal processing speed can be effectively controlled. Even though the cost of RAM circuits is not currently considered to be critical, a given machine has a certain amount of available RAM capacity and this is a limitation to reserve RAM space for the above-described output or computation tables. When the limitation is likely to be encountered, partitioning the virtual flat file directly reduces the size of those tables (jmax in FIGS. 65 and 69–71).

Accordingly, the use of a particular machine to carry out the invention will dictate the choice of jmax, that is the block size. The virtual flat file blocks are dimensioned based on the selected size parameter, and the corresponding thesaurus sections are constructed one section after the other as indicated with reference to steps 122–126 of FIG. 19.

Such dimensioning of the query processing engine enables to use optimal algorithms at all stages while avoiding the need to swap intermediary data between RAM 103 and hard drive 105.

A further acceleration is achieved when parallel processing is used. The query processing is distributed between several processors, one for each virtual flat file block.

Figure 72:
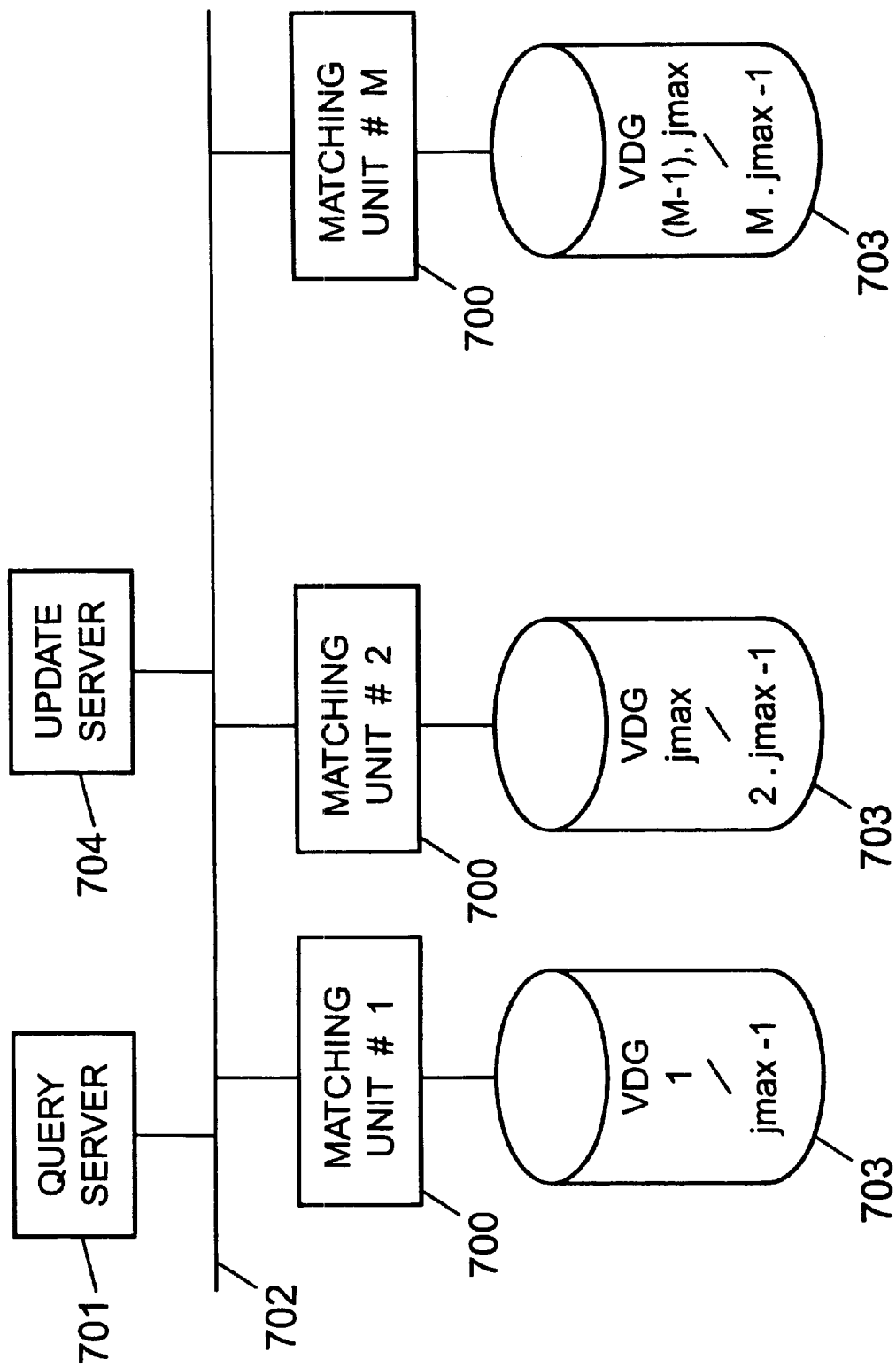
FIG. 72 is a block diagram of another computer system suitable for implementing the invention.

A possible architecture of the parallel query processing engine is illustrated in FIG. 72, in the particular case where all blocks have the same size jmax. A number M of matching units 700 are connected to a query server 701 through a communication network 702. Each matching unit 700 may be a processor system of the type shown in FIG. 18. It has a storage device 703 such as a hard drive for storing the thesaurus sections associated with the block. If a link table of the type shown in FIG. 9 is used, it is partitioned into blocks in the same manner as the virtual flat file, and each block is stored in the corresponding matching unit. The server 701 provides the man-machine interface. It translates the query criteria of the SQL WHERE clause into trees of the type shown in FIG. 37, which are provided to the M matching units 700 along with a description of the desired output. Each of the units 700 does its part of the job according to steps 191–193 of FIG. 36 and returns its response to the server 701. The latter compiles the results from the different matching units to provide the overall response to the user. In order to perform the analysis of step 191, each matching unit 700 uses its thesaurus sections.

Alternatively, the analysis of the query criteria could be executed centrally by the server 701 by means of global thesauruses, each global thesaurus being common to all the (macro)words and having M columns for containing pointers to identifier sub-lists in the M storage units 703. At the end of the analysis stage, the relevant pointers are addressed to the matching units 700 for their execution of steps 192–193.

An update server 704, which may be the same machine as the query server 701, is also connected to the network 702 to create and maintain the VDG's relating to the different blocks. It monitors the changes made in the data tables of the RDBMS and routes thesaurus update commands to the units 700 in order to make the necessary changes in the thesaurus sections.

The above-described parallel system is readily extended when the number of data graphs becomes close to the current maximum (M×jmax in the illustration of FIG. 72). This requires the addition of a further matching unit to deal with a new virtual flat file block, whose size may be the same as or different from the previous blocks, and a reconfiguration of the routing and result compilation functions in the servers 701, 704. The reconfiguration is completely transparent to the previously existing matching units. Therefore, increasing the system capacity can be done at a minimum cost. It does not even require to shut down the system.

What is claimed is:

1. A method of organizing information in a database system, wherein a group of attributes is defined and words of a collection of data are assigned to said attributes, wherein the group of attributes is divided into a plurality of subgroups each associated with a respective data table, each data table having a column for each attribute of the associated sub-group and rows for containing data table records comprising at least one word assigned to an attribute of the associated sub-group, wherein links are defined between the data tables records, each link having a target table and a corresponding source table having a link column containing link values each designating a record of said target table, whereby each of said link values represents a link between the record of the source table including said link value and the record of the target table designated by said link value, the method comprising the steps of:

allocating respective identifiers to data graphs, wherein each data graph represents related attribute values respectively assigned to the attributes of said group, wherein each attribute value of a data graph is either a default value or a word of said collection of data, and wherein the words of each data graph are from linked data table records;

storing a plurality of word thesauruses respectively associated with attributes of said group, wherein for each word assigned at least once to an attribute in the collection of data, the word thesaurus associated with said attribute has a respective entry containing said word; and storing data representing data graph identifier lists respectively associated with the word thesaurus entries, wherein the data graph identifier list associated with a thesaurus entry relating to a word assigned to an attribute includes any identifier allocated to a data graph having said word assigned to said attribute.

2. A method according to claim 1, wherein the entries of each word thesaurus associated with an attribute of said group are sorted based on the words assigned to said attribute.

3. A method according to claim 1, further comprising the step of storing a link table having a plurality of rows respectively associated with the data graphs and a plurality of columns respectively associated with the attribute subgroups, wherein each row of the link table contains, in each one of the columns, either a value indicating that each attribute value represented in the data graph associated with said row and assigned to an attribute of the sub-group associated with said one of the columns is a default value or a link value for retrieving at least one stored word of the collection of data represented in the data graph associated with said row and assigned to an attribute of the sub-group associated with said one of the columns.

4. A method according to claim 3, wherein each link value contained in the column of the link table associated with an attribute sub-group comprises data for identifying a row of the data table associated with said sub-group.

5. A method according to claim 3, wherein the link table has at least one column associated with a sub-group consisting of one attribute, each link value contained in said column being a word assigned to said one attribute in the collection of data.

6. A method according to claim 3, wherein the link table has at least one column associated with a sub-group consisting of one attribute, each link value contained in said column being a pointer to an entry of the word thesaurus associated with said one attribute.

7. A method according to claim 1, wherein each word thesaurus associated with an attribute of the group to which the default value is assigned in at least one of the data graphs further has an entry for the default value, whereby one of said data graph identifier lists is associated with said thesaurus entry for the default value and includes any identifier allocated to a data graph having said default value assigned to said attribute.

8. A method according to claim 7, wherein the step of allocating identifiers to the data graphs comprises:

for any target table record which is not designated in the link column of the corresponding source table, inserting a dummy record in an additional row of said source table, having a link value designating said target table row in the link column and a default value in each attribute column, such insertion of dummy records being repeated until any record of any target table is designated in the link column of the corresponding source table;

initializing the data representing data graph identifier lists, to represent empty lists; and processing the records of at least one root table which is not the target table for any link, the processing of each root table record comprising:

constructing a respective data graph consisting of related attribute values of said root table record and of corresponding records of the other data tables successively determined on the basis of the contents of the link columns in said records;

allocating an available identifier to said data graph; and for each attribute, selecting the entry of the associated word thesaurus relating to the value assigned to said attribute in said data graph and updating the data representing the data graph identifier list associated with the selected entry to add the identifier allocated to said data graph to said list.

9. A method according to claim 8, wherein the processing of each root table record further comprises:

generating a row in a link table having a plurality of columns respectively associated with the data tables, wherein said row of the link table contains, in each column associated with a data table, either a value indicating that the data graph has been constructed from a dummy record with respect to said data table or a link value designating a row of said data table where the attribute values represented in the data graph are stored, said link table being used for retrieving from the data tables words of the collection of data represented in the data graphs.

10. A method according to claim 9, further comprising the step of deleting the dummy records from the data tables.

11. A method according to claim 9, further comprising the step of deleting the link columns from the data tables.

12. A method according to claim 1, further comprising the step of storing at least one macroword thesaurus associated with an attribute of said group and with a prefix length shorter than a word length of said attribute, having a respective entry for each prefix value having said prefix length and matching a corresponding prefix of at least one word assigned at least once to said attribute in the collection of data, said entry of the macroword thesaurus being associated with a data graph identifier list including each identifier allocated to a data graph having, assigned to said attribute, a word whose corresponding prefix matches said prefix value.

13. A method according to claim 12, wherein at least one attribute has a plurality of stored macroword thesauruses, associated with different prefix lengths.

14. A method according to claim 12, wherein the entries of each macroword thesaurus associated with an attribute are sorted based on the prefix values, and the entries of the word thesaurus associated with said attribute are sorted based on the words assigned to said attribute.

15. A method according to claim 14, wherein at least one attribute has Q stored macroword thesauruses associated with respective prefix lengths shorter than a word length of said attribute, Q being a positive integer, each of said Q macroword thesauruses having a thesaurus level parameter q such that $1 \leq q \leq Q$, the prefix length being a decreasing function of the level parameter q, the word thesaurus associated with said attribute having a level parameter q=0, wherein each macroword thesaurus having a level parameter q≧1 contains, in each entry provided for a level q prefix value, data designating the entry of the level q−1 thesaurus which corresponds to the lowest or highest level q−1 macroword or word whose corresponding prefix matches said level q prefix value.

16. A method according to claim 1, wherein at least one thesaurus entry comprises data for pointing to at least one memory region where coding data representing the data graph identifier list associated with said entry are stored.

17. A method according to claim 16, wherein said memory region comprises a file individually allocated to said thesaurus entry.

18. A method according to claim 17, wherein said data for pointing to at least one memory region comprise the attribute value for which said thesaurus entry is provided, said attribute value being part of a respective file name used for accessing each file allocated to said thesaurus entry.

19. A method according to claim 16, wherein said memory region comprises a portion of a data container having a plurality of records each having a next address field, said portion being defined as a record chain in said data container, the chains being defined by means of the next address fields, and wherein said data for pointing to at least one memory region comprise a respective address of a first record of a chain in said data container.

20. A method according to claim 19, further comprising the step of grouping the records stored in the data container so that the records of each chain have contiguous addresses.

21. A method according to claim 19, wherein said data container is individually allocated to a thesaurus.

22. A method according to claim 19, wherein said data container is shared by a plurality of thesauruses.

23. A method according to claim 19, wherein the thesaurus associated with an attribute of said group has an index register where the thesaurus entries are sorted based on the words assigned to said attribute, each entry including a word index for pointing to a row of an auxiliary table, and wherein each row of the auxiliary table contains an address in the data container of a first record of a chain.

24. A method according to claim 19, wherein said data for pointing to at least one memory region comprise a respective address of a last record of a chain in said data container.

25. A method according to claim 16, wherein said coding data representing a data graph identifier list comprises integers respectively equal to the identifiers of said list.

26. A method according to claim 1, wherein a plurality of formats are provided for representing the data graph identifier lists, and wherein each thesaurus entry contains an indication of the format used for representing the data graph identifier list associated therewith.

27. A method according to claim 1, wherein said data representing data graph identifier lists comprise, for at least one thesaurus entry, coding data obtained by a coding scheme having n successive coding layers, n being a number at least equal to 1, each layer having a predetermined patter for dividing a range covering integers of an input list of said layer into subsets, said identifier list being the input list of the first layer for said thesaurus entry, wherein for any layer other than the last layer, an integer list representing the position, in the pattern of said layer, of each subset containing at least one integer of the input list forms the input list for the next layer, and wherein said coding data comprise, for each layer and each subset containing at least one integer of the input list, data representing the position of each integer of the input list within said subset and, at least if said layer is the last layer, data representing the position of said subset in the pattern of said layer.

28. A method according to claim 27, wherein the coding data are stored in a plurality of files including files respectively allocated to thesaurus entries.

29. A method according to claim 27, wherein the coding data are stored in a plurality of files including at least one file allocated to a respective thesaurus, for containing the coding data relating to the entries of said thesaurus.

30. A method according to claim 27, wherein the coding data are stored in at least one file allocated to a plurality of thesauruses, for containing the coding data relating to the entries of said plurality of thesauruses.

31. A method according to claim 27, wherein the pattern of each layer is such that the integer subsets are consecutive intervals consisting of the same number of integers.

32. A method according to claim 31, wherein said number of integers is a whole power of 2 for each layer.

33. A method according to claim 27, wherein the data representing the position of each integer of the input list of each layer within a subset consist of a bitmap segment in which each bit is associated with a respective integer of the subset to indicate whether said integer belongs to the input list of said layer.

34. A method according to claim 27, wherein the position of each subset in the layer n pattern is represented by an integer rank which is included in the coding data, in association with the data representing the position of the integers of the input list of layer n within said subset.

35. A method according to claim 27, wherein the position of a subset in the pattern of each layer is represented by an integer rank which is included in the coding data for said layer, in association with the data representing the position of the integers of the input list of said layer within said subset.

36. A method according to claim 27, wherein n≧2 and layer k data containers each having a plurality of records are provided in a computer memory for 1≦k≦n, each record of a layer k data container being associated with a layer k integer rank representing the position of a subset in the layer k pattern, and wherein each record of a layer k data container associated with a layer k rank representing the position of a subset in the layer k pattern has a first field for containing data for retrieving the position within said subset of any integer of a layer k input list relating to a data graph identifier list, whereby a combination of said layer k rank with any position retrievable from the data contained in said first field determines a layer k−1 rank with which a respective record of the layer k−1 data container is associated if k>1, and an identifier of said data graph identifier list if k=1.

37. A method according to claim 36, wherein, for 1≦k≦n, said data contained in the first field of a record of the layer k data container for retrieving the position of any integer of a layer k input list within a subset comprise a bitmap segment in which each bit is associated with a respective integer of said subset to indicate whether said integer belongs to said layer k input list.

38. A method according to claim 37, wherein, for 1≦k≦n, each record of the layer k data container associated with a layer k rank further has a second field for containing said layer k rank.

39. A method according to claim 38, wherein each data container comprises at least two files where the first and second fields of the records of said data container are respectively stored, said files being accessible separately.

40. A method according to claim 36, wherein, for 1≦k<n, each record of the layer k data container further has a second field for containing a number representing the position of an integer of a layer k+1 input list within a subset of the layer k+1 pattern, and wherein, for 1<k≦n, said data contained in the first field of a record of the layer k data container associated with a layer k rank for retrieving the position of any integer of a layer k input list within a subset of the layer k pattern comprise a pointer to at least one record of the layer k−1 data container in which the second field contains a number representing the position of an integer of said layer k input list within said subset of the layer k pattern, whereby said record of the layer k−1 data container is associated with the layer k−1 rank determined by the combination of said layer k rank with the position represented by said number.

41. A method according to claim 40, wherein said data contained in the first field of a record of the layer 1 data container for retrieving the position of any integer of a data graph identifier list within a subset comprise a bitmap segment in which each bit is associated with a respective integer of said subset to indicate whether said integer represents a data graph identifier of said list.

42. A method according to claim 40, wherein each record of the layer n data container associated with a layer n rank further has a second field for containing said layer n rank.

43. A method according to claim 40, wherein each layer k data container for 1<k<n comprises at least two files where the first and second fields of the records of said data container are respectively stored, said files being accessible separately.

44. A method according to claim 36, wherein, for 1≦k≦n, each record of the layer k data container further has a next address field, whereby record chains are defined in the layer k data container by means of the next address fields, and wherein at least some of the thesaurus entries are respectively associated with record chains in the layer n data container, whereby the coding data relating to one of said entries for layer n are stored in or retrievable from the record chain associated therewith in the layer n data container.

45. A method according to claim 44, wherein, for 1≦k<n, said thesaurus entries are respectively associated with record chains in the layer k data container, whereby the coding data relating to one of said entries for layer k are stored in or retrievable from the record chain associated therewith in the layer k data container.

46. A method according to claim 44, wherein, for 1<k≦n, each record of the layer k data container further has a head address field for pointing to an address of a first record of a respective chain in the layer k−1 data container.

47. A method according to claim 44, wherein each layer k data container for 1≦k≦n comprises at least two files where the first fields and the next address fields of the records of said data container are respectively stored, said files being accessible separately.

48. A method according to claim 1, wherein an integer range covering the identifiers allocated to the data graphs is partitioned into a plurality of predetermined portions, wherein at least some of the data representing identifier lists are distributed into a plurality of storage sections respectively associated with said portions, wherein a storage section associated with one of said portions contains data representing identifier sub-lists consisting of identifiers of said portion.

49. A method according to claim 48, wherein a respective storage unit is provided for each of said portions of the data graph identifier range, to receive the storage sections associated with said portion.

50. A method according to claim 49, wherein at least some of the word thesauruses have a plurality of sections respectively associated with said portions, wherein a section, associated with one of said portions, of a word thesaurus associated with an attribute has a respective entry for each word assigned to said attribute in a data graph to which an identifier of said portion is allocated, said entry containing data for retrieving an identifier sub-list from the storage section associated with said portion.

51. A method according to claim 49, further comprising the step of storing at least one macroword thesaurus associated with an attribute of said group and with a prefix length shorter than a word length of said attribute, having a respective entry for each prefix value having said prefix length and matching a corresponding prefix of at least one word assigned at least once to said attribute in the collection of data, said entry of the macroword thesaurus being associated with a data graph identifier list including each identifier allocated to a data graph having, assigned to said attribute, a word whose corresponding prefix matches said prefix value, wherein at least some of the macroword thesauruses have a plurality of sections respectively associated with said portions, wherein a section, associated with one of said portions, of a macroword thesaurus associated with an attribute and with a prefix length has a respective entry for each prefix value having said prefix length and matching a corresponding prefix of at least one word assigned to said attribute in a data graph to which an identifier of said portion is allocated, said entry containing data for retrieving an identifier sub-list from the storage section associated with said portion.

52. A method according to claim 48, wherein each thesaurus entry has a plurality of fields respectively associated with said portions, for containing data for retrieving respective identifier sub-lists from the storage sections.

53. A method of processing a query in a database system, wherein a group of attributes is defined and words of a collection of data are assigned to said attributes, the group of attributes being divided into a plurality of sub-groups respectively associated with a plurality of data tables having independent numbers of records, with links between respective records from the data tables, wherein identifiers are respectively allocated to data graphs, each data graph representing related attribute values respectively assigned to the attributes of said group, each attribute value of a data graph being either a default value or a word of said collection of data, wherein a plurality of thesauruses each associated with a respective attribute of said group and data representing data graph identifier lists respectively associated with entries of said thesauruses are stored, wherein each thesaurus associated with one attribute is defined with reference to a partition into subsets of a set of words which can be assigned to said one attribute and has a respective entry for each subset including at least one word assigned to said one attribute in the collection of data, the data graph identifier list associated with said thesaurus entry including any identifier allocated to a data graph having a word of said subset assigned to said one attribute, the method comprising the steps of:

analyzing query criteria to determine a combination involving thesaurus entries relevant to the query;

determining a matching data graph identifier list based on said combination and on the stored data representing the data graph identifier lists associated with said relevant thesaurus entries;

processing said matching data graph identifier list to output a response.

54. A method according to claim 53, wherein the step of analyzing the query criteria comprises, for at least one attribute referred to in said criteria:

selecting at least one range of words defined for said attribute in the query criteria; and mapping the words of the selected range which are assigned to said attribute in the collection of data with one or more subsets, the thesaurus entry for each of said one or more subset being retained as a relevant entry for the selected range, and wherein the step of determining the matching data graph identifier list comprises merging respective portions of the identifier lists represented by the data of the relevant thesaurus entries retained for said selected range.

55. A method according to claim 54, wherein the mapping is performed so as to retain a minimum number of relevant thesaurus entries for each selected range.

56. A method according to claim 54, wherein each thesaurus associated with an attribute is defined with reference to a partition such that each subset consists of one word or of consecutive words of the set of words which can be assigned to said attribute, the entries of said thesaurus being sorted based on the words assigned to said attribute, and wherein the step of analyzing the query criteria comprises at least one dichotomy search in at least one thesaurus for identifying relevant thesaurus entries.

57. A method according to claim 56, wherein the thesauruses comprise word thesauruses each associated with a respective attribute of the group, with reference to a partition into subsets each consisting of one word.

58. A method according to claim 57, wherein each word thesaurus associated with an attribute of the group to which the default value is assigned in at least one of the data graphs further has an entry for the default value, whereby one of said data graph identifier lists is associated with said thesaurus entry for the default value and includes any identifier allocated to a data graph having said default value assigned to said attribute.

59. A method according to claim 57, wherein the thesauruses further comprise at least one macroword thesaurus associated with an attribute of said group and with a prefix length shorter than a word length of said attribute, whereby said macroword thesaurus is defined with reference to a partition into subsets each consisting of words beginning by a common prefix having said prefix length.

60. A method according to claim 59, wherein at least one attribute of said group has a plurality of macroword thesauruses, associated with different prefix lengths.

61. A method according to claim 54, wherein the step of analyzing the query criteria comprises determining said combination involving relevant thesaurus entries as a tree having at least one leaf node, each leaf node corresponding to at least one relevant thesaurus entry retained for a respective attribute.

62. A method according to claim 61, wherein said tree has a plurality of nodes including said at least one leaf node and at least one operator node, each operator node representing a Boolean operator applied to at least one partial criterion represented by another node of said tree, one of the operator nodes being a root node representing all the query criteria.

63. A method according to claim 62, wherein the nodes of said tree further include at least one preset node for which a data graph identifier list has been determined prior to said step of analyzing the query criteria.

64. A method according to claim 63, wherein the data graph identifier list of said preset node is determined from at least one matching data graph identifier list obtained when processing a previous query.

65. A method according to claim 62, wherein the step of determining the matching data graph identifier list comprises obtaining a respective identifier list for each node of said tree, whereby the identifier list obtained for each leaf node corresponding to at least one relevant thesaurus entry is the merger of respective portions of the identifier lists associated with said at least one relevant thesaurus entry, and the identifier list obtained for each operator node representing a Boolean operator applied to at least one partial criterion is obtained by applying said Boolean operator to the identifier lists obtained for the node representing said at least one partial criterion, said matching data graph identifier list being determined as the identifier list obtained for the root node.

66. A method according to claim 65, wherein each of said obtained identifier lists is produced in the form of a bitmap vector consisting of bits assigned to respective data graphs to indicate whether the identifiers allocated to said data graphs belong to said obtained list.

67. A method according to claim 65, wherein a coding scheme comprising n successive coding layers is used to provide coding data representing the identifier list associated with a thesaurus entry, n being a number at least equal to 1, each layer having a predetermined pattern for dividing a range covering integers of an input list of said layer into subsets, said identifier list being the input list of the first layer for said thesaurus entry, wherein for any layer other than the last layer, an integer list representing the position, in the patter of said layer, of each subset containing at least one integer of the input list forms the input list for the next layer, and wherein the coding data comprise, for each layer and each subset containing at least one integer of the input list, data representing the position of each integer of the input list within said subset and, at least if said layer is the last layer, data representing the position of said subset in the pattern of said layer.

68. A method according to claims 67, wherein the patter of each layer is such that the integer subsets are consecutive intervals consisting of the same number of integers.

69. A method according to claim 68, wherein said number of integers is a whole power of 2 for each layer.

70. A method according to claim 67, wherein said data representing the position of an integer of an input list within a subset consist of a bitmap segment.

71. A method according to claim 67, wherein the step of determining the matching data graph identifier list comprises determining a layer n integer list for each node of said tree, whereby the layer n integer list determined for a leaf node consists of a layer n input list associated, in the coding scheme, with the merger of the identifier lists represented in the relevant thesaurus entries to which said leaf node corresponds, and whereby the layer n integer list obtained for each operator node representing a Boolean operator applied to at least one partial criterion is obtained by applying said Boolean operator to the layer n integer lists determined for the nodes representing said at least one partial criterion, and wherein a layer n result list is determined as the layer n integer list obtained for the root node.

72. A method according to claim 71, wherein the nodes of said tree further include at least one preset node for which a data graph identifier list has been determined prior to said step of analyzing the query criteria, said data graph identifier list being subjected to the coding scheme to provide a layer n input list which is determined as said layer n integer list for said preset node.

73. A method according to claim 71, wherein, in the coding scheme, the coding data representing the position of each integer of an input list within a subset for the coding layer n define a layer n bitmap segment in which each bit is associated with a respective integer of the subset to indicate whether said integer belongs to said input list, while the data representing the position of said subset in the layer n pattern comprise a layer n integer rank associated with said layer n bitmap segment, and wherein the step of determining a layer n integer list for a leaf node comprises:

initializing a layer n bitmap vector with logical zeroes;

obtaining the layer n ranks and associated bitmap segments from the coding data for each relevant thesaurus entry to which said leaf node corresponds; and for each of said layer n ranks, superimposing the layer n bitmap segment associated therewith onto a segment of said layer n bitmap vector having a position determined by said layer n rank, the superimposition being performed according to a bitwise Boolean OR operation, said layer n list for the leaf node corresponding to the resulting layer n bitmap vector.

74. A method according to claim 71, wherein n>1 and the step of determining the matching data graph identifier list further comprises, for k decreasing from n−1 to 1, determining a layer k integer list for each node of said tree, whereby the layer k integer list determined for a leaf node consists of any integer of a layer k input list, associated in the coding scheme with the identifier list represented in a relevant thesaurus entry to which said leaf node corresponds, which belongs to a layer k subset whose position is represented in the layer k+1 result list, and whereby the layer k integer list obtained for each operator node representing a Boolean operator applied to at least one partial criterion is obtained by applying said Boolean operator to the layer k integer lists determined for the nodes representing said at least one partial criterion, wherein a layer k result list is determined as the layer k integer list obtained for the root node, and wherein said matching data graph identifier list corresponds to the determined layer 1 result list.

75. A method according to claim 74, wherein the nodes of said tree further include at least one preset node for which a data graph identifier list has been determined prior to said step of analyzing the query criteria, said data graph identifier list being subjected to the coding scheme to provide a layer k input list which is determined as said layer k integer list for said preset node.

76. A method according to claim 74, wherein, in the coding scheme, the coding data representing the position of each integer of an input list within a subset for a coding layer k<n define a layer k bitmap segment in which each bit is associated with a respective integer of the subset to indicate whether said integer belongs to said input list, while the coding data further comprise a layer k integer rank associated with said layer k bitmap segment to represent the position of said subset in the layer k pattern, and wherein the step of determining a layer k integer list for a leaf node comprises:

initializing a layer k bitmap vector with logical zeroes;

obtaining the layer k ranks from the coding data for each relevant thesaurus entry to which said leaf node corresponds; and selecting any obtained layer k rank belonging to the layer k+1 result list and superimposing the associated layer k bitmap segment onto a segment of said layer k bitmap vector having a position determined by the selected layer k rank, the superimposition being performed according to a bitwise Boolean OR operation, said layer k list for the leaf node corresponding to the resulting layer k bitmap vector.

77. A method according to claim 76, wherein, for $1 \leq k < n$, the layer k ranks and the layer k bitmap segments associated therewith for at least one thesaurus entry are stored at corresponding addresses in distinct first and second files, and wherein the step of determining a layer k integer list for a leaf node comprises:

providing a rank table in a RAM memory, having records associated with the addresses in said first and second files;

filling the rank table by writing any selected layer k rank into the rank table record associated with the address of the selected layer k rank in said first file; and for any record of the filled rank table containing a layer k rank and associated with an address in the second file, reading the associated layer k bitmap segment at said address in the second file and superimposing the read layer k bitmap segment onto a segment of said layer k bitmap vector having a position determined by said layer k rank.

78. A method according to claim 74, wherein the step of determining the matching data graph identifier list further comprises, for any coding layer k such that $1 < k \leq n$, determining a layer k' filtering list for $k \leq k' \leq n$ consisting of the layer k' input list obtained by providing the layer k result list as an input list in layer k of the coding scheme, wherein, in the coding scheme, the coding data representing the position of each integer of an input list within a subset for a coding layer k<n define a layer k bitmap segment in which each bit is associated with a respective integer of the subset to indicate whether said integer belongs to said input list, while a layer k integer rank associated with said layer k bitmap segment represents the position of said subset in the layer k pattern, and wherein the step of determining a layer k integer list for a leaf node for k<n comprises:

/a/ initializing a layer k bitmap vector with logical zeroes;

/b/ selecting the layer n ranks obtained from the coding data for each relevant thesaurus entry to which said leaf node corresponds, and setting k'=n;

/c/ for each selected layer k' rank:

/c1/ if the selected layer k' rank represents the position in the layer k' pattern of a subset which includes at least one integer of the layer k' filtering list, obtaining the layer k' bitmap segment with which the selected layer k' rank is associated;

/c2/ for any integer of the layer k' filtering list whose position within said subset is represented in said layer k' bitmap segment, selecting a respective layer k'−1 rank determined from the selected layer k' rank and said position represented in said layer k' bitmap segment;

/c3/ if k'>k+1, executing step /c/ with k' decremented by one unit; and

/c4/ if k'−1 =k, obtaining any layer k bitmap segment with which a selected layer k'−1 rank is associated, and superimposing said layer k bitmap segment onto a segment of said layer k bitmap vector having a position determined by said selected layer k'−1 rank, the superimposition being performed according to a bitwise Boolean OR operation, said layer k list for the leaf node corresponding to the resulting layer k bitmap vector.

79. A method according to claim 78, wherein, for $1 \leq k < n$, the layer k bitmap segments for at least one thesaurus entry are stored in at least one layer k file at addresses respectively corresponding to the layer k ranks associated therewith, and wherein, for 1≦k<n, the step of determining a layer k integer list for a leaf node comprises:

provide a rank table in a RAM memory, having records associated with the addresses in said layer k file;

filling the rank table by writing any selected layer k rank into the rank table record associated with the address corresponding to the selected layer k rank; and for any record of the filled rank table containing a layer k rank and associated with an address in said layer k file, reading the associated layer k bitmap segment at said address and superimposing the read layer k bitmap segment onto a segment of said layer k bitmap vector having a position determined by said layer k rank.

80. A method according to claim 53, wherein a link table is stored, having a plurality of rows respectively associated with the data graphs and a plurality of columns respectively associated with the attribute sub-groups, wherein each row of the link table contains, in each one of the columns, either a value indicating that each attribute value represented in the data graph associated with said row and assigned to an attribute of the sub-group associated with said one of the columns is a default value or a link value for retrieving at least one stored word of the collection of data represented in the data graph associated with said row and assigned to an attribute of the sub-group associated with said one of the columns, and wherein the step of processing the matching data graph identifier list comprises reading at least one value in any row of the link table associated with a data graph identified in the matching data graph identifier list.

81. A method according to claim 80, wherein said data tables are stored, wherein each link value contained in the column of the link table associated with an attribute sub-group comprises data for identifying a record of the data table associated with said sub-group, and wherein the step of processing the matching data graph identifier list further comprises reading at least part of any data table record identified by a link value read in a row of the link table.

82. A method according to claim 53, wherein the step of processing the matching data graph identifier list comprises, for at least one attribute specified in the query, selecting a thesaurus associated with said attribute and detecting entries of the selected thesaurus with which identifier lists having a non-empty intersection with the matching data graph identifier list are associated.

83. A method according to claim 82, wherein said attribute specified in the query has Q+1 stored thesauruses associated with different prefix lengths, Q being an integer at least equal to 0, each of said Q+1 thesauruses having a thesaurus level parameter q such that 0≦q≦Q, whereby the prefix length is a decreasing function of the level parameter q and corresponds to a word length of said attribute for q=0, wherein each of said Q+1 thesauruses is defined with reference to a respective partition into subsets each consisting of words beginning by a common prefix having the prefix length associated with said thesaurus, the entries of said thesaurus being sorted based on the prefix values.

84. A method according to claim 83, wherein, the selected thesaurus having a level parameter QA≧0, the detection of entries in the selected thesaurus comprises the steps of:

/a/ providing respective level q target lists and respective level q thesaurus ranges covering consecutive entries of the level q thesaurus for QA≦q≦Q;

/b/ initializing the level Q target list with the matching data graph identifier list, initializing the level parameter q with the value Q, and selecting a first entry of the level Q thesaurus range;

/c/ determining an intersection list between the level q target list and the identifier list associated with the selected entry of the level q thesaurus range;

/d/ if the intersection list determined in the preceding step /c/ is empty, selecting another entry of the level q thesaurus range and repeating step /c/;

/e/ if q is greater than QA:

/e1/ setting the level q−1 target list as equal to the intersection list determined in the preceding step /c/;

/e2/ setting the level q−1 thesaurus range as consisting of the entries of the level q−1 thesaurus relating to level q−1 prefixes which begin with the level q prefix of the selected level q thesaurus entry, and selecting a first entry of the level q−1 thesaurus range;

/e3/ decrementing q by one unit and returning to step /c/;

/f/ if q is equal to QA:

/f1/ including the selected level QA thesaurus entry in the detected entries;

/f2/ if the level Q target list is equal to the intersection list determined in the preceding step /c/, terminating the detection of entries in the selected thesaurus;

/f3/ removing the integers of the intersection list determined in the preceding step /c/ from any target list including at least one integer which is not in said intersection list;

/f4/ setting q as the smallest level parameter for which the target list includes at least one integer which is not in said intersection list;

/f5/ selecting another entry in the level q thesaurus range and returning to step /c/.

85. A method according to claim 84, wherein Q≧1 and each thesaurus having a level parameter q≧1 further contains, in each entry provided for a level q prefix value, data designating the entry of the level q−1 thesaurus which corresponds to the lowest or highest level q−1 prefix beginning with the level q prefix of said level q thesaurus entry, and wherein step /e2/ comprises selecting the level q−1 thesaurus entry designated in the selected level q thesaurus entry.

86. A method according to claim 84, wherein a coding scheme comprising n successive coding layers is used to provide coding data representing the identifier list associated with a level q thesaurus entry for 0≦q≦Q, n being a number at least equal to 1, each layer having a predetermined pattern for dividing a range covering integers of an input list of said layer into subsets, said identifier list being the input list of the first layer for said thesaurus entry, wherein for any layer other than the last layer, an integer list representing the position, in the pattern of said layer, of each subset containing at least one integer of the input list forms the input list for the next layer, wherein the coding data comprise, for each layer and each subset containing at least one integer of the input list, data representing the position of each integer of the input list within said subset and, at least if said layer is the last layer, data representing the position of said subset in the pattern of said layer, and wherein each level q target list forms a layer 1 and level q filtering list and is submitted as a layer 1 input list in the coding scheme for QA≦q≦Q to provide respective layer k and level q filtering lists for 1<k≦n if n>1, said layer k and level q filtering list provided from a level q target list being the layer k input list obtained from said level q target list in the coding scheme.

87. A method according to claim 86, wherein the pattern of each layer is such that the integer subsets are consecutive intervals consisting of the same number of integers.

88. A method according to claim 87, wherein said number of integers is a whole power of 2 for each layer.

89. A method according to claim 86, wherein the step /c/ of determining the intersection list between a level q target list and an identifier list comprises, from k=n:

/c1/ computing a layer k intersection list between the layer k input list obtained from said identifier list in the coding scheme and the layer k and level q filtering list corresponding to said level q target list;

/c2/ if the computed layer k intersection list is empty, determining said intersection list between the level q target list and the identifier list as being empty;

/c3/ if k=1, determining said intersection list between the level q target list and the identifier list as the computed layer 1 intersection list; and /c4/ if k>1, decrementing k by one unit and repeating from step /c1/.

90. A method according to claim 89, wherein, in the coding scheme, the coding data representing the position of each integer of an input list within a subset for a coding layer k≦n define a layer k bitmap segment in which each bit is associated with a respective integer of the subset to indicate whether said integer belongs to said input list, while the data representing the position of said subset in the layer k pattern comprise a layer k integer rank associated with said layer k bitmap segment, and wherein the step /c1/ of computing a layer k intersection list between a layer k input list obtained from an identifier list in the coding scheme and a layer k and level q filtering list, represented by a first layer k bitmap vector, comprises:

initializing a second layer k bitmap vector with logical zeroes;

obtaining layer k ranks from the coding data representing said identifier list; and selecting any obtained layer k rank which represents the position in the layer k pattern of a subset including at least one integer of said layer k and level q filtering list, obtaining the layer k bitmap segment with which the selected layer k rank is associated, and determining a segment of the second layer k bitmap vector having a position determined by the selected layer k rank by combining the obtained layer k bitmap segment with a segment of the first layer k bitmap vector having a position determined by the selected layer k rank according to a bitwise Boolean AND operation, said layer k intersection list corresponding to the resulting second layer k bitmap vector.

91. A method according to claim 90, wherein, for 1≦k<n, the layer k ranks and the layer k bitmap segments associated therewith for at least one thesaurus entry are stored at corresponding addresses in distinct first and second files, and wherein the step /c1/ of computing a layer k intersection list between a layer k input list obtained from an identifier list in the coding scheme and a layer k and level q filtering list, represented by a first layer k bitmap vector, comprises:

providing a rank table in a RAM memory, having records associated with the addresses in said first and second files;

filling the rank table by writing any selected layer k rank into the rank table record associated with the address of said selected layer k rank in said first file; and for any record of the filled rank table containing a layer k rank and associated with an address in the second file, reading the associated layer k bitmap segment at said address in the second file and combining the read layer k bitmap segment with a segment of the first layer k bitmap vector having a position determined by said layer k rank according to a bitwise Boolean AND operation to determine a segment of the second layer k bitmap vector having a position determined by said layer k rank.

92. A method according to claim 90, further comprising determining a pre-filtering flag for each entry of a level q thesaurus, said pre-filtering flag having a first value when said entry is associated with a data graph identifier list represented by coding data which do not define any layer n rank representing the position in the layer n pattern of a subset which includes at least one integer of a layer n and level q filtering list, and wherein the step /c/ of determining the intersection list between a level q target list, corresponding to said layer n and level q filtering list, and an identifier list associated with an entry of the level q thesaurus comprises determining said intersection list as being empty if the pre-filtering flag determined for said entry has said first value.

93. A method according to claim 92, wherein, for any level q thesaurus entry associated with a data graph identifier list represented by coding data which define a layer n rank representing the position in the layer n pattern of a subset which includes at least one integer of the layer n and level q filtering list, the layer n bitmap segment associated with said layer n rank is obtained and said first value is allocated to the pre-filtering flag determined for said entry if the obtained layer n bitmap segment does not represent the position of any integer of said layer n and level q filtering list within said subset.

94. A method according to claim 86, wherein n>1 and in the coding scheme, the coding data representing the position of each integer of an input list within a subset for a coding layer k≦n define a layer k bitmap segment in which each bit is associated with a respective integer of the subset to indicate whether said integer belongs to said input list, while a layer k integer rank associated with said layer k bitmap segment represents the position of said subset in the layer k pattern, and wherein the step /c/ of determining the intersection list between a level q target list, corresponding to layer k and level q filtering lists represented by a respective first layer k bitmap vectors for 1≦k≦n, and an identifier list comprises:

/c1/ initializing a second bitmap vector with logical zeroes;

/c2/ selecting layer n ranks obtained from the coding data representing said identifier list, and setting k=n;

/c3/ for each selected layer k rank:

/c31/ if the selected layer k rank represents the position in the layer k pattern of a subset which includes at least one integer of said layer k and level q filtering list, obtaining the layer k bitmap segment with which the selected layer k rank is associated;

/c32/ for any integer of the layer k and level q filtering list whose position within said subset is represented in said layer k bitmap segment, selecting a respective layer k−1 rank determined from the selected layer k rank and said position represented in said layer k bitmap segment;

/c33/ if k>2, executing step /c3/ with k decremented by one unit; and

/c34/ if k=2, obtaining any layer 1 bitmap segment with which a selected layer 1 rank is associated, and combining the obtained layer 1 bitmap segment with a segment of the first layer 1 bitmap vector having a position determined by said layer 1 rank according to a bitwise Boolean AND operation to determine a segment of the second bitmap vector having a position determined by said layer 1 rank, said intersection list corresponding to the resulting second bitmap vector.

95. A method according to claim 94, wherein the layer 1 bitmap segments for at least one thesaurus entry are stored in at least one layer 1 file at addresses respectively corresponding to the layer 1 ranks associated therewith, and the step /c/ of determining an intersection list comprises:

provding a rank table in a RAM memory, having records associated with the addresses in said layer 1 file;

filling the rank table by writing any layer 1 rank selected in step /c32/ into the rank table record associated with the address corresponding to the selected layer 1 rank; and for any record of the filled rank table containing a layer 1 rank and associated with an address in said layer 1 file, reading the associated layer 1 bitmap segment at said address and combining the read layer 1 bitmap segment with a segment of the first layer 1 bitmap vector having a position determined by said layer 1 rank according to a bitwise Boolean AND operation to determine a segment of the second layer 1 bitmap vector having a position determined by said layer 1 rank.

96. A method according to claim 94, further comprising determining a pre-filtering flag for each entry of a level q thesaurus, said pre-filtering flag having a first value when said entry is associated with a data graph identifier list represented by coding data which do not define any layer n rank representing the position in the layer n pattern of a subset which includes at least one integer of a layer n and level q filtering list, and wherein the step /c/ of determining the intersection list between a level q target list, corresponding to said layer n and level q filtering list, and an identifier list associated with an entry of the level q thesaurus comprises determining said intersection list as being empty if the pre-filtering flag determined for said entry has said first value.

97. A method according to claim 96, wherein, for any level q thesaurus entry associated with a data graph identifier list represented by coding data which define a layer n rank representing the position in the layer n pattern of a subset which includes at least one integer of the layer n and level q filtering list, the layer n bitmap segment associated with said layer n rank is obtained and said first value is allocated to the pre-filtering flag determined for said entry if the obtained layer n bitmap segment does not represent the position of any integer of said layer n and level q filtering list within said subset.

98. A method according to claim 82, wherein the step of processing the matching data graph identifier list further comprises writing output data associated with any detected entry of a selected thesaurus into an output table.

99. A method according to claim 98, wherein the output table includes a respective row corresponding to each identifier of the matching data graph identifier list, and wherein output data associated with a detected entry of a selected thesaurus are written into any row of the output table corresponding to a data graph identifier belonging to both the matching data graph identifier list and the identifier list associated with said detected thesaurus entry.

100. A method according to claim 99, wherein each data graph identifier has a respective row of the output table corresponding thereto, wherein the rows of the output table are initialized with a default value before writing the output data, and wherein the rows of the output table which do not contain the default value are read after writing the output data.

101. A method according to claim 99, wherein the output table is associated with an index file having a respective record for each data graph identifier, containing either a default value or a pointer designating a respective row of the output table corresponding to said data graph identifier, wherein the records of the index file are initialized with a default value before writing the output data, and wherein the step of writing output data associated with a detected entry of a first selected thesaurus comprises, for each data graph identifier belonging to both the matching data graph identifier list and the identifier list associated with said detected entry of the first selected thesaurus:

allocating an available row of the output table to correspond to said data graph identifier, writing output data into the allocated row; and writing a pointer to the allocated row into the record of the index file provided for said data graph identifier.

102. A method according to claim 99, wherein the output table has a plurality of columns each associated with a respective attribute for which a thesaurus is selected, and wherein output data associated with a detected entry of a thesaurus selected for an attribute associated with a column of the output table are written into said column.

103. A method according to claim 101, wherein the output table has a plurality of columns each associated with a respective attribute for which a thesaurus is selected, wherein output data associated with a detected entry of a thesaurus selected for an attribute associated with a column of the output table are written into said column, and wherein the step of writing output data associated with a detected entry of at least one second selected thesaurus comprises, for each data graph identifier belonging to both the matching data graph identifier list and the identifier list associated with said detected entry of the second selected thesaurus:

reading the pointer contained in the record of the index file provided for said data graph identifier; and writing output data into the row of the output table designated by said pointer.

104. A method according to claim 98, wherein the selected thesaurus being a word thesaurus defined with reference to a partition into subsets each consisting of one word, the output data associated with a detected entry comprise the word for which said detected entry is provided.

105. A method according to claim 98, wherein the selected thesaurus being a macroword thesaurus associated with a prefix length and defined with reference to a partition into subsets each consisting of words beginning by a common prefix having said prefix length, the output data associated with a detected entry comprise the prefix value for which said detected entry is provided.

106. A method according to claim 98, wherein the output data associated with a detected entry comprise an address of said detected entry in the selected thesaurus.

107. A method according to claim 98, wherein the output data associated with a detected entry of a selected thesaurus comprise a numerical value derived from said thesaurus entry.

108. A method according to claim 107, wherein, for a detected entry of at least one selected thesaurus, said numerical value is calculated by applying a mathematical function to a thesaurus value stored in said entry.

109. A method according to claim 107, wherein, for a detected entry of at least one selected thesaurus, said numerical value is calculated by applying a mathematical function to a plurality of values including a thesaurus value stored in said entry and at least one value already present in the output table.

110. A method according to claim 107, wherein the output table includes a respective row corresponding to each identifier of the matching data graph identifier list, and wherein a numerical value derived from a detected thesaurus entry is written into any row of the output table corresponding to a data graph identifier belonging to both the matching data graph identifier list and the identifier list associated with said detected thesaurus entry.

111. A method according to claim 110, wherein the numerical value, derived from a detected entry of a first selected thesaurus and written into any row of the output table corresponding to a data graph identifier belonging to both the matching data graph identifier list and the identifier list associated with said entry of the first selected thesaurus, is obtained from a thesaurus value stored in said entry, and wherein the numerical value, derived from a detected entry of at least one second selected thesaurus and written into a row of the output table corresponding to a data graph identifier belonging to both the matching data graph identifier list and the identifier list associated with said entry of the second selected thesaurus, is calculated by applying a mathematical function to a plurality of values including a thesaurus value stored in said entry and at least one value already present in said row of the output table.

112. A method according to claim 110, further comprising calculating an output value from a set of numerical values which have been respectively written into the rows of the output table.

113. A method according to claim 53, wherein an integer range covering the identifiers allocated to the data graphs is partitioned into a plurality of predetermined portions, wherein at least some of the data representing identifier lists are distributed into a plurality of storage sections respectively associated with said portions, wherein a storage section associated with one of said portions contains data representing identifier sub-lists consisting of identifiers of said portion, and wherein the step of determining a matching data graph identifier list is executed separately for the different portions of the data graph identifier range, by means of the respective storage sections.

114. A method according to claim 113, wherein the step of processing the matching data graph identifier is at least partially executed separately for the different portions of the data graph identifier range, by means of the respective storage sections.

115. A method according to claim 113, wherein the thesauruses have a plurality of sections respectively associated with said portions, wherein a section, associated with one of said portions, of a thesaurus associated with an attribute and defined with reference to a partition into subsets has a respective entry for each subset of said partition which includes at least one word assigned to said attribute in a data graph to which an identifier of said portion is allocated, said entry containing data representing an identifier sub-list including each identifier of said portion allocated to a data graph having a word of said subset assigned to said attribute, and wherein the step of analyzing the query criteria is at least partially executed separately for the different portions of the data graph identifier range, by means of the respective thesaurus sections.

116. A method according to claim 113, wherein the separate step executions are carried out in parallel by respective processors for the different portions of the data graph identifier range.

117. A method according to claim 116, wherein each thesaurus entry has a plurality of fields respectively associated with said portions, for containing data for retrieving respective identifier sub-lists from the storage sections, wherein the step of analyzing the query criteria is executed centrally for all the portions of the data graph identifier range, and wherein the relevant thesaurus entries used by a processor executing the step of determining a matching data graph identifier list by means of a storage section are designated by the data for retrieving identifier sub-lists from said storage section.

118. A method according to claim 117, wherein the step of analyzing the query criteria is executed by a query server connected to said processors through a communication network.

119. A method according to claim 116, wherein a list update server is connected, through the communication network, to a plurality of storage units respectively coupled to said processors, the list update server controlling the storage units to maintain the storage sections.

120. A database system, for managing information from a plurality of data tables having different numbers of records, wherein the group of attributes is divided into a plurality of sub-groups respectively associated with the data tables, with links between respective records from the data tables, each data table having a column for each attribute of the associated sub-group and rows for containing data table records comprising at least one word assigned to an attribute of the associated sub-group in a collection of data, wherein respective identifiers are allocated to data graphs, each data graph representing related attribute values respectively assigned to the attributes of said group, each attribute value of a data graph being either a default value or a word of said collection of data, the words of each data graph being from linked data table records, the database system comprising:

means for storing a plurality of thesauruses respectively associated with attributes of said group, wherein each thesaurus associated with an attribute is defined with reference to a partition into subsets of a set of words which can be assigned to said attribute and has a respective entry for each subset including at least one word assigned to said attribute in the collection of data; and means for storing data representing data graph identifier lists respectively associated with the thesaurus entries, wherein the data graph identifier list associated with a entry, relating to a subset, of a thesaurus associated with an attribute includes any identifier allocated to a data graph having a word of said subset assigned to said attribute.

121. A database system according to claim 120, further comprising means for storing a link table having a plurality of rows respectively associated with the data graphs and a plurality of columns respectively associated with the attribute sub-groups, wherein each row of the link table contains, in each one of the columns, either a value indicating that each attribute value represented in the data graph associated with said row and assigned to an attribute of the sub-group associated with said one of the columns is a default value or data for identifying a row of the data table associated with said sub-group.

122. A database system according to claim 120, wherein at least one thesaurus entry comprises data for pointing to at least one memory region where coding data representing the data graph identifier list associated with said entry are stored.

123. A database system according to claim 122, wherein said memory region comprises a file individually allocated to said thesaurus entry.

124. A database system according to claim 122, wherein said memory region comprises a portion of a data container having a plurality of records each having a next address field, said portion being defined as a record chain in said data container, the chains being defined by means of the next address fields, and wherein said data for pointing to at least one memory region comprise a respective address of a first record of a chain in said data container.

125. A database system according to claim 124, further comprising means for grouping the records stored in the data container so that the records of each chain have contiguous addresses.

126. A database system according to claim 120, wherein a plurality of formats are provided for representing the data graph identifier lists, and wherein each thesaurus entry contains an indication of the format used for representing the data graph identifier list associated therewith.

127. A database system according to claim 120, further comprising query processing means including:
    means for analyzing query criteria to determine a combination involving thesaurus entries relevant to a query;
    means for determining a matching data graph identifier list based on said combination and on the stored data representing the data graph identifier lists associated with said relevant thesaurus entries;
    output means for processing said matching data graph identifier list to output a response.

128. A database system according to claim 127, wherein the means for analyzing the query criteria comprise:
    means for selecting at least one range of words defined for one attribute in the query criteria; and
    mapping means for mapping the words of the selected range which are assigned to said attribute in the collection of data with one or more subsets, and for retaining the thesaurus entry for each of said one or more subset as a relevant entry for the selected range, and wherein the means for determining the matching data graph identifier list comprise means for merging respective portions of the identifier lists represented by the data of the relevant thesaurus entries retained for said selected range.

129. A database system according to claim 128, wherein the mapping means are arranged to retain a minimum number of relevant thesaurus entries or each selected range.

130. A database system according to claim 128, wherein each thesaurus associated with an attribute is defined with reference to a partition such that each subset consists of one word or of consecutive words of the set of words which can be assigned to said attribute, the entries of said thesaurus being sorted based on the words assigned to said attribute, and wherein the means for analyzing the query criteria comprise dichotomy search means in at least one thesaurus for identifying relevant thesaurus entries.

131. A database system according to claim 130, wherein the thesauruses comprise word thesauruses each associated with a respective attribute of the group, with reference to a partition into subsets each consisting of one word.

132. A database system according to claim 131, wherein each word thesaurus associated with an attribute of the group to which the default value is assigned in at least one of the data graphs further has an entry for the default value, whereby one of said data graph identifier lists is associated with said thesaurus entry for the default value and includes any identifier allocated to a data graph having said default value assigned to said attribute.

133. A database system according to claim 130, wherein the thesauruses further comprise at least one macroword thesaurus associated with an attribute of said group and with a prefix length shorter than a word length of said attribute, whereby said macroword thesaurus is defined with reference to a partition into subsets each consisting of words beginning by a common prefix having said prefix length.

134. A database system according to claim 128, wherein the means for analyzing the query criteria comprise means for determining said combination involving relevant thesaurus entries as a tree having at least one leaf node, each leaf node corresponding to at least one relevant thesaurus entry retained for a respective attribute.

135. A database system according to claim 134, wherein said tree has a plurality of nodes including said at least one leaf node and at least one operator node, each operator node representing a Boolean operator applied to at least one partial criterion represented by another node of said tree, one of the operator nodes being a root node representing all the query criteria.

136. A database system according to claim 135, wherein the means for determining the matching data graph identifier list comprise means for obtaining a respective identifier list for each node of said tree, whereby the identifier list obtained for each leaf node corresponding to at least one relevant thesaurus entry is the merger of respective portions of the identifier lists associated with said at least one relevant thesaurus entry, and the identifier list obtained for each operator node representing a Boolean operator applied to at least one partial criterion is obtained by applying said Boolean operator to the identifier lists obtained for the node representing said at least one partial criterion, said matching data graph identifier list being determined as the identifier list obtained for the root node.

137. A database system according to claim 136, wherein each of said obtained identifier lists is produced in the form of a bitmap vector consisting of bits assigned to respective data graphs to indicate whether the identifiers allocated to said data graphs belong to said obtained list.

138. A database system according to claim 136, wherein a coding scheme comprising n successive coding layers is used to provide coding data representing the identifier list associated with a thesaurus entry, n being a number at least equal to 1, each layer having a predetermined pattern for dividing a range covering integers of an input list of said layer into subsets, said identifier list being the input list of the first layer for said thesaurus entry, wherein for any layer other than the last layer, an integer list representing the position, in the pattern of said layer, of each subset containing at least one integer of the input list forms the input list for the next layer,
    and wherein the coding data comprise, for each layer and each subset containing at least one integer of the input list, data representing the position of each integer of the input list within said subset and, at least if said layer is the last layer, data representing the position of said subset in the pattern of said layer.

139. A database system according to claims 138, wherein the pattern of each layer is such that the integer subsets are consecutive intervals consisting of the same number of integers.

140. A database system according to claim 139, wherein said number of integers is a whole power of 2 for each layer.

141. A database system according to claim 138, wherein the means for determining the matching data graph identifier list comprise means for determining a layer n integer list for each node of said tree, whereby the layer n integer list determined for a leaf node consists of a layer n input list associated, in the coding scheme, with the merger of the identifier lists represented in the relevant thesaurus entries to which said leaf node corresponds, and whereby the layer n integer list obtained for each operator node representing a Boolean operator applied to at least one partial criterion is obtained by applying said Boolean operator to the layer n integer lists determined for the nodes representing said at least one partial criterion, and wherein a layer n result list is determined as the layer n integer list obtained for the root node.

142. A database system according to claim 141, wherein the nodes of said tree further include at least one preset node for which a data graph identifier list has been determined in advance, said data graph identifier list being subjected to the coding scheme to provide a layer n input list which is determined as said layer n integer list for said preset node.

143. A database system according to claim 141, wherein n>1 and the means for determining the matching data graph identifier list further comprise, for k decreasing from n−1 to 1, means for determining a layer k integer list for each node of said tree, whereby the layer k integer list determined for a leaf node consists of any integer of a layer k input list, associated in the coding scheme with the identifier list represented in a relevant thesaurus entry to which said leaf node corresponds, which belongs to a layer k subset whose position is represented in the layer k+1 result list, and whereby the layer k integer list obtained for each operator node representing a Boolean operator applied to at least one partial criterion is obtained by applying said Boolean operator to the layer k integer lists determined for the nodes representing said at least one partial criterion, and means for determining a layer k result list as the layer k integer list obtained for the root node, and wherein said matching data graph identifier list corresponds to the determined layer 1 result list.

144. A database system according to claim 127, wherein the output means comprise means for selecting a thesaurus associated with an attribute specified in the query, and means for detecting entries of the selected thesaurus with which identifier lists having a non-empty intersection with the matching data graph identifier list are associated.

145. A database system according to claim 144, wherein the output means further comprise means for writing output data associated with any detected entry of a selected thesaurus into an output table.

146. A database system according to claim 145, wherein the output table includes a respective row corresponding to each identifier of the matching data graph identifier list, and wherein said means for writing output data are arranged to write output data associated with a detected entry of a selected thesaurus into any row of the output table corresponding to a data graph identifier belonging to both the matching data graph identifier list and the identifier list associated with said detected thesaurus entry.

147. A database system according to claim 146, wherein the output table has a plurality of columns each associated with a respective attribute for which a thesaurus is selected, and wherein said means for writing output data are arranged to write into a column of the output table output data associated with a detected entry of a thesaurus selected for an attribute associated with said column.

148. A database system according to claim 145, wherein the selected thesaurus being a word thesaurus defined with reference to a partition into subsets each consisting of one word, the output data associated with a detected entry comprise the word for which said detected entry is provided.

149. A database system according to claim 145, wherein the selected thesaurus being a macroword thesaurus associated with a prefix length and defined with reference to a partition into subsets each consisting of words beginning by a common prefix having said prefix length, the output data associated with a detected entry comprise the prefix value for which said detected entry is provided.

150. A database system according to claim 145, wherein the output data associated with a detected entry comprise an address of said detected entry in the selected thesaurus.

151. A database system according to claim 145, wherein the output data associated with a detected entry of a selected thesaurus comprise a numerical value derived from said thesaurus entry.

152. A database system according to claim 151, further comprising means for calculating said numerical value for a detected entry of at least one selected thesaurus by applying a mathematical function to a thesaurus value stored in said entry.

153. A database system according to claim 151, further comprising means for calculating said numerical value for a detected entry of at least one selected thesaurus by applying a mathematical function to a plurality of values including a thesaurus value stored in said entry and at least one value already present in the output table.

154. A database system according to claim 151, wherein the output table includes a respective row corresponding to each identifier of the matching data graph identifier list, and wherein said means for writing output data are arranged to write a numerical value derived from a detected thesaurus entry into any row of the output table corresponding to a data graph identifier belonging to both the matching data graph identifier list and the identifier list associated with said detected thesaurus entry.

155. A database system according to claim 154, wherein the numerical value, derived from a detected entry of a first selected thesaurus and written into any row of the output table corresponding to a data graph identifier belonging to both the matching data graph identifier list and the identifier list associated with said entry of the first selected thesaurus, is obtained from a thesaurus value stored in said entry, and wherein the numerical value, derived from a detected entry of at least one second selected thesaurus and written into a row of the output table corresponding to a data graph identifier belonging to both the matching data graph identifier list and the identifier list associated with said entry of the second selected thesaurus, is calculated by applying a mathematical function to a plurality of values including a thesaurus value stored in said entry and at least one value already present in said row of the output table.

156. A database system according to claim 154, further comprising means for calculating an output value from a set of numerical values which have been respectively written into the rows of the output table.

157. A database system according to claim 127, wherein the means for storing data representing identifier lists comprise a plurality of storage sections respectively associated with distinct portions of an integer range covering the identifiers allocated to the data graphs according to a predetermined partition, wherein each storage section associated with one of said portions contains data representing identifier sub-lists consisting of identifiers of said portion, and wherein the means for determining the matching data graph identifier list comprise means for determining respective matching identifier sub-lists included in the different portions of the data graph identifier range, by means of the respective storage sections.

158. A database system according to claim 157, comprising a processor to determine said matching identifier sub-lists sequentially.

159. A database system according to claim 157, comprising a plurality of processors respectively associated to the different portions of the data graph identifier range, to determine said matching identifier sub-lists in parallel.

160. A database system according to claim 159, wherein the means for analyzing query criteria comprise a query server connected to said processors through a communication network.

161. A database system according to claim 160, further comprising a list update server connected, through the communication network, to a plurality of storage units respectively coupled to said processors, the list update server controlling the storage units to maintain the storage sections.

162. A computer program product for managing information from a plurality of data tables having different numbers of records, wherein the group of attributes is divided into a plurality of sub-groups respectively associated with the data tables, with links between respective records from the data tables, each data table having a column for each attribute of the associated sub-group and rows for containing data table records comprising at least one word assigned to an attribute of the associated sub-group in a collection of data, wherein respective identifiers are allocated to data graphs, each data graph representing related attribute values respectively assigned to the attributes of said group, each attribute value of a data graph being either a default value or a word of said collection of data, the words of each data graph being from linked data table records, the computer program product comprising:
  instructions for storing a plurality of thesauruses respectively associated with attributes of said group, wherein each thesaurus associated with an attribute is defined with reference to a partition into subsets of a set of words which can be assigned to said attribute and has a respective entry for each subset including at least one word assigned to said attribute in the collection of data; and
  instructions for storing data representing data graph identifier lists respectively associated with the thesaurus entries, wherein the data graph identifier list associated with a entry, relating to a subset, of a thesaurus associated with an attribute includes any identifier allocated to a data graph having a word of said subset assigned to said attribute.

163. A computer program product according to claim 162, further comprising instructions for storing a link table having a plurality of rows respectively associated with the data graphs and a plurality of columns respectively associated with the attribute sub-groups, wherein each row of the link table contains, in each one of the columns, either a value indicating that each attribute value represented in the data graph associated with said row and assigned to an attribute of the sub-group associated with said one of the columns is a default value or data for identifying a row of the data table associated with said sub-group.

164. A computer program product according to claim 162, wherein at least one thesaurus entry comprises data for pointing to at least one memory region where coding data representing the data graph identifier list associated with said entry are stored.

165. A computer program product according to claim 164, wherein said memory region comprises a file individually allocated to said thesaurus entry.

166. A computer program product according to claim 164, wherein said memory region comprises a portion of a data container having a plurality of records each having a next address field, said portion being defined as a record chain in said data container, the chains being defined by means of the next address fields, and wherein said data for pointing to at least one memory region comprise a respective address of a first record of a chain in said data container.

167. A computer program product according to claim 166, further comprising instructions for grouping the records stored in the data container so that the records of each chain have contiguous addresses.

168. A computer program product to claim 162, wherein a plurality of formats are provided for representing the data graph identifier lists, and wherein each thesaurus entry contains an indication of the format used for representing the data graph identifier list associated therewith.

169. A computer program product according to claim 162, further comprising instructions for processing a query including:
  instructions for analyzing query criteria to determine a combination involving thesaurus entries relevant to the query;
  instructions for determining a matching data graph identifier list based on said combination and on the stored data representing the data graph identifier lists associated with said relevant thesaurus entries;
  instructions for outputting a response by processing said matching data graph identifier list.

170. A computer program product according to claim 169, wherein the instructions for analyzing the query criteria comprise:
  instructions for selecting at least one range of words defined for one attribute in the query criteria; and
  instructions for mapping the words of the selected range which are assigned to said attribute in the collection of data with one or more subsets, and for retaining the thesaurus entry for each of said one or more subset as a relevant entry for the selected range,
and wherein the instructions for determining the matching data graph identifier list comprises instructions for merging respective portions of the identifier lists represented by the data of the relevant thesaurus entries retained for said selected range.

171. A computer program product according to claim 170, wherein the instructions for mapping the words of the selected range are arranged to retain a minimum number of relevant thesaurus entries for each selected range.

172. A computer program product according to claim 170, wherein each thesaurus associated with an attribute is defined with reference to a partition such that each subset consists of one word or of consecutive words of the set of words which can be assigned to said attribute, the entries of said thesaurus being sorted based on the words assigned to said attribute, and wherein the instructions for analyzing the query criteria comprise instructions for performing a dichotomy search in at least one thesaurus for identifying relevant thesaurus entries.

173. A computer program product according to claim 172, wherein the thesauruses comprise word thesauruses each associated with a respective attribute of the group, with reference to a partition into subsets each consisting of one word.

174. A computer program product according to claim 173, wherein each word thesaurus associated with an attribute of the group to which the default value is assigned in at least one of the data graphs further has an entry for the default value, whereby one of said data graph identifier lists is associated with said thesaurus entry for the default value and includes any identifier allocated to a data graph having said default value assigned to said attribute.

175. A computer program product according to claim 172, wherein the thesauruses further comprise at least one macroword thesaurus associated with an attribute of said group and with a prefix length shorter than a word length of said attribute, whereby said macroword thesaurus is defined with reference to a partition into subsets each consisting of words beginning by a common prefix having said prefix length.

176. A computer program product according to claim 170, wherein the instructions for analyzing the query criteria comprise instructions for determining said combination involving relevant thesaurus entries as a tree having at least one leaf node, each leaf node corresponding to at least one relevant thesaurus entry retained for a respective attribute.

177. A computer program product according to claim 176, wherein said tree has a plurality of nodes including said at least one leaf node and at least one operator node, each operator node representing a Boolean operator applied to at least one partial criterion represented by another node of said tree, one of the operator nodes being a root node representing all the query criteria.

178. A computer program product according to claim 177, wherein the instructions for determining the matching data graph identifier list comprises instructions for obtaining a respective identifier list for each node of said tree, whereby the identifier list obtained for each leaf node corresponding to at least one relevant thesaurus entry is the merger of respective portions of the identifier lists associated with said at least one relevant thesaurus entry, and the identifier list obtained for each operator node representing a Boolean operator applied to at least one partial criterion is obtained by applying said Boolean operator to the identifier lists obtained for the node representing said at least one partial criterion, said matching data graph identifier list being determined as the identifier list obtained for the root node.

179. A computer program product according to claim 178, wherein each of said obtained identifier lists is produced in the form of a bitmap vector consisting of bits assigned to respective data graphs to indicate whether the identifiers allocated to said data graphs belong to said obtained list.

180. A computer program product according to claim 178, wherein a coding scheme comprising n successive coding layers is used to provide coding data representing the identifier list associated with a thesaurus entry, n being a number at least equal to 1, each layer having a predetermined pattern for dividing a range covering integers of an input list of said layer into subsets, said identifier list being the input list of the first layer for said thesaurus entry, wherein for any layer other than the last layer, an integer list representing the position, in the pattern of said layer, of each subset containing at least one integer of the input list forms the input list for the next layer, and wherein the coding data comprise, for each layer and each subset containing at least one integer of the input list, data representing the position of each integer of the input list within said subset and, at least if said layer is the last layer, data representing the position of said subset in the pattern of said layer.

181. A computer program product according to claims 180, wherein the pattern of each layer is such that the integer subsets are consecutive intervals consisting of the same number of integers.

182. A computer program product according to claim 181, wherein said number of integers is a whole power of 2 for each layer.

183. A computer program product according to claim 180, wherein the instructions for determining the matching data graph identifier list comprise instructions for determining a layer n integer list for each node of said tree, whereby the layer n integer list determined for a leaf node consists of a layer n input list associated, in the coding scheme, with the merger of the identifier lists represented in the relevant thesaurus entries to which said leaf node corresponds, and whereby the layer n integer list obtained for each operator node representing a Boolean operator applied to at least one partial criterion is obtained by applying said Boolean operator to the layer n integer lists determined for the nodes representing said at least one partial criterion, and wherein a layer n result list is determined as the layer n integer list obtained for the root node.

184. A computer program product according to claim 183, wherein the nodes of said tree further include at least one preset node for which a data graph identifier list has been determined in advance, said data graph identifier list being subjected to the coding scheme to provide a layer n input list which is determined as said layer n integer list for said preset node.

185. A computer program product according to claim 183, wherein n>1 and the instructions for determining the matching data graph identifier list further comprise, for k decreasing from n−1 to 1, instructions for determining a layer k integer list for each node of said tree, whereby the layer k integer list determined for a leaf node consists of any integer of a layer k input list, associated in the coding scheme with the identifier list represented in a relevant thesaurus entry to which said leaf node corresponds, which belongs to a layer k subset whose position is represented in the layer k+1 result list, and whereby the layer k integer list obtained for each operator node representing a Boolean operator applied to at least one partial criterion is obtained by applying said Boolean operator to the layer k integer lists determined for the nodes representing said at least one partial criterion, and instructions for determining a layer k result list as the layer k integer list obtained for the root node, and wherein said matching data graph identifier list corresponds to the determined layer 1 result list.

186. A computer program product according to claim 169, wherein said instructions for outputting a response comprise instructions for selecting a thesaurus associated with an attribute specified in the query, and instructions for detecting entries of the selected thesaurus with which identifier lists having a non-empty intersection with the matching data graph identifier list are associated.

187. A computer program product according to claim 186, wherein said instructions for outputting a response comprise further comprise instructions for writing output data associated with any detected entry of a selected thesaurus into an output table.

188. A computer program product according to claim 187, wherein the output table includes a respective row corresponding to each identifier of the matching data graph identifier list, and wherein said instructions for writing output data are arranged to control the writing of output data associated with a detected entry of a selected thesaurus into any row of the output table corresponding to a data graph identifier belonging to both the matching data graph identifier list and the identifier list associated with said detected thesaurus entry.

189. A computer program product according to claim 188, wherein the output table has a plurality of columns each associated with a respective attribute for which a thesaurus is selected, and wherein said instructions for writing output data are arranged to control the writing into a column of the output table of output data associated with a detected entry of a thesaurus selected for an attribute associated with said column.

190. A computer program product according to claim 187, wherein the selected thesaurus being a word thesaurus defined with reference to a partition into subsets each consisting of one word, the output data associated with a detected entry comprise the word for which said detected entry is provided.

191. A computer program product according to claim 187, wherein the selected thesaurus being a macroword thesaurus associated with a prefix length and defined with reference to a partition into subsets each consisting of words beginning by a common prefix having said prefix length, the output data associated with a detected entry comprise the prefix value for which said detected entry is provided.

192. A computer program product according to claim 187, wherein the output data associated with a detected entry comprise an address of said detected entry in the selected thesaurus.

193. A computer program product according to claim 187, wherein the output data associated with a detected entry of a selected thesaurus comprise a numerical value derived from said thesaurus entry.

194. A computer program product according to claim 193, further comprising instructions for calculating said numerical value for a detected entry of at least one selected thesaurus by applying a mathematical function to a thesaurus value stored in said entry.

195. A computer program product according to claim 193, further comprising instructions for calculating said numerical value for a detected entry of at least one selected thesaurus by applying a mathematical function to a plurality of values including a thesaurus value stored in said entry and at least one value already present in the output table.

196. A computer program product according to claim 193, wherein the output table includes a respective row corresponding to each identifier of the matching data graph identifier list, and wherein said instructions for writing output data are arranged to control the writing of a numerical value derived from a detected thesaurus entry into any row of the output table corresponding to a data graph identifier belonging to both the matching data graph identifier list and the identifier list associated with said detected thesaurus entry.

197. A computer program product according to claim 196, wherein the numerical value, derived from a detected entry of a first selected thesaurus and written into any row of the output table corresponding to a data graph identifier belonging to both the matching data graph identifier list and the identifier list associated with said entry of the first selected thesaurus, is obtained from a thesaurus value stored in said entry, and wherein the numerical value, derived from a detected entry of at least one second selected thesaurus and written into a row of the output table corresponding to a data graph identifier belonging to both the matching data graph identifier list and the identifier list associated with said entry of the second selected thesaurus, is calculated by applying a mathematical function to a plurality of values including a thesaurus value stored in said entry and at least one value already present in said row of the output table.

198. A computer program product according to claim 196, further comprising instructions for calculating an output value from a set of numerical values which have been respectively written into the rows of the output table.

199. A computer program product according to claim 169, wherein the instructions for storing data representing identifier lists are arranged to supervise a plurality of storage sections respectively associated with distinct portions of an integer range covering the identifiers allocated to the data graphs according to a predetermined partition, wherein each storage section associated with one of said portions contains data representing identifier sub-lists consisting of identifiers of said portion, and wherein the instructions for determining the matching data graph identifier list comprise instructions for determining respective matching identifier sub-lists included in the different portions of the data graph identifier range, by means of the respective storage sections.

200. A computer program product according to claim 199, wherein said matching identifier sub-lists are determined sequentially.

201. A computer program product according to claim 199, wherein said matching identifier sub-lists are determined in parallel.

* * * * *